(12) United States Patent
Lee

(10) Patent No.: US 12,334,805 B2
(45) Date of Patent: Jun. 17, 2025

(54) VOLTAGE CONVERTER CIRCUIT

(71) Applicant: Chicony Power Technology Co., Ltd., New Taipei (TW)

(72) Inventor: Min-Han Lee, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 359 days.

(21) Appl. No.: 18/100,244

(22) Filed: Jan. 23, 2023

(65) Prior Publication Data
US 2024/0195309 A1    Jun. 13, 2024

(30) Foreign Application Priority Data
Dec. 9, 2022  (TW) ................. 111147500

(51) Int. Cl.
| | |
|---|---|
| H02M 1/00 | (2007.01) |
| H02M 1/42 | (2007.01) |
| H02M 3/00 | (2006.01) |
| H02M 3/335 | (2006.01) |

(52) U.S. Cl.
CPC ............ H02M 1/007 (2021.05); H02M 3/01 (2021.05); H02M 1/0095 (2021.05); H02M 1/4208 (2013.01); H02M 3/33573 (2021.05)

(58) Field of Classification Search
CPC ......... H02M 1/007; H02M 1/42–4291; H02M 3/01; H02M 3/335–33592
See application file for complete search history.

(56) References Cited

U.S. PATENT DOCUMENTS

| | | |
|---|---|---|
| 10,211,745 B2 | 2/2019 | Murakami et al. |
| 10,389,233 B1 | 8/2019 | Lim |
| 2006/0133119 A1 | 6/2006 | Nomura et al. |
| 2013/0336017 A1* | 12/2013 | Uno ............ H02M 3/3376 |
| | | 363/21.02 |
| 2015/0098254 A1 | 4/2015 | Brinlee et al. |

(Continued)

FOREIGN PATENT DOCUMENTS

| | | |
|---|---|---|
| CN | 102664531 | 9/2012 |
| CN | 104467443 | 3/2015 |

(Continued)

*Primary Examiner* — Fred E Finch, III
(74) *Attorney, Agent, or Firm* — Birch, Stewart, Kolasch & Birch, LLP

(57) ABSTRACT

A voltage converter circuit includes rectifier filter circuit, power factor (PFC) converter circuit, full-half bridge resonance converter circuit, voltage regulation control circuit, and voltage feedback control circuit. The PFC converter circuit is configured to convert the rectified and filtered voltage of the rectifier filter circuit to PFC voltage according to first gain. The full-half bridge resonance converter circuit is configured to convert the PFC voltage to a supply voltage according to second gain. The voltage regulation control circuit is configured to generate three voltage regulation signals according to output voltage. The PFC converter circuit is configured to adjust the first gain according to a first voltage regulation signal. The full-half bridge resonance converter circuit is configured to operate in one of three resonance modes according to a second voltage regulation signal. The voltage feedback control circuit is configured to adjust the second gain according to a third voltage regulation signal.

15 Claims, 29 Drawing Sheets

(56) References Cited

U.S. PATENT DOCUMENTS

| | | | |
|---|---|---|---|
| 2015/0162840 A1 | 6/2015 | Frost et al. | |
| 2016/0190933 A1 | 6/2016 | Lee et al. | |
| 2017/0170735 A1 | 6/2017 | Yang et al. | |
| 2021/0249950 A1* | 8/2021 | Kim | H02M 1/007 |
| 2022/0286055 A1 | 9/2022 | Baranwal et al. | |
| 2022/0360175 A1* | 11/2022 | Peng | H02M 1/0003 |
| 2023/0111992 A1* | 4/2023 | Liu | H02M 1/10 363/21.02 |

FOREIGN PATENT DOCUMENTS

| | | |
|---|---|---|
| CN | 108258910 | 7/2018 |
| CN | 110504847 | 11/2019 |
| CN | 112737343 | 4/2021 |
| CN | 113452260 | 9/2021 |
| CN | 111181407 B | 8/2022 |
| TW | 201027892 | 7/2010 |
| TW | I439036 B | 5/2014 |
| TW | I523393 B | 2/2016 |
| TW | I692182 B | 4/2020 |
| TW | 202145688 | 12/2021 |

\* cited by examiner

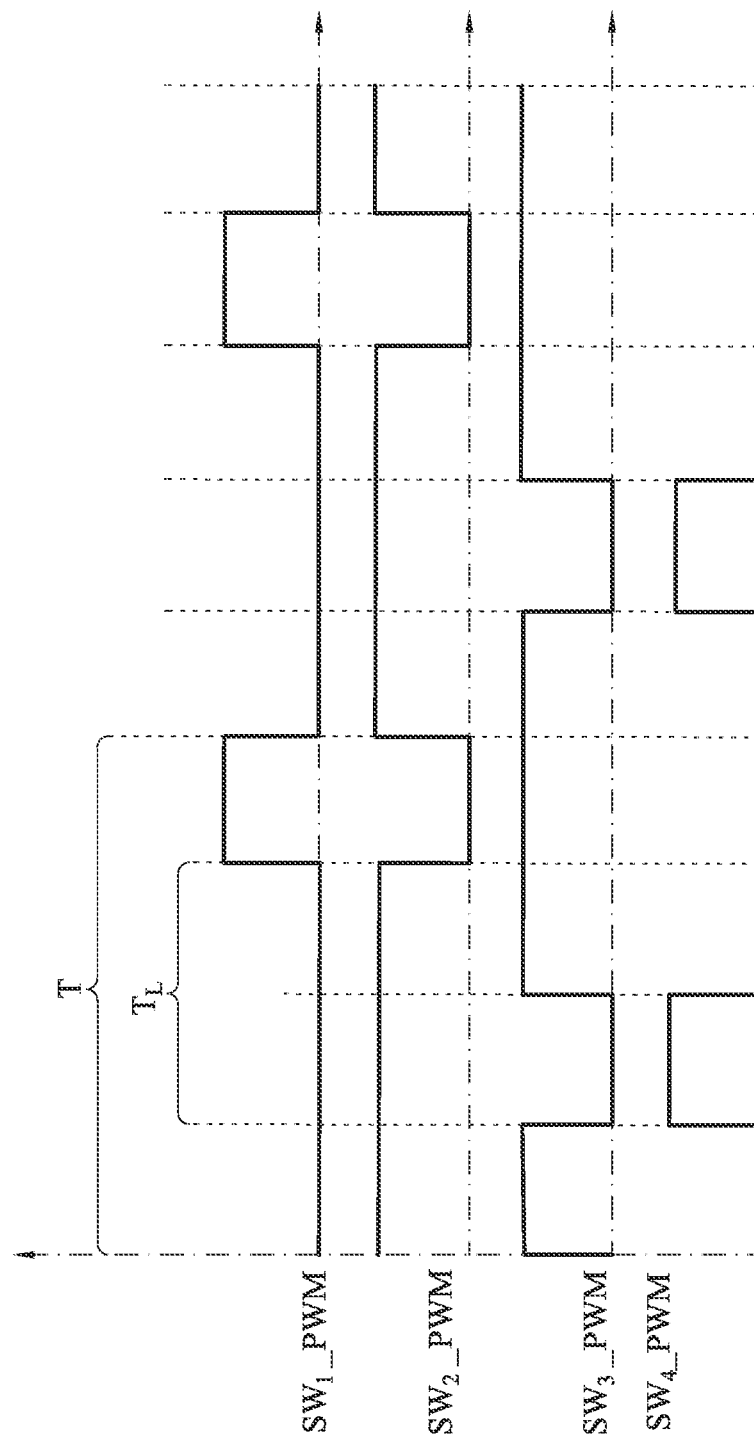

VOLTAGE CONVERTER CIRCUIT

CROSS-REFERENCE TO RELATED APPLICATION

This non-provisional application claims priority under 35 U.S.C. § 119(a) to Patent Application No. 111147500 filed in Taiwan, R.O.C. on Dec. 9, 2022, the entire contents of which are hereby incorporated by reference.

BACKGROUND

Technical Field

The present invention relates to the field of voltage regulation, and in particular, to a voltage converter circuit.

Related Art

Nowadays, electronic products are growing explosively, and various input voltages are required. In order to provide different voltages required for operation of various electronic products, a power delivery (PD) device that can support a plurality of output voltages is developed. For example, the PD device has a DC-DC converter to adjust an input voltage to an output voltage required for the electronic products. However, in this manner, energy losses concentrate in the DC-DC converter, resulting in damage to components inside the PD device due to uneven heat dissipation. For example, according to the specification in PD3.1, the output voltage may be in a range from 5 volts (V) to 48 V. Assuming that the output voltage required for the electronic products is 5 V and the input voltage is 48 V, a to-be-adjusted voltage difference of 43 V needs to be completed by the DC-DC converter, which causes large losses to the DC-DC converter.

SUMMARY

In view of the above, the present invention provides a voltage converter circuit. The voltage converter circuit includes a rectifier filter circuit, a power factor converter circuit, a full-half bridge resonance converter circuit, a voltage regulation control circuit, and a voltage feedback control circuit. The rectifier filter circuit is configured to receive an input voltage and rectify and filter the input voltage to generate a rectified and filtered voltage. The power factor converter circuit is coupled to the rectifier filter circuit. The power factor converter circuit has a first gain, and is configured to convert the rectified and filtered voltage to a power factor voltage according to the first gain. The full-half bridge resonance converter circuit is coupled to the power factor converter circuit. The full-half bridge resonance converter circuit has a second gain, and is configured to convert the power factor voltage to a supply voltage according to the second gain. The voltage regulation control circuit is coupled to the power factor converter circuit and the full-half bridge resonance converter circuit. The voltage regulation control circuit is configured to generate a first voltage regulation signal, a second voltage regulation signal and a third voltage regulation signal according to an output voltage. The voltage feedback control circuit is coupled to the full-half bridge resonance converter circuit and the voltage regulation control circuit. The power factor converter circuit is configured to adjust the first gain according to the first voltage regulation signal. The full-half bridge resonance converter circuit is configured to operate in a full-bridge resonance mode, a half-bridge resonance mode, or a hybrid half-bridge resonance mode according to the second voltage regulation signal. The voltage feedback control circuit is configured to control the full-half bridge resonance converter circuit to adjust the second gain according to the third voltage regulation signal.

In conclusion, according to the embodiments of the present invention, the input voltage may be adjusted to the supply voltage through the power factor converter circuit and the full-half bridge resonance converter circuit. In this way, the power factor converter circuit and the full-half bridge resonance converter circuit can adjust a voltage, and the power factor converter circuit can improve a power factor of the voltage converter circuit. In addition, a to-be-adjusted voltage difference may be distributed to the power factor converter circuit and the full-half bridge resonance converter circuit, so as to avoid large losses of a single component. In some embodiments, the full-bridge resonance mode, the half-bridge resonance mode, and the hybrid half-bridge resonance mode of the full-half bridge resonance converter circuit may match different power values required for an electronic device supplied by the supply voltage. In some embodiments, switching losses are distributed more uniformly in the hybrid half-bridge resonance mode than in the half-bridge resonance mode, and therefore heat dissipation is more effective.

BRIEF DESCRIPTION OF THE DRAWINGS

FIG. 13A is a schematic oscillogram of a second embodiment of the switching signals of the full-half bridge resonance converter circuit in the hybrid half-bridge resonance mode according to the present invention.

DETAILED DESCRIPTION

Figure 1:
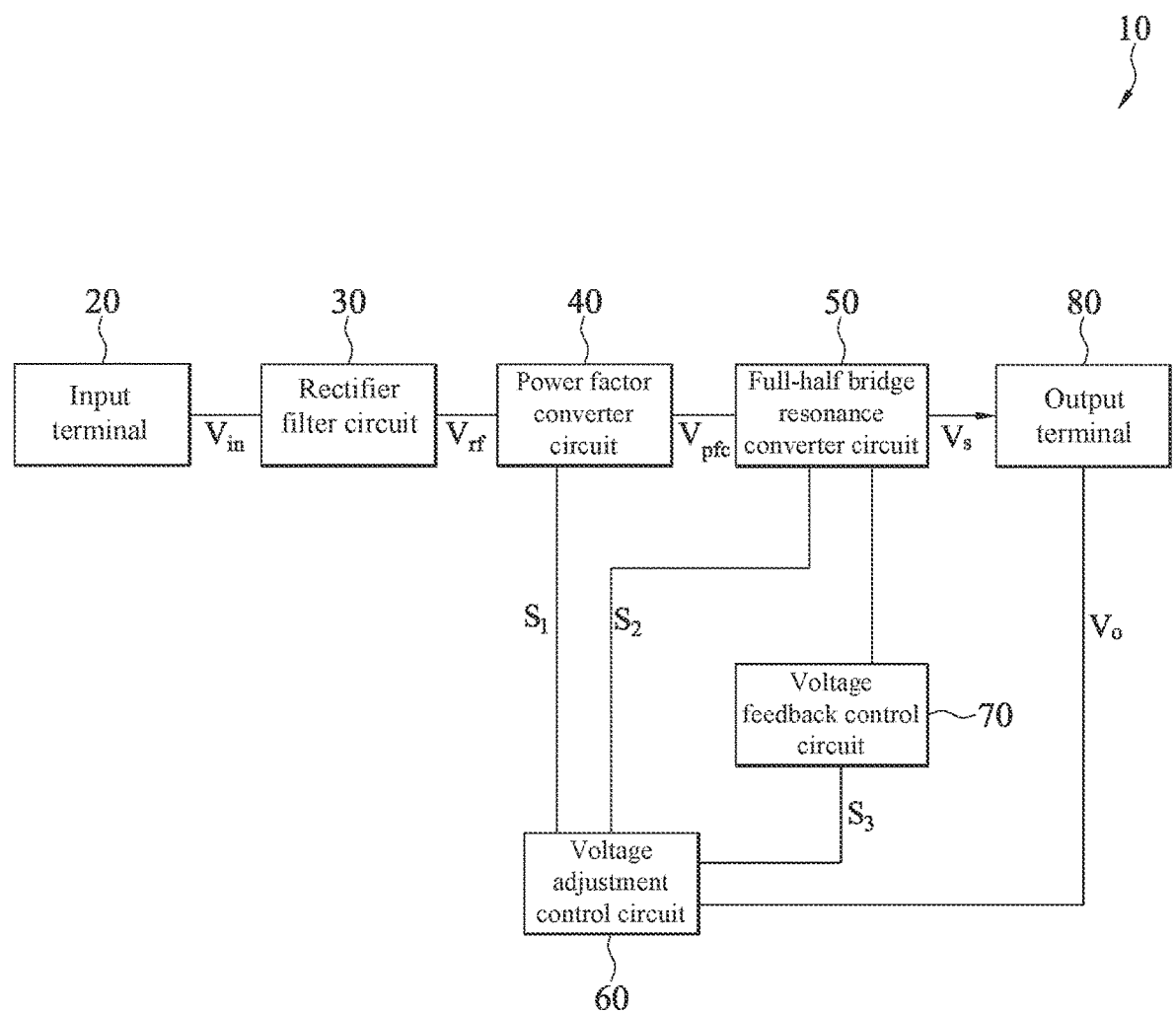
FIG. 1 is a schematic block diagram of a voltage converter circuit according to some embodiments of the present invention.

FIG. 1 is a schematic block diagram of a voltage converter circuit 10 according to some embodiments of the present invention. The voltage converter circuit 10 includes a rectifier filter circuit 30, a power factor converter circuit 40, a full-half bridge resonance converter circuit 50, a voltage regulation control circuit 60, and a voltage feedback control circuit 70. The rectifier filter circuit 30 is coupled to input terminal 20. The power factor converter circuit 40 is coupled to the rectifier filter circuit 30. The full-half bridge resonance converter circuit 50 is coupled to the power factor converter circuit 40 and an output terminal 80. The voltage regulation control circuit 60 is coupled to the power factor converter circuit 40, the full-half bridge resonance converter circuit 50, and the output terminal 80. The voltage feedback control circuit 70 is coupled to the full-half bridge resonance converter circuit 50 and the voltage regulation control circuit 60.

The rectifier filter circuit 30 is configured to receive an input voltage $V_{in}$ from the input terminal 20 and rectify and filter the input voltage $V_{in}$ to generate a rectified and filtered voltage $V_{rf}$. In some embodiments, the input voltage $V_{in}$ is an AC voltage, the rectified and filtered voltage $V_{rf}$ is a DC voltage, and a voltage directly or indirectly converted through the rectified and filtered voltage $V_{rf}$ is a DC voltage. In some embodiments, the rectifier filter circuit 30 includes a rectifier circuit and a filter circuit to perform rectification and filtering respectively. In some embodiments, a rectifier circuit may be implemented by a half-wave rectifier or a full-wave rectifier. In some embodiments, a filter circuit may be implemented by a passive filter or an active filter.

The power factor converter circuit 40 has a first gain. The power factor converter circuit 40 obtains the rectified and filtered voltage $V_{rf}$ from the rectifier filter circuit 30, converts the rectified and filtered voltage $V_{rf}$ to a power factor voltage $V_{pfc}$ according to the first gain, and outputs the power factor voltage $V_{p}fc$ to the full-half bridge resonance converter circuit 50. For example, the power factor converter circuit 40 increases or reduces the rectified and filtered voltage $V_{rf}$ by the first gain to obtain the power factor voltage $V_{p}fc$. In this way, the power factor converter circuit 40 can adjust the voltage.

The full-half bridge resonance converter circuit 50 has a second gain. The full-half bridge resonance converter circuit 50 obtains the power factor voltage $V_{pfc}$ from the power factor converter circuit 40, converts the power factor voltage $V_{pfc}$ to a supply voltage $V_s$ according to the second gain, and transmits the supply voltage $V_s$ to a rear connected electronic device (not shown) through the output terminal 80. For example, the full-half bridge resonance converter circuit 50 increases or reduces the power factor voltage $V_{pfc}$ by the second again to obtain the supply voltage $V_s$. In this way, the full-half bridge resonance converter circuit 50 can adjust the voltage. In some embodiments, the electronic device may be, for example, a mobile phone, a tablet computer, a notebook computer, or the like.

The voltage regulation control circuit 60 obtains an output voltage $V_o$ required for the electronic device through the output terminal 80. The voltage regulation control circuit 60 generates a first voltage regulation signal $S_1$, a second voltage regulation signal $S_2$, and a third voltage regulation signal $S_3$ according to the output voltage $V_o$, to control the voltage regulation of the power factor converter circuit 40 and the full-half bridge resonance converter circuit 50, so that the supply voltage $V_s$ conforms to the output voltage $V_o$ required for the electronic device. The output voltage $V_o$ may be a DC voltage.

The power factor converter circuit 40 adjusts the first gain according to the first voltage regulation signal $S_1$. The full-half bridge resonance converter circuit 50 is configured to operate in a full-bridge resonance mode, a half-bridge resonance mode, or a hybrid half-bridge resonance mode according to the second voltage regulation signal $S_2$. In some embodiments, gains provided in the full-bridge resonance mode, the half-bridge resonance mode, and the hybrid half-bridge resonance mode of the full-half bridge resonance converter circuit 50 are fixed, and the gain provided in the full-bridge resonance mode is twice that provided in the half-bridge resonance mode or hybrid half-bridge resonance mode. The voltage feedback control circuit 70 controls the full-half bridge resonance converter circuit 50 to adjust (for example, tune) the second gain according to the third voltage regulation signal $S_3$. In this way, a to-be-adjusted voltage difference is distributed to the power factor converter circuit 40 and the full-half bridge resonance converter circuit 50, so as to avoid large losses of a single component. Furthermore, through stage regulation (for example, three-stage regulation, where in a first stage, the resonance mode in which the full-half bridge resonance converter circuit 50 is controlled, in a second stage, the gain of the power factor converter circuit 40 (which is referred to as the first gain below) is adjusted, and in a third stage, the gain of the full-half bridge resonance converter circuit 50 (which is referred to as the second gain below) is adjusted), the supply voltage $V_s$ can accurately conform to the output voltage $V_o$ required for the electronic device, and the efficiency of the voltage converter circuit 10 can be improved. In some embodiments, the second gain includes a first sub-gain and a second sub-gain. The first sub-gain is a gain provided in the full-bridge resonance mode, the half-bridge resonance mode, or the hybrid half-bridge resonance mode, and the second sub-gain is a gain adjusted according to the third voltage regulation signal $S_3$. That is to say, the first stage of the stage regulation is to determine to provide the first sub-gain in the full-bridge resonance mode or the half-bridge resonance mode or the hybrid half-bridge resonance mode, and the third stage of the stage regulation is to adjust the second sub-gain. In some embodiments, the voltage regulation control circuit 60 and the voltage feedback control circuit 70 may be formed by physical circuits or may be integrated into an integrated control circuit.

In some embodiments, when the output voltage $V_o$ is greater than a voltage threshold, the second voltage regulation signal $S_2$ generated by the voltage regulation control circuit 60 indicates that operation in the full-bridge resonance mode. When the output voltage $V_o$ is not greater than the voltage threshold, the second voltage regulation signal $S_2$ generated by the voltage regulation control circuit 60 indicates that operation in the half-bridge resonance mode or the hybrid half-bridge resonance mode. In some embodiments, the voltage threshold may be 24 V. For example, it is assumed that a current supply voltage $V_s$ is 24 V and the full-half bridge resonance converter circuit 50 operates in the half-bridge resonance mode or the hybrid half-bridge resonance mode. When the output voltage $V_o$ required for the electronic device is 45 V, the voltage regulation control circuit 60 generates the second voltage regulation signal $S_2$ indicating operation in the full-bridge resonance mode, so that the full-half bridge resonance converter circuit 50 operates in the full-bridge resonance mode. In a case that the first gain and the second gain are not adjusted, the supply voltage $V_s$ is caused to reach 48 V through the full-bridge resonance mode, and the supply voltage $V_s$ reaches 45.5 V after the first gain is adjusted. Due to some limited parameters, the adjusted supply voltage $V_s$ does not reach 45 V. In this case, the second gain is adjusted to cause the supply voltage $V_s$ to reach 45 V, thereby conforming to the output voltage $V_o$ required for the electronic device. For another example, it is assumed that a current supply voltage $V_s$ is 48 V and the full-half bridge resonance converter circuit 50 operates in the full-bridge resonance mode. When the output voltage $V_o$ required for the electronic device is 20 V, the voltage regulation control circuit 60 generates the second voltage regulation signal $S_2$ indicating operation in the half-bridge resonance mode or the hybrid half-bridge resonance mode, so that the full-half bridge resonance converter circuit 50 operates in the half-bridge resonance mode or the hybrid half-bridge resonance mode. In a case that the first gain and the second gain are not adjusted, the supply voltage $V_s$ is caused to reach 24 V through the half-bridge resonance mode or the hybrid half-bridge resonance mode, and the supply voltage $V_s$ reaches 20.5V after the first gain is adjusted. Due to some limited parameters, the adjusted supply voltage $V_s$ does not reach 20V. In this case, the second gain is adjusted to cause the supply voltage $V_s$ to reach 20 V, thereby conforming to the output voltage $V_o$ required for the electronic device.

In some embodiments, the voltage regulation control circuit 60 may determine the resonance mode indicated in the second voltage regulation signal $S_2$ through a power value required for the electronic device in addition to determining the resonance mode indicated in the second voltage regulation signal $S_2$ through the output voltage $V_o$. For example, when the power value required for the electronic device is not greater than a first power threshold, the second voltage regulation signal $S_2$ generated by the voltage regulation control circuit 60 indicates operation in the half-bridge resonance mode, so that the full-half bridge resonance converter circuit 50 operates in the half-bridge resonance mode. When the power value required for the electronic device is greater than the first power threshold and not greater than a second power threshold, the second voltage regulation signal $S_2$ generated by the voltage regulation control circuit 60 indicates operation in the hybrid half-bridge resonance mode, so that the full-half bridge resonance converter circuit 50 operates in the hybrid half-bridge resonance mode. When the power value required for the electronic device is greater than the second power threshold, the second voltage regulation signal $S_2$ generated by the voltage regulation control circuit 60 indicates operation in the full-bridge resonance mode, so that the full-half bridge resonance converter circuit 50 operates in the full-bridge resonance mode. In some embodiments, the first power threshold is 140 watts (W), and the second power threshold is 180 W.

Figure 2:
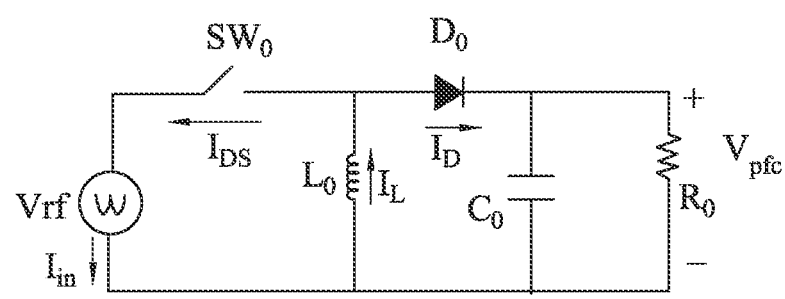
FIG. 2 is a detailed schematic circuit diagram of a first embodiment of a power factor converter circuit according to the present invention.
Figure 3:
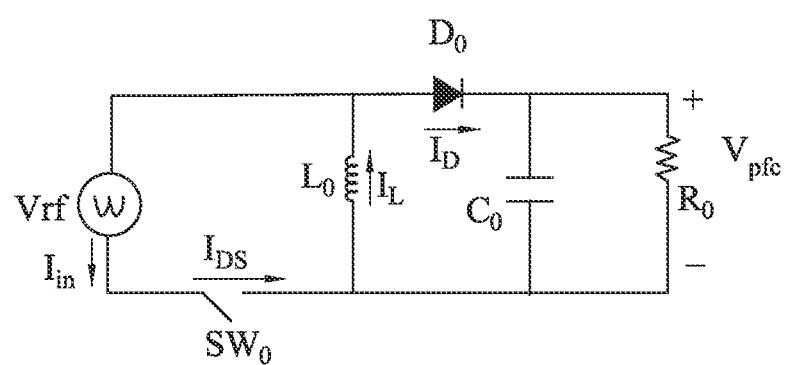
FIG. 3 is a detailed schematic circuit diagram of a second embodiment of the power factor converter circuit according to the present invention.

Refer to FIG. 2 and FIG. 3. FIG. 2 is a detailed schematic circuit diagram of a first embodiment of the power factor converter circuit 40 according to the present invention. FIG. 3 is a detailed schematic circuit diagram of a second embodiment of the power factor converter circuit 40 according to the present invention. In some embodiments, the power factor converter circuit 40 includes a capacitor $C_0$, an inductor $L_0$, a resistor $R_0$, a diode $D_0$, and a switch $SW_0$. The inductor $L_0$ is connected in parallel to the capacitor $C_0$. The resistor $R_0$ is coupled to the full-half bridge resonance converter circuit 50 and connected in parallel to the capacitor $C_0$. The resistor $R_0$ generates the power factor voltage $V_{pfc}$ and outputs the power factor voltage $V_{pfc}$ to the full-half bridge resonance converter circuit 50. The capacitor $C_0$ can eliminate a ripple of power factor voltage $V_{pfc}$. The diode D0 is coupled between the inductor $L_0$ and capacitor $C_0$. The switch $SW_0$ is coupled between the rectifier filter circuit 30 and the inductor $L_0$. The switch $SW_0$ may be implemented by a transistor. The rectifier filter circuit 30 outputs the rectified and filtered voltage $V_{rf}$ to the power factor converter circuit 40 through a first end and a second end thereof. As shown in FIG. 2, in the first embodiment of the power factor converter circuit 40, the switch $SW_0$ is coupled between the first end of the rectifier filter circuit 30 and a first end of the inductor $L_0$. As shown in FIG. 3, in the second embodiment of the power factor converter circuit 40, the switch $SW_0$ is coupled between the second end of the rectifier filter circuit 30 and a second end of the inductor $L_0$. The switch $SW_0$ changes a switch duty cycle of itself according to the first voltage regulation signal $S_1$ to adjust the first gain. A single switching cycle of the $SW_0$ includes an on time (conduction time) ($T_{on}$) and an off time (cut off time) ($T_{off}$). The switch duty cycle is a ratio ($T_{on}/T_{on}+T_{off}$) of the on time in the single switching cycle of the switch $SW_0$ and the single switching cycle. For example, when the first voltage regulation signal $S_1$ indicates a voltage increase, the switch $SW_0$ increases the on time to increase the switch duty cycle while a switching frequency (or a switching cycle) remains unchanged, thereby increasing the first gain and increasing the power factor voltage $V_{pfc}$. When the first voltage regulation signal $S_1$ indicates a voltage reduction, the switch $SW_0$ reduces the on time to reduce the switch duty cycle while a switching frequency (or a switching cycle) remains unchanged, thereby reducing the first gain and reducing the power factor voltage $V_{pfc}$. In some embodiments, a duty cycle of the first voltage regulation signal $S_1$ corresponds to the switch duty cycle of the switch $SW_0$, and the switch $SW_0$ changes the first gain by adjusting the switch duty cycle according to the first voltage regulation signal $S_1$.

Figure 4:
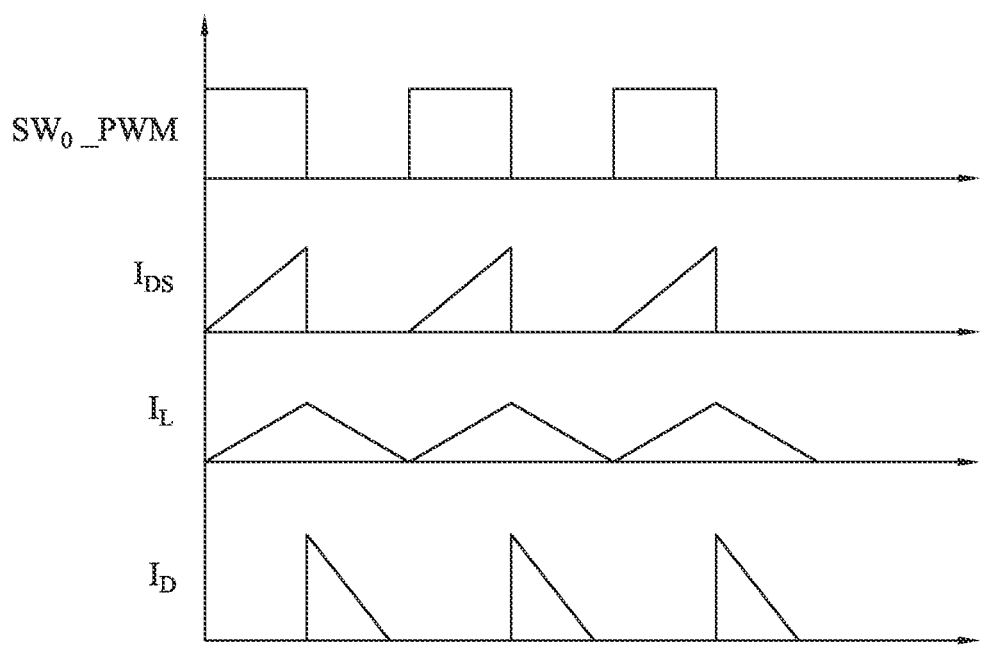
FIG. 4 is a schematic oscillogram of a switching signal of the power factor converter circuit and currents of components thereof according to some embodiments of the present invention.
Figure 5:
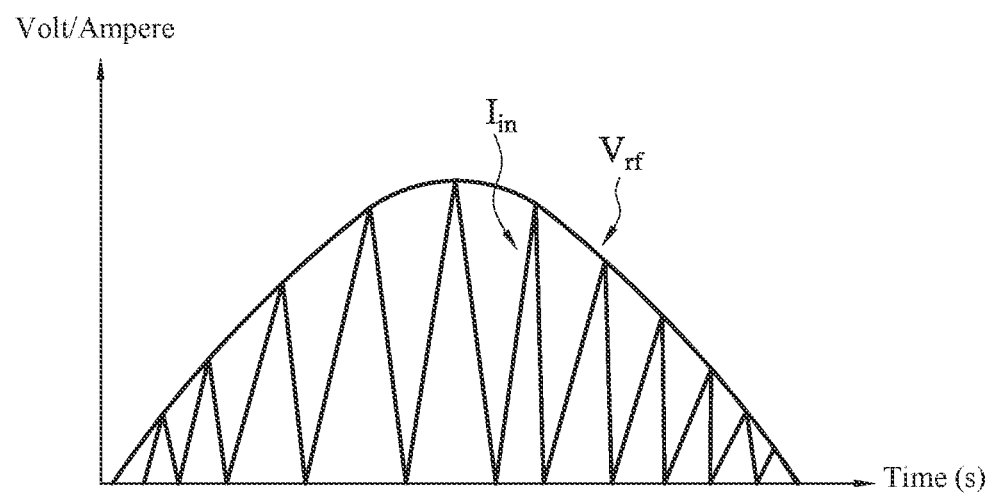
FIG. 5 is a schematic oscillogram of a rectified and filtered voltage and an input current of the power factor converter circuit according to some embodiments of the present invention.

Refer to FIG. 2 to FIG. 5. FIG. 4 is a schematic oscillogram of a switching signal $SW_0\_PWM$ of the power factor converter circuit 40 and currents $I_{DS}$, $I_L$, and $I_D$ of components thereof according to some embodiments of the present invention. FIG. 5 is a schematic oscillogram of a rectified and filtered voltage $V_{rf}$ and an input current $I_{in}$ of the power factor converter circuit 40 according to some embodiments of the present invention. The current $I_{DS}$ is a current of the switch $SW_0$, the current $I_L$ is a current of the inductor $L_0$, and the current $I_D$ is a current of the diode $D_0$. In some embodiments, the first voltage regulation signal $S_1$ may be a switching signal $SW_0\_PWM$ implemented by a pulse width modulation (PWM) signal. A switching status of the switch $SW_0$ is controlled by the switching signal $SW_0\_PWM$. For example, when the switching signal $SW_0$ PWM is a high level, the switching status of the switch $SW_0$ is on (conducting), and when the switching signal $SW_0\_PWM$ is a low level, the switching status of the switch $SW_0$ is off (cut off). Since the switch duty cycle of the switch $SW_0$ corresponds to a duty cycle of the switching signal $SW_0\_PWM$, the switch duty cycle of the switch $SW_0$ changes when the duty cycle of the switching signal $SW_0\_PWM$ changes. For example, the switch duty cycle of the switch $SW_0$ increases (or decreases) when the duty cycle of the switching signal $SW_0\_PWM$ increases (or decreases). The duty cycle of the switching signal $SW_0\_PWM$ is a ratio of a high level time in a single period of the switching signal $SW_0\_PWM$ to the single period. In some embodiments, the first gain may be expressed by using a formula 1. A1 is the first gain, and $DT_0$ is the duty cycle of the switching signal $SW_0\_PWM$ or the switch duty cycle of the switch $SW_0$.

$$\frac{V_{pfc}}{V_{rf}} = \frac{DT_0}{1-DT_0} = A1. \qquad \text{(Formula 1)}$$

In some embodiments, when the switching signal $SW_0\_PWM$ causes the switching status of the switch $SW_0$ to be on, the rectified and filtered voltage $V_{rf}$ charges the inductor $L_0$. At this time, the current $I_{DS}$ is equal to the current $I_L$ and the current $I_D$ is equal to zero. When the switching signal $SW_0\_PWM$ causes the switching status of the switch $SW_0$ to be off, the inductor $L_0$ is discharged to the resistor $R_0$ through the diode $D_0$. At this time, the current $I_L$ is equal to the current $I_D$. As shown in FIG. 5, when the switching status of the switch $SW_0$ is on and the power factor converter circuit 40 is in a boundary conduction mode (BCM), the input current $I_{in}$ of the power factor converter circuit 40 and the rectified and filtered voltage $V_{rf}$ are in the same phase. Therefore, a power factor of the voltage converter circuit 10 can be increased. In this way, the power factor converter circuit 40 not only can adjust the voltage, but also can adjust the power factor of the voltage converter circuit 10.

Figure 6:
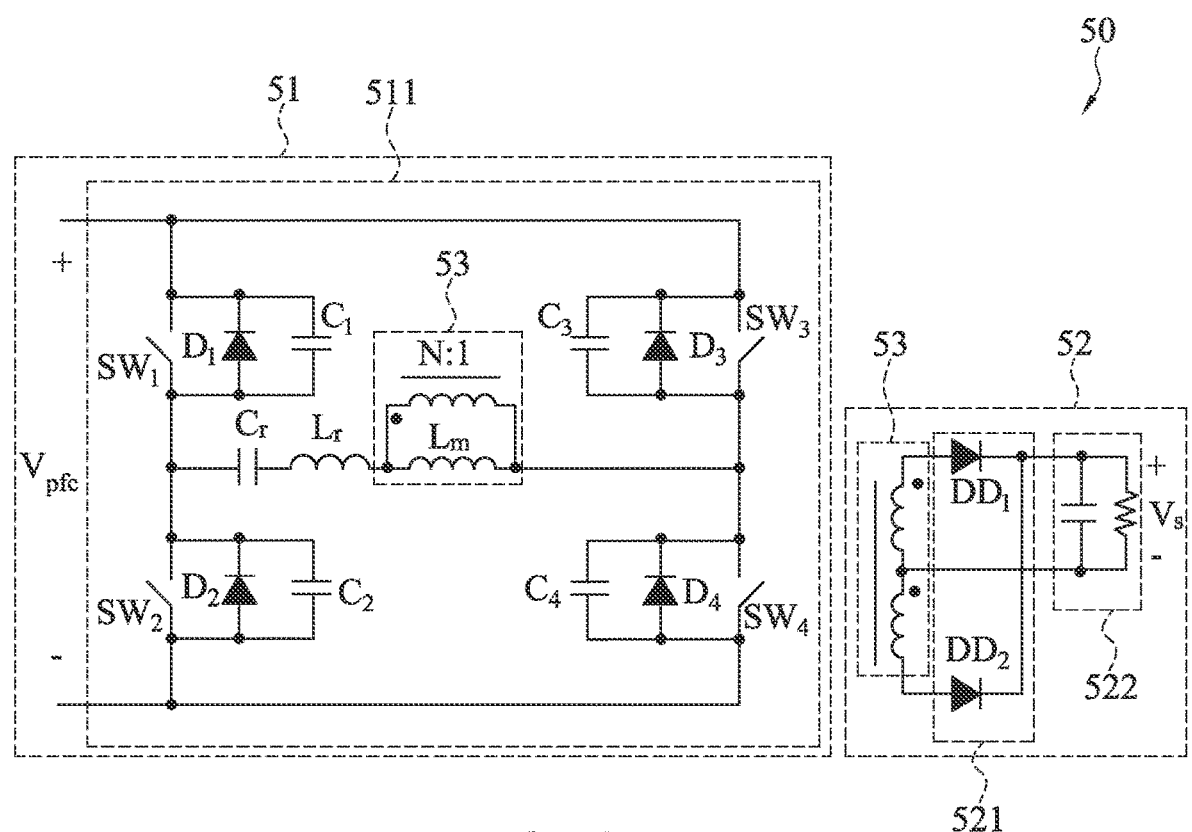
FIG. 6 is a detailed schematic circuit diagram of a full-half bridge resonance converter circuit according to some embodiments of the present invention.

FIG. 6 is a detailed schematic circuit diagram of the full-half bridge resonance converter circuit 50 according to some embodiments of the present invention. In some embodiments, the full-half bridge resonance converter circuit 50 includes a primary side circuit 51, a secondary side circuit 52, and a transformer 53. The primary side circuit 51 is coupled to the power factor converter circuit 40 and the voltage regulation control circuit 60 and is configured to receive the power factor voltage $V_{pfc}$ and the second voltage regulation signal $S_2$. The primary side circuit 51 performs energy transfer with the secondary side circuit 52 through the transformer 53, so that the secondary side circuit 52 outputs the supply voltage $V_s$.

In some embodiments, the primary side circuit 51 includes a bridge resonance circuit 511. The secondary side circuit 52 includes a synchronous rectifier circuit 521 and a filter circuit 522. The synchronous rectifier circuit 521 is configured to rectify the voltage from the transformer 53. The filter circuit 522 is configured to filter the voltage rectified by the synchronous rectifier circuit 521 to output the supply voltage $V_s$. In some embodiments, the synchronous rectifier circuit 521 includes a first rectifier switch DD1 and a second rectifier switch DD2. The first rectifier switch DD1 is coupled between a first end of a secondary side inductor of the transformer 53 and a first end of the filter circuit 522. The second rectifier switch DD2 is coupled between a second end of the secondary side inductor of the transformer 53 and the first end of the filter circuit 522. A second end of the filter circuit 522 is coupled to a middle tap of the secondary side inductor of the transformer. In some embodiments, the first rectifier switch DD1 and the second rectifier switch DD2 may be implemented by a transistor or a diode. In some embodiments, the filter circuit 522 may be an R-C filter circuit, such as a filter circuit composed of a resistor and a capacitor connected in parallel.

In some embodiments, the bridge resonance circuit 511 includes a first resonance capacitor $C_r$, a first resonance inductor $L_r$, a second resonance inductor $L_m$, a first bridge switch $SW_1$, a second bridge switch $SW_2$, a third bridge switch $SW_3$, and a fourth bridge switch $SW_4$. The first resonance inductor $L_r$ is coupled to the first resonance capacitor $C_r$. The second resonance inductor $L_m$ is coupled to the first resonance inductor $L_r$. The power factor converter circuit 40 outputs the power factor voltage $V_{pfc}$ to the bridge resonance circuit 511 through a first end and a second end thereof. The first bridge switch $SW_1$ is coupled between the first end of the power factor converter circuit 40 and the first resonance capacitor $C_r$. The second bridge switch $SW_2$ is coupled between the second end of the power factor converter circuit 40 and the first resonance capacitor $C_r$. The third bridge switch $SW_3$ is coupled between the first end of the power factor converter circuit 40 and the second resonance inductor $L_m$. The fourth bridge switch $SW_4$ is coupled between the second end of the power factor converter circuit 40 and the second resonance inductor $L_m$. The second resonance inductor $L_m$ is connected in parallel to the primary side inductor of the transformer 53, to transfer energy to the secondary side circuit 52 through the transformer 53. The bridge resonance circuit 511 controls switching statuses of the first bridge switch $SW_1$, the second bridge switch $SW_2$, the third bridge switch $SW_3$, and the fourth bridge switch $SW_4$ according to the second voltage regulation signal $S_2$, so that the full-half bridge resonance converter circuit 50 can switch to operate in the three resonance modes (that is, the full-bridge resonance mode, the half-bridge resonance mode, and the hybrid half-bridge resonance mode). In some embodiments, dipoles $D_1$, $D_2$, $D_3$, and $D_4$ and capacitors $C_1$, $C_2$, $C_3$, and $C_4$ are further connected in parallel to the first bridge switch $SW_1$, the second bridge switch $SW_2$, the third bridge switch $SW_3$, and the fourth bridge switch $SW_4$ respectively, to assist in the operation of bridge resonance circuit 511.

In some embodiments, the second voltage regulation signal $S_2$ may include four switching signals $SW_1\_PWM$, $SW_2\_PWM$, $SW_3\_PWM$, and $SW_4\_PWM$ (as shown in FIG. 7A, FIG. 8A, FIG. 9A, FIG. 10A, FIG. 11A, FIG. 12A, and FIG. 13A) to respectively control the switching statuses of the first bridge switch $SW_1$, the second bridge switch $SW_2$, the third bridge switch $SW_3$, and the fourth bridge switch $SW_4$. For example, when the switching signal $SW_1\_PWM$ is a high level, the switching status of the first bridge switch $SW_1$ is on (conducting), and when the switching signal $SW_1\_PWM$ is a low level, the switching status of the first bridge switch $SW_1$ is off (cut off), and so on. In some embodiments, the switching signals $SW_1\_PWM$, $SW_2\_PWM$, $SW_3\_PWM$, and $SW_4\_PWM$ may be implemented by a PWM signal.

In some embodiments, adjusting the second sub-gain of the second gain of the full-half bridge resonance converter circuit 50 may include: reducing switching frequencies of the first bridge switch $SW_1$, the second bridge switch $SW_2$, the third bridge switch $SW_3$, and the fourth bridge switch $SW_4$ when the third voltage regulation signal $S_3$ indicates a voltage increase, to increase the second sub-gain, so that the supply voltage $V_s$ increases; and increasing the switching frequencies of the first bridge switch $SW_1$, the second bridge switch $SW_2$, the third bridge switch $SW_3$, and the fourth bridge switch $SW_4$ when the third voltage regulation signal $S_3$ indicates a voltage reduction, to reduce the second sub-gain, so that the supply voltage $V_s$ decreases. For example, the switching frequencies of the first bridge switch $SW_1$, the second bridge switch $SW_2$, the third bridge switch $SW_3$, and the fourth bridge switch $SW_4$ are controlled through on times (conduction times) of the first bridge switch $SW_1$, the second bridge switch $SW_2$, the third bridge switch $SW_3$, and the fourth bridge switch $SW_4$. Specifically, in a case that the switch duty cycle remains unchanged, when the on time (or the off time (cut off time)) changes, the switching frequency changes. For example, in a case that the switch duty cycle remains unchanged, when the on time (or the off time) increases, the switching frequency decreases, and when the on time (or the off time) decreases, the switching frequency increases. The voltage regulation control circuit 60 may carry information about the to-be-operate on times (or the to-be-operate off times) of the first bridge switch $SW_1$, the second bridge switch $SW_2$, the third bridge switch $SW_3$, and the fourth bridge switch $SW_4$ in the third voltage regulation signal $S_3$, so that the voltage feedback control circuit 70 may adjust the on times (or the off times) of the first bridge switch $SW_1$, the second bridge switch $SW_2$, the third bridge switch $SW_3$, and the fourth bridge switch $SW_4$ according to the third voltage regulation signal $S_3$, so as to change the switching frequencies of the first bridge switch $SW_1$, the second bridge switch $SW_2$, the third bridge switch $SW_3$, and the fourth bridge switch $SW_4$, thereby adjusting the second sub-gain of the second gain.

In some embodiments, the second gain may be expressed by using a formula 2. A2 is the second gain, A3 is the first sub-gain of the second gain, and A4 is the second sub-gain of the second gain. In the full-bridge resonance mode, the first sub-gain may be expressed by using a formula 3. In the half-bridge resonance mode or the hybrid half-bridge resonance mode, the first sub-gain may be expressed by using a formula 4. N is a turns ratio between the primary side inductor and the secondary side inductor of the transformer 53.

$$\frac{V_s}{V_{pfc}} = A3 \times A4 = A2 \quad \text{(Formula 2)}$$

$$\frac{1}{N} = A3 \quad \text{(Formula 3)}$$

$$\frac{1}{2N} = A3. \quad \text{(Formula 4)}$$

Figure 7A:
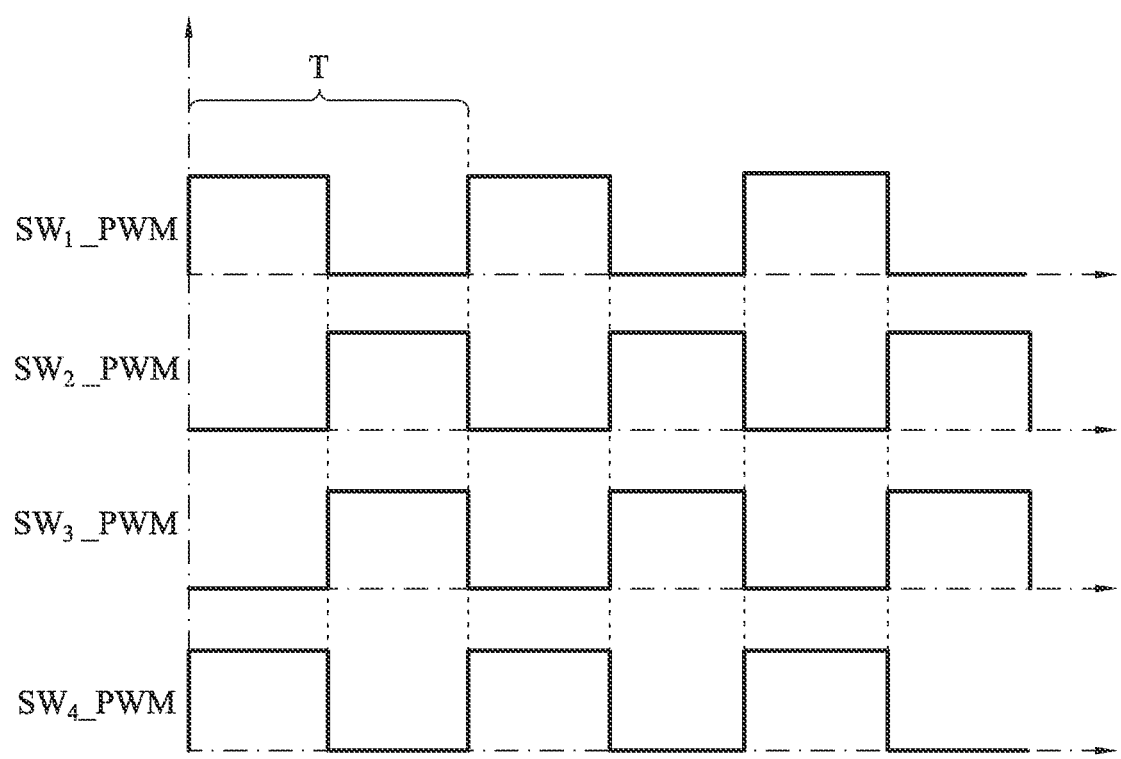
FIG. 7A is a schematic oscillogram of switching signals of the full-half bridge resonance converter circuit in a full-bridge resonance mode according to some embodiments of the present invention.
Figure 7B:
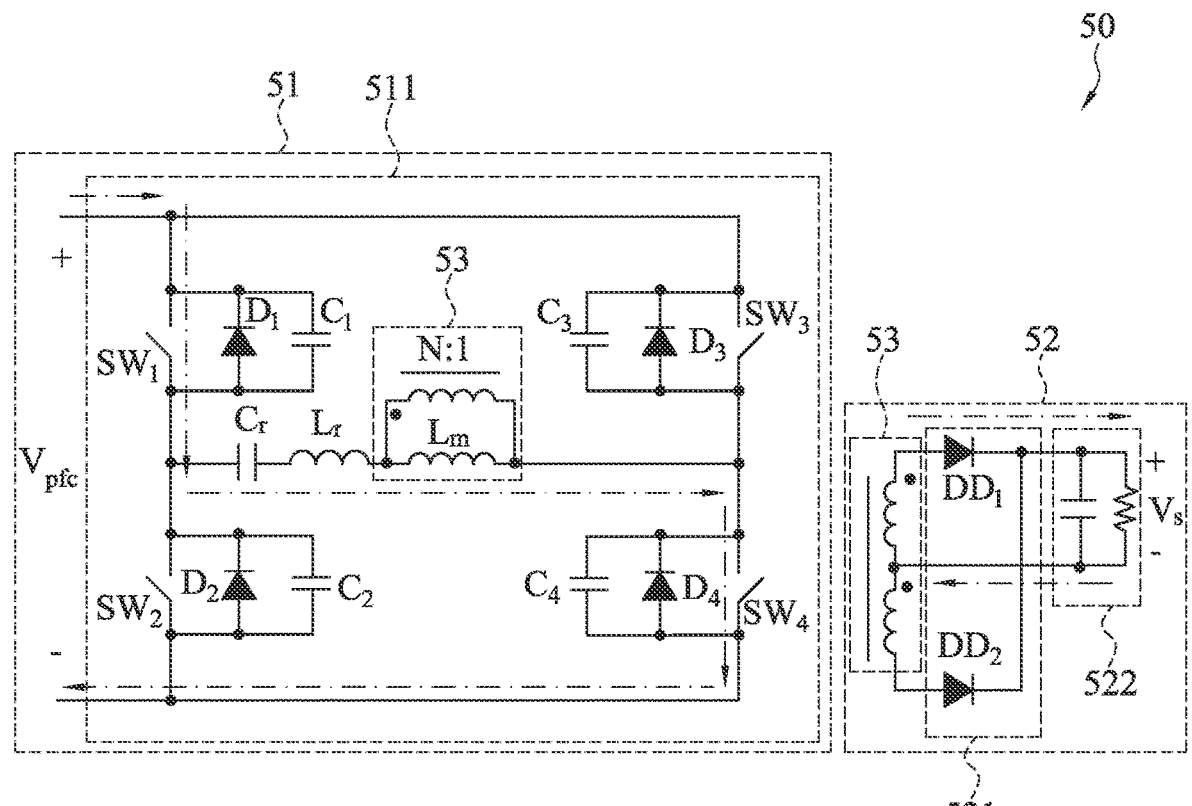
FIG. 7B is a schematic diagram of a current path of a first stage of a period of the full-half bridge resonance converter circuit in the full-bridge resonance mode according to some embodiments of the present invention.
Figure 7C:
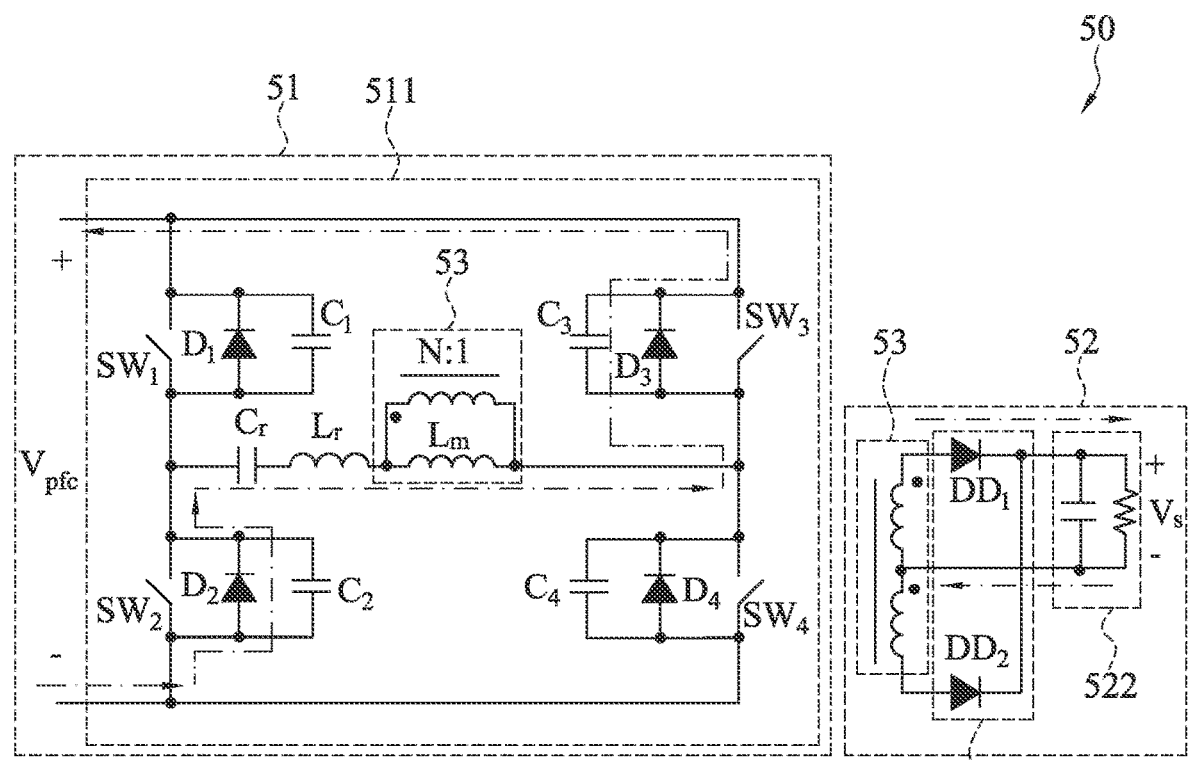
FIG. 7C is a schematic diagram of a current path of a second stage of the period of the full-half bridge resonance converter circuit in the full-bridge resonance mode according to some embodiments of the present invention.
Figure 7D:
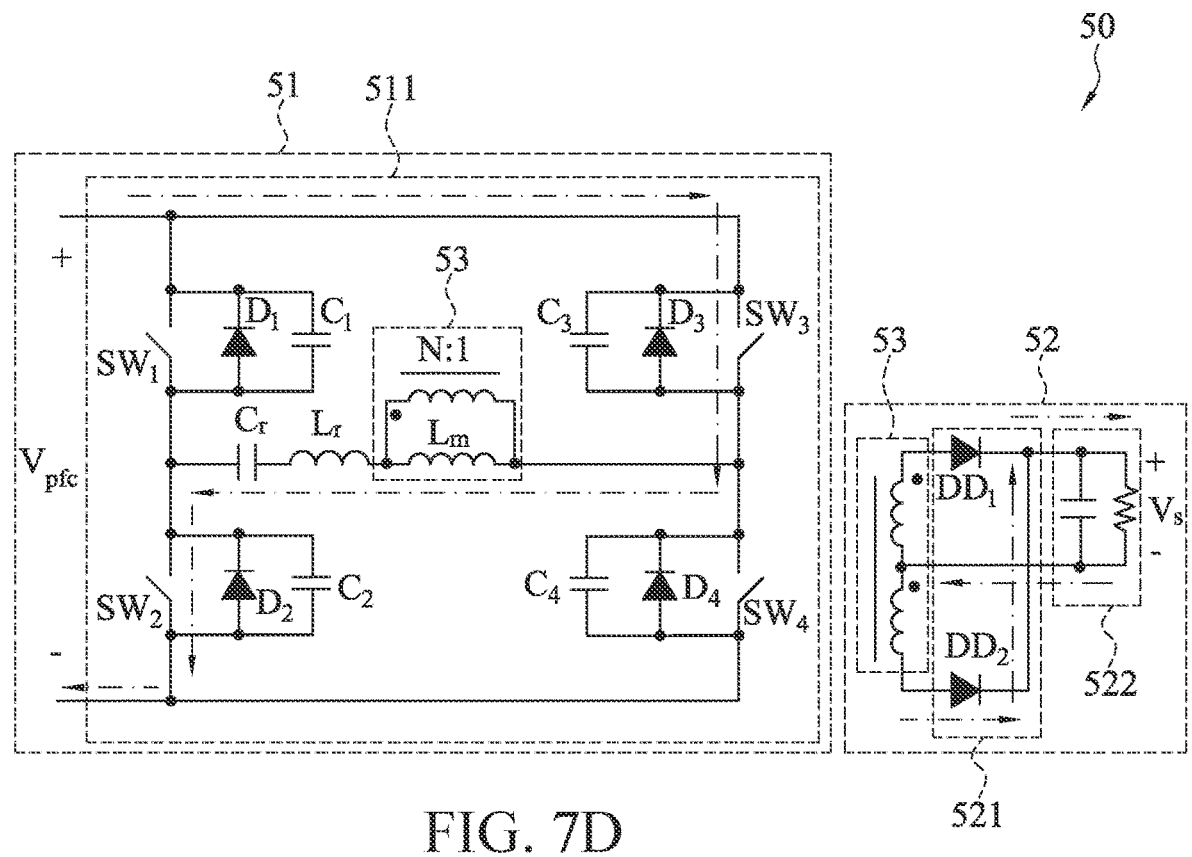
FIG. 7D is a schematic diagram of a current path of a third stage of the period of the full-half bridge resonance converter circuit in the full-bridge resonance mode according to some embodiments of the present invention.
Figure 7E:
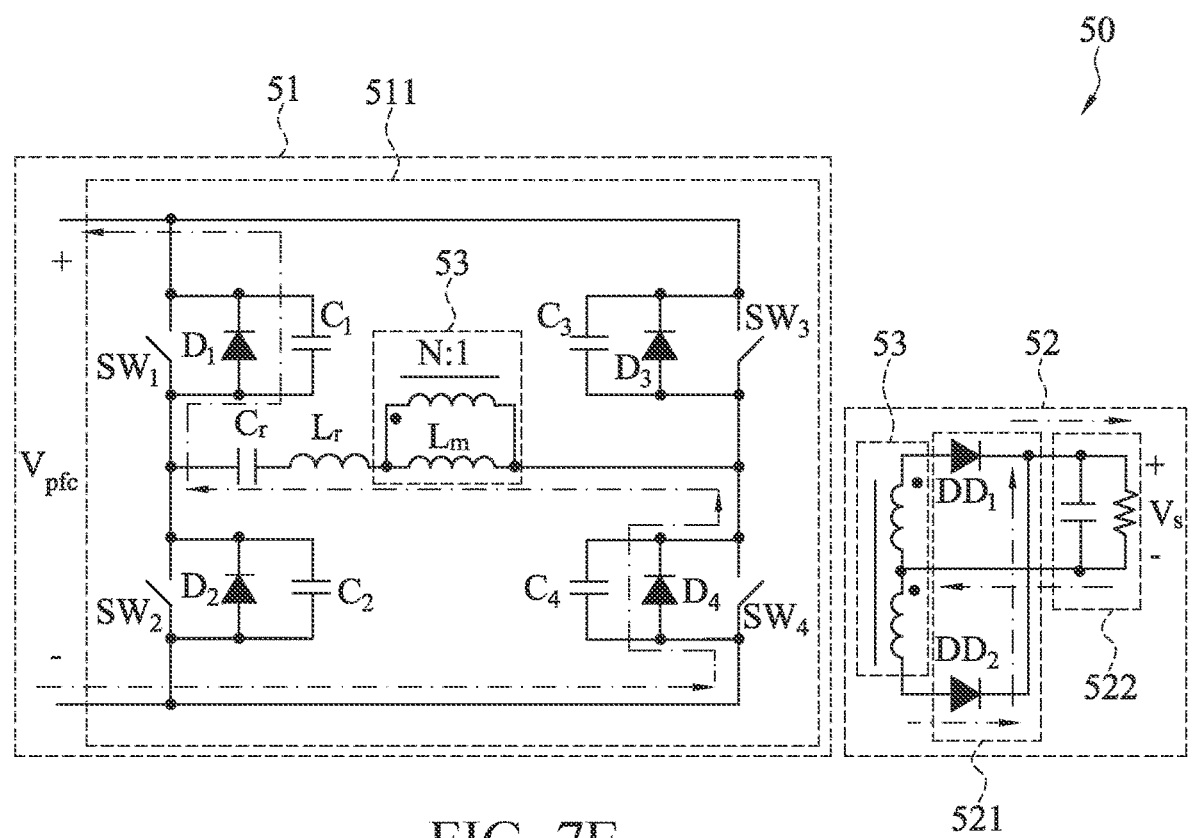
FIG. 7E is a schematic diagram of a current path of a fourth stage of the period of the full-half bridge resonance converter circuit in the full-bridge resonance mode according to some embodiments of the present invention.

Refer to FIG. 7A to FIG. 7E. FIG. 7A is a schematic oscillogram of switching signals $SW_1\_PWM$, $SW_2\_PWM$, $SW_3\_PWM$, and $SW_4\_PWM$ of the full-half bridge resonance converter circuit 50 in the full-bridge resonance mode according to some embodiments of the present invention. FIG. 7B is a schematic diagram of a current path of a first stage of a period T of the full-half bridge resonance converter circuit 50 in the full-bridge resonance mode according to some embodiments of the present invention. FIG. 7C is a schematic diagram of a current path of a second stage of the period T of the full-half bridge resonance converter circuit 50 in the full-bridge resonance mode according to some embodiments of the present invention. FIG. 7D is a schematic diagram of a current path of a third stage of the period T of the full-half bridge resonance converter circuit 50 in the full-bridge resonance mode according to some embodiments of the present invention. FIG. 7E is a schematic diagram of a current path of a fourth stage of the period T of the full-half bridge resonance converter circuit 50 in the full-bridge resonance mode according to some embodiments of the present invention.

In some embodiments, in a case that the full-half bridge resonance converter circuit 50 operates in the full-bridge resonance mode, the switching statuses of the first bridge switch $SW_1$ and the fourth bridge switch $SW_4$ are both on or off, the switching statuses of the second bridge switch $SW_2$ and the third bridge switch $SW_3$ are both on or off, and the switching statuses of the first bridge switch $SW_1$ and the second bridge switch $SW_2$ are mutually exclusively on or off, to excite the first resonance capacitor $C_r$, the first resonance inductor $L_r$, and the second resonance inductor $L_m$. The expression "mutually exclusively on or off" means that when the switching status of the first bridge switch $SW_1$ is on, the switching status of the second bridge switch $SW_2$ is off, or vice versa.

In some embodiments, in a case that the full-half bridge resonance converter circuit 50 operates in the full-bridge resonance mode, when the switching statuses of the first bridge switch $SW_1$ and the fourth bridge switch $SW_4$ are both on, the first bridge switch $SW_1$, the first resonance capacitor $C_r$, the first resonance inductor $L_r$, the second resonance inductor $L_m$, and the fourth bridge switch $SW_4$ form a first excitation path. When the switching statuses of the second bridge switch $SW_2$ and the third bridge switch $SW_3$ are both on, the second bridge switch $SW_2$, the first resonance capacitor $C_r$, the first resonance inductor $L_r$, the second resonance inductor $L_m$, and the third bridge switch $SW_3$ form a second excitation path.

In some embodiments, each change to the switching statuses of the first bridge switch $SW_1$, the second bridge switch $SW_2$, the third bridge switch $SW_3$, and the fourth bridge switch $SW_4$ may be separated by a time interval, to avoid misoperation of the first bridge switch $SW_1$, the second bridge switch $SW_2$, the third bridge switch $SW_3$, and the fourth bridge switch $SW_4$.

For brevity, only the period T of the full-bridge resonance mode is described below. As shown in FIG. 7A and FIG. 7B, in the first stage of the period T of the full-bridge resonance mode (that is, the switching statuses of the first bridge switch $SW_1$ and the fourth bridge switch $SW_4$ are both on), a current of the bridge resonance circuit 511 (shown by the dash-dot line in FIG. 7B) successively flows through the first bridge switch $SW_1$, the first resonance capacitor $C_r$, the first resonance inductor $L_r$, the second resonance inductor $L_m$, and the fourth bridge switch $SW_4$, to excite the first resonance capacitor $C_r$, the first resonance inductor $L_r$, and the second resonance inductor $L_m$ to form the first excitation path. Furthermore, the first rectifier switch DD1 of the synchronous rectifier circuit 521 is turned on (conducted) so that the bridge resonance circuit 511 can transfer energy to the filter circuit 522 through the transformer 53 and the first rectifier switch DD1.

As shown in FIG. 7A and FIG. 7C, in the second stage of the period T of the full-bridge resonance mode (that is, before the switching statuses of the second bridge switch $SW_2$ and the third bridge switch $SW_3$ are both on), due to a resonance effect and a current freewheeling characteristic, the bridge resonance circuit 511 charges/discharges the capacitors $C_1$, $C_2$, $C_3$, and $C_4$, and a current of the bridge resonance circuit 511 (shown by the dash-dot line in FIG. 7C) maintains the excitation of the first resonance capacitor $C_r$, the first resonance inductor $L_r$, and the second resonance inductor $L_m$ through diodes $D_2$ and $D_3$.

As shown in FIG. 7A and FIG. 7D, in the third stage of the period T of the full-bridge resonance mode (that is, the switching statuses of the second bridge switch $SW_2$ and the third bridge switch $SW_3$ are both on), a current of the bridge resonance circuit 511 (shown by the dash-dot line in FIG. 7D) successively flows through the third bridge switch $SW_3$, the second resonance inductor $L_m$, the first resonance inductor $L_r$, the first resonance capacitor $C_r$, and the second bridge switch $SW_2$, to excite the first resonance capacitor $C_r$, the first resonance inductor $L_r$, and the second resonance inductor $L_m$ to form the second excitation path. Furthermore, the second rectifier switch DD2 of the synchronous rectifier circuit 521 is turned on (conducted) so that the bridge resonance circuit 511 can transfer energy to the filter circuit 522 through the transformer 53 and the second rectifier switch DD2.

As shown in FIG. 7A and FIG. 7E, in the fourth stage of the period T of the full-bridge resonance mode (that is, before the switching statuses of the first bridge switch $SW_1$ and the fourth bridge switch $SW_4$ are both on next time), due to a resonance effect and a current freewheeling characteristic, the bridge resonance circuit 511 charges/discharges the capacitors $C_1$, $C_2$, $C_3$, and $C_4$, and a current of the bridge resonance circuit 511 (shown by the dash-dot line in FIG. 7E) maintains the excitation of the first resonance capacitor $C_r$, the first resonance inductor $L_r$, and the second resonance inductor $L_m$ through diodes $D_1$ and $D_4$. After the period T ends, another period proceeds and the four stages of period T of the full-bridge resonance mode are repeated.

Figure 8A:
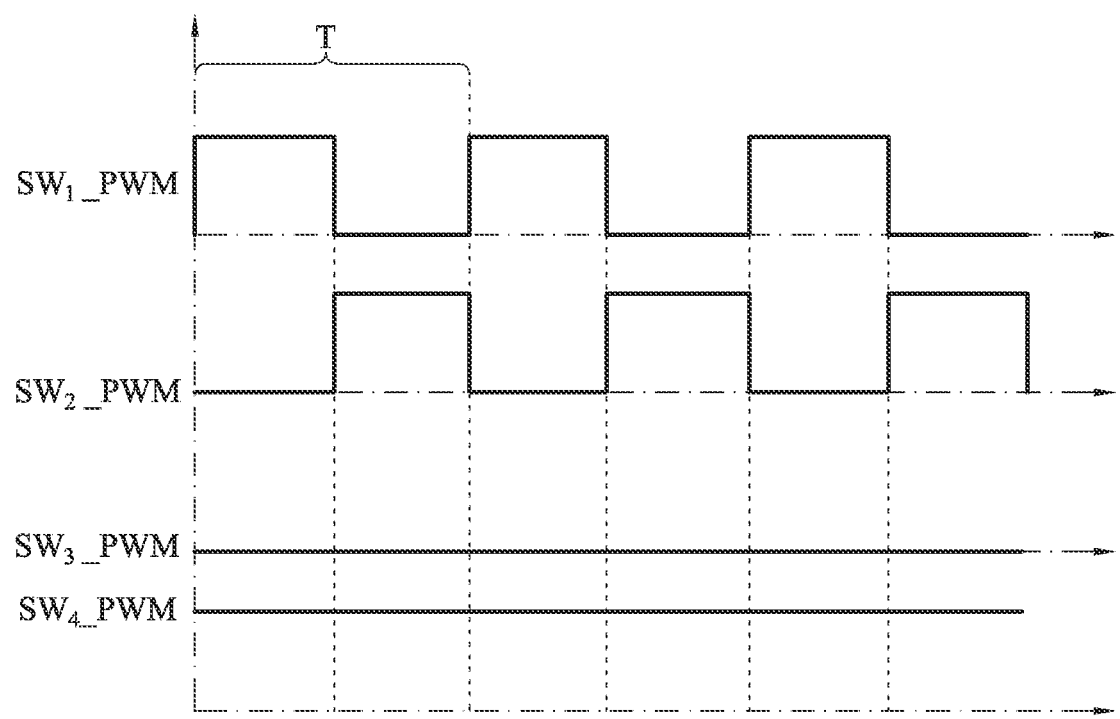
FIG. 8A is a schematic oscillogram of a first embodiment of switching signals of the full-half bridge resonance converter circuit in a half-bridge resonance mode according to the present invention.
Figure 8B:
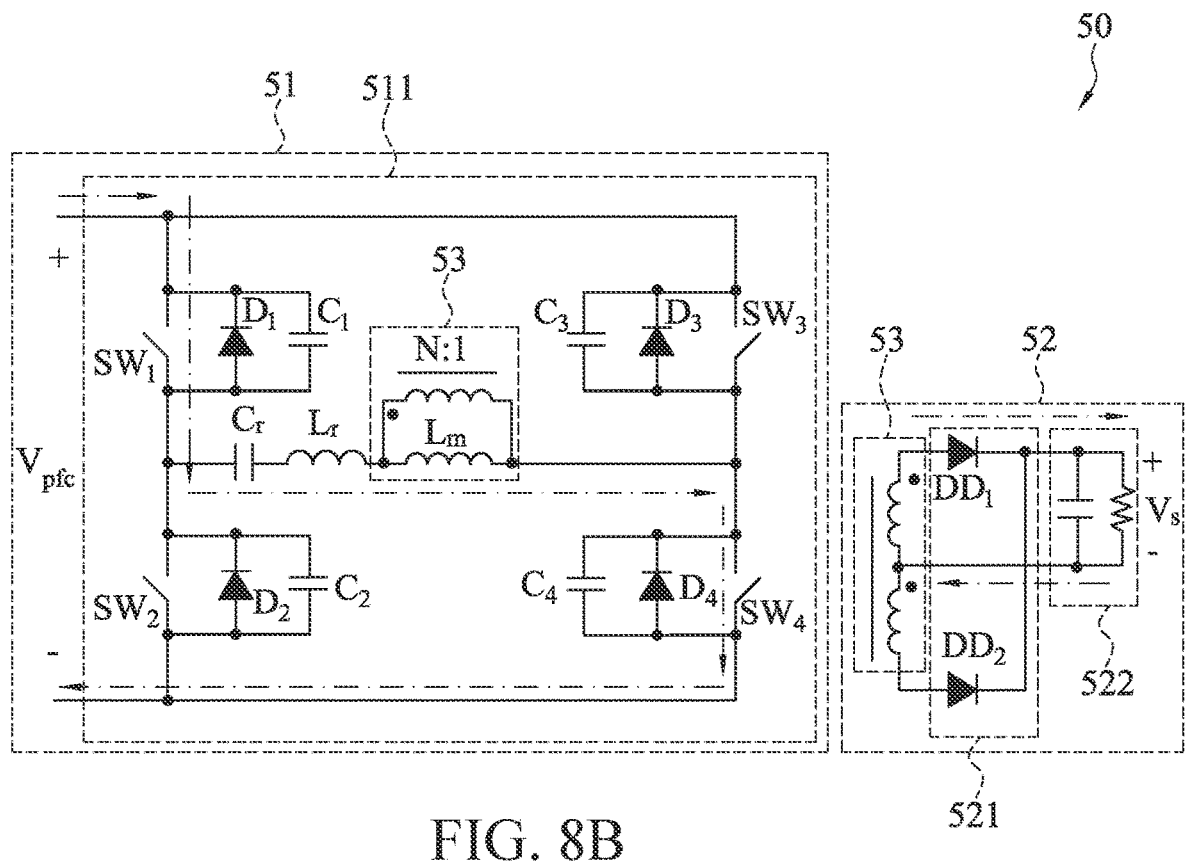
FIG. 8B is a schematic diagram of a first embodiment of a current path of a first stage of a period of the full-half bridge resonance converter circuit in the half-bridge resonance mode according to the present invention.
Figure 8C:
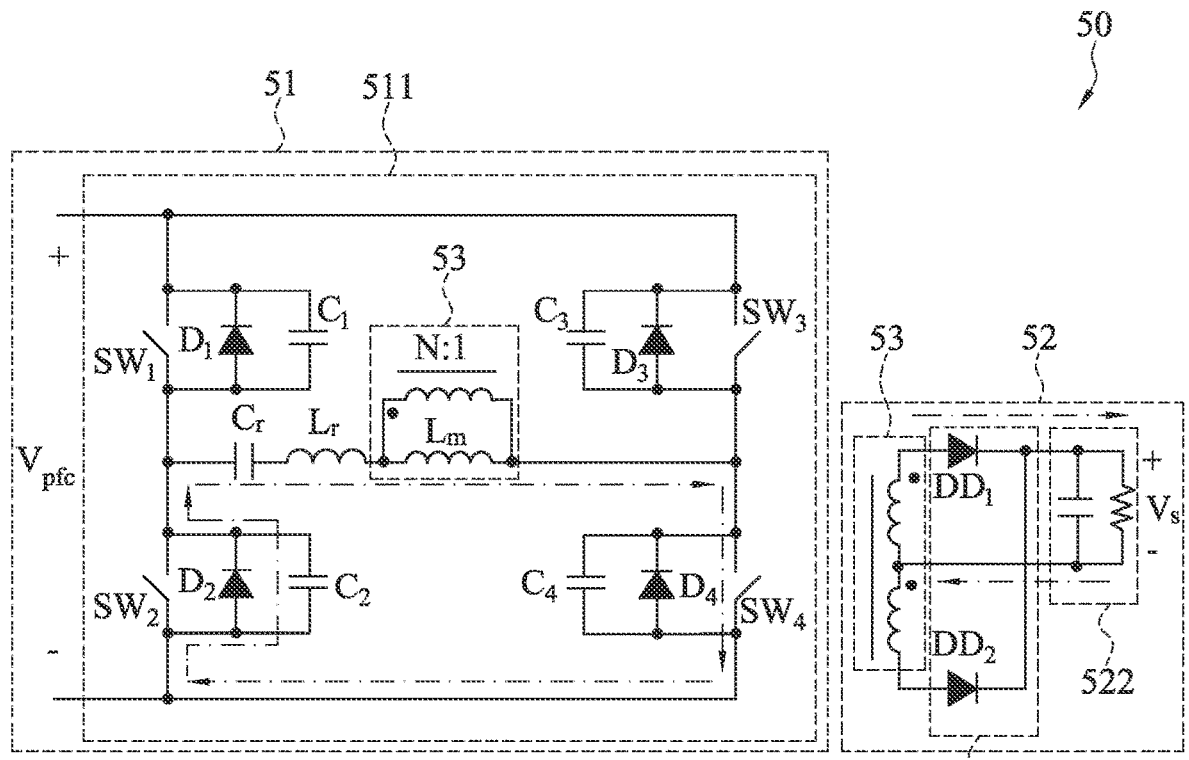
FIG. 8C is a schematic diagram of a first embodiment of a current path of a second stage of the period of the full-half bridge resonance converter circuit in the half-bridge resonance mode according to the present invention.
Figure 8D:
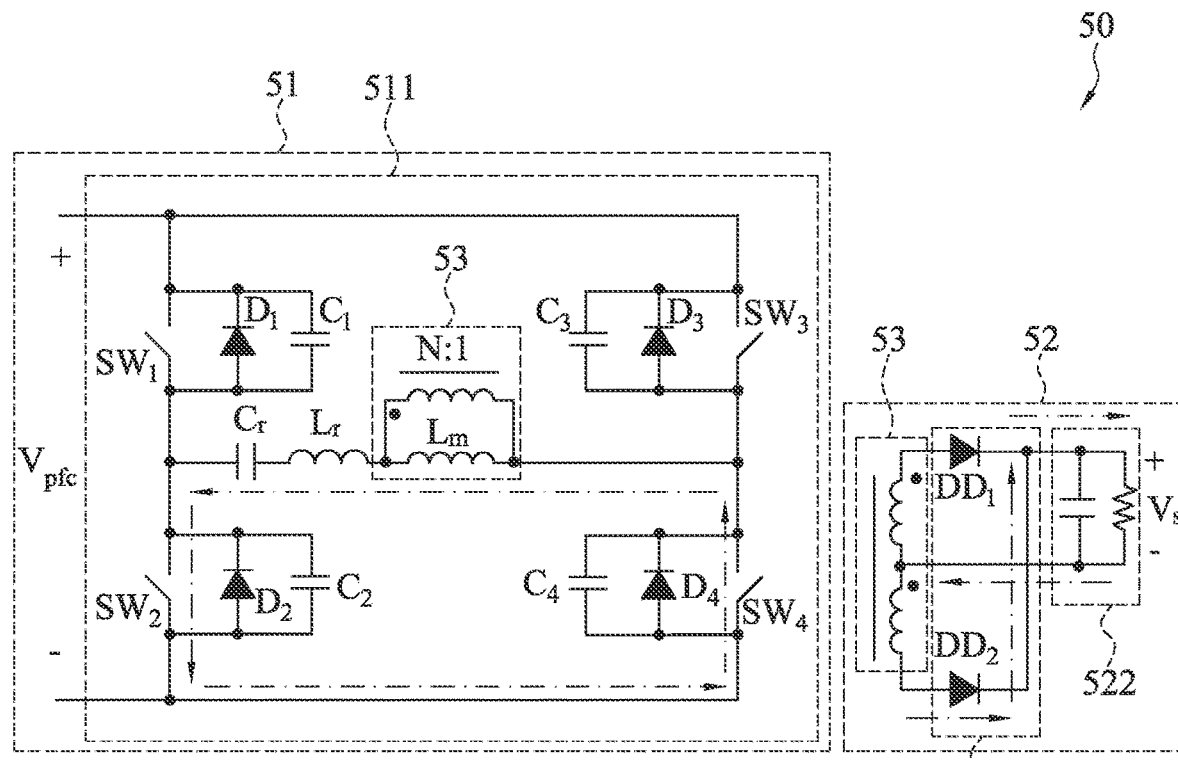
FIG. 8D is a schematic diagram of a first embodiment of a current path of a third stage of the period of the full-half bridge resonance converter circuit in the half-bridge resonance mode according to the present invention.
Figure 8E:
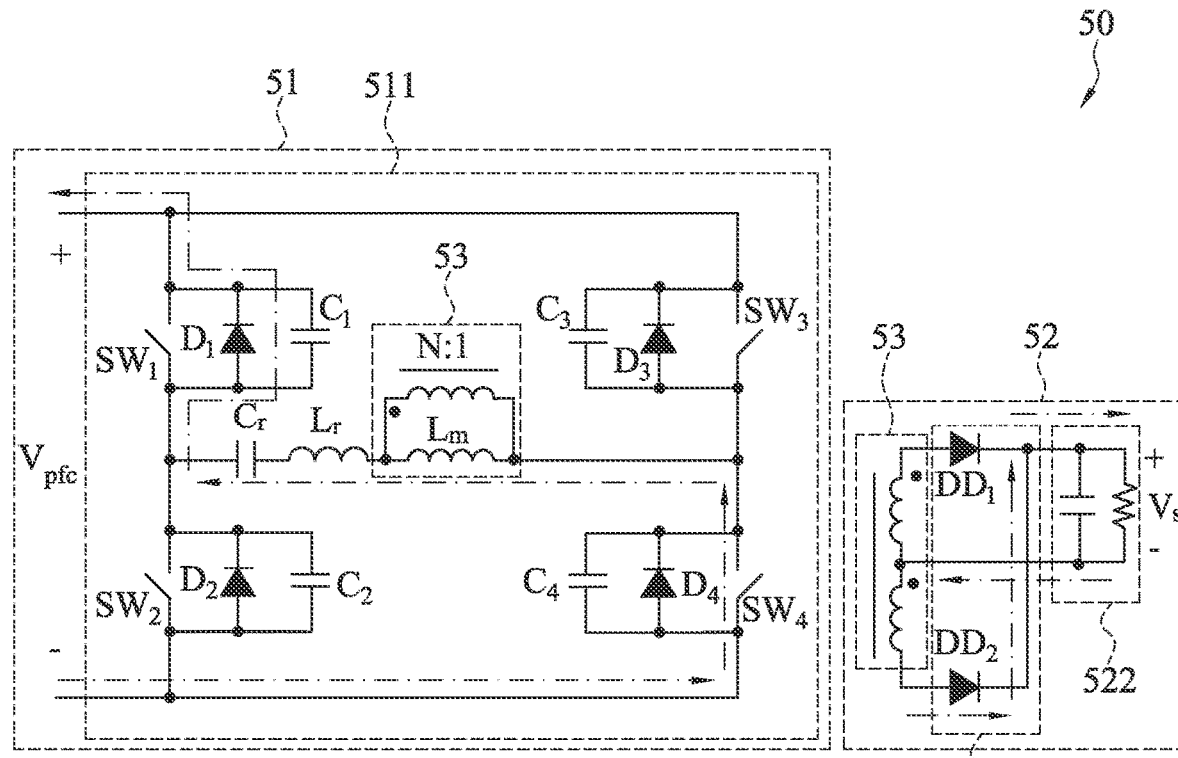
FIG. 8E is a schematic diagram of a first embodiment of a current path of a fourth stage of the period of the full-half bridge resonance converter circuit in the half-bridge resonance mode according to the present invention.

Refer to FIG. 8A to FIG. 8E. FIG. 8A is a schematic oscillogram of a first embodiment of switching signals $SW_1\_PWM$, $SW_2\_PWM$, $SW_3\_PWM$, and $SW_4\_PWM$ of the full-half bridge resonance converter circuit 50 in the half-bridge resonance mode according to the present invention. FIG. 8B is a schematic diagram of a first embodiment of a current path of a first stage of a period T of the full-half bridge resonance converter circuit 50 in the half-bridge resonance mode according to the present invention. FIG. 8C is a schematic diagram of a first embodiment of a current path of a second stage of the period T of the full-half bridge resonance converter circuit 50 in the half-bridge resonance mode according to the present invention. FIG. 8D is a schematic diagram of a first embodiment of a current path of a third stage of the period T of the full-half bridge resonance converter circuit 50 in the half-bridge resonance mode according to the present invention. FIG. 8E is a schematic diagram of a first embodiment of a current path of a fourth stage of the period T of the full-half bridge resonance converter circuit 50 in the half-bridge resonance mode according to the present invention.

The half-bridge resonance mode is described below by using four embodiments (as shown in FIG. 8A to FIG. 11E). In the first embodiment (as shown in FIG. 8A to FIG. 8E), in a case that the full-half bridge resonance converter circuit 50 operates in the half-bridge resonance mode, the switching status of the third bridge switch $SW_3$ is off, the switching status of the fourth bridge switch $SW_4$ is on, and the switching statuses of the first bridge switch $SW_1$ and the second bridge switch $SW_2$ are mutually exclusively on or off, to excite the first resonance capacitor $C_r$, the first resonance inductor $L_r$, and the second resonance inductor $L_m$. The expression "mutually exclusively on or off" means that when the switching status of the first bridge switch $SW_1$ is on, the switching status of the second bridge switch $SW_2$ is off, or vice versa.

For brevity, only the period T of the half-bridge resonance mode in the first embodiment is described below. As shown in FIG. 8A and FIG. 8B, the switching status of the third bridge switch $SW_3$ is off, and the switching status of the fourth bridge switch $SW_4$ is on. In the first stage of the period T of the half-bridge resonance mode (that is, the switching status of the first bridge switch $SW_1$ is on), a current of the bridge resonance circuit 511 (shown by the dash-dot line in FIG. 8B) successively flows through the first bridge switch $SW_1$, the first resonance capacitor $C_r$, the first resonance inductor $L_r$, the second resonance inductor $L_m$, and the fourth bridge switch $SW_4$, to excite the first resonance capacitor $C_r$, the first resonance inductor $L_r$, and the second resonance inductor $L_m$ to form an excitation path. Furthermore, the first rectifier switch DD1 of the synchronous rectifier circuit 521 is turned on so that the bridge resonance circuit 511 can transfer energy to the filter circuit 522 through the transformer 53 and the first rectifier switch DD1.

As shown in FIG. 8A and FIG. 8C, in the second stage of the period T of the half-bridge resonance mode (that is, before the switching status of the second bridge switch $SW_2$ is on), due to a resonance effect and a current freewheeling characteristic, the bridge resonance circuit 511 charges/discharges the capacitors $C_1$, $C_2$, $C_3$, and $C_4$, and a current of the bridge resonance circuit 511 (shown by the dash-dot line in FIG. 8C) maintains the excitation of the first resonance capacitor $C_r$, the first resonance inductor $L_r$, and the second resonance inductor $L_m$ through the diode $D_2$ and the fourth bridge switch $SW_4$.

As shown in FIG. 8A and FIG. 8D, in the third stage of the period T of the half-bridge resonance mode (that is, the switching status of the second bridge switch $SW_2$ is on), a current of the bridge resonance circuit 511 (shown by the dash-dot line in FIG. 8D) successively flows through the second bridge switch $SW_2$, the fourth bridge switch $SW_4$, the second resonance inductor $L_m$, the first resonance inductor $L_r$, and the first resonance capacitor $C_r$, to excite the first resonance capacitor $C_r$, the first resonance inductor $L_r$, and the second resonance inductor $L_m$ to form an excitation path. Furthermore, the second rectifier switch DD2 of the synchronous rectifier circuit 521 is turned on so that the bridge resonance circuit 511 can transfer energy to the filter circuit 522 through the transformer 53 and the second rectifier switch DD2.

As shown in FIG. 8A and FIG. 8E, in the fourth stage of the period T of the half-bridge resonance mode (that is, before the switching status of the first bridge switch $SW_1$ is on next time), due to a resonance effect and a current freewheeling characteristic, the bridge resonance circuit 511 charges/discharges the capacitors $C_1$, $C_2$, $C_3$, and $C_4$, and a current of the bridge resonance circuit 511 (shown by the dash-dot line in FIG. 8E) maintains the excitation of the first resonance capacitor $C_r$, the first resonance inductor $L_r$, and the second resonance inductor $L_m$ through the diode $D_1$ and the fourth bridge switch $SW_4$. After the period T ends, another period T proceeds and the four stages of period T of the half-bridge resonance mode are repeated.

Figure 9A:
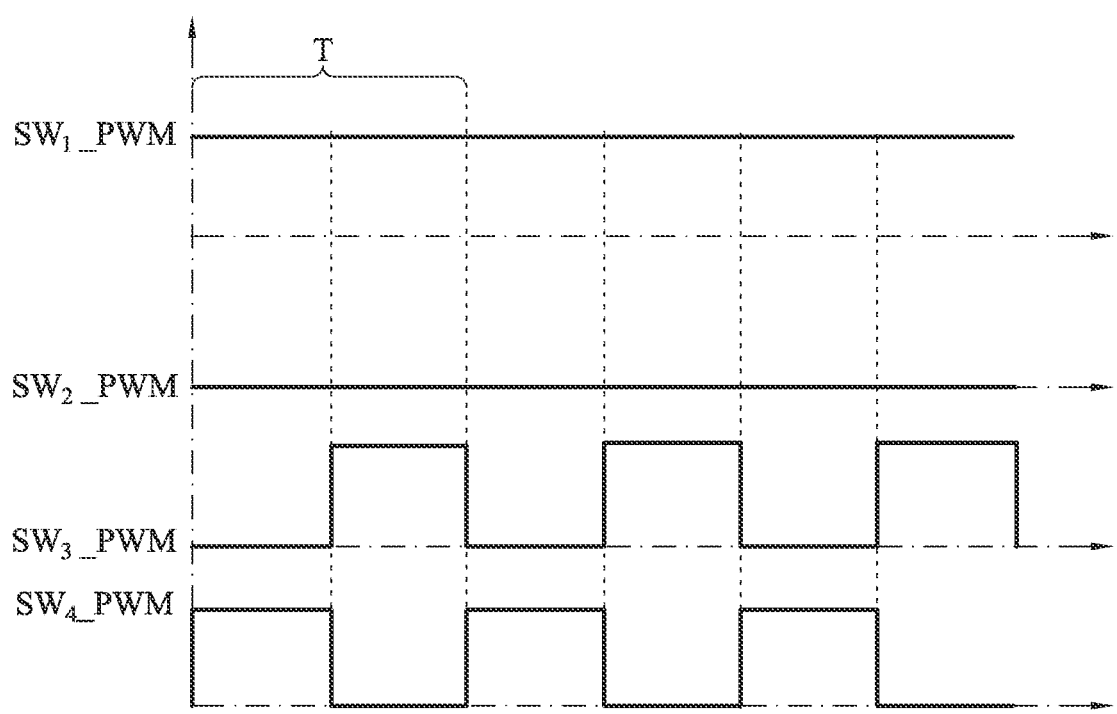
FIG. 9A is a schematic oscillogram of a second embodiment of the switching signals of the full-half bridge resonance converter circuit in the half-bridge resonance mode according to the present invention.
Figure 9B:
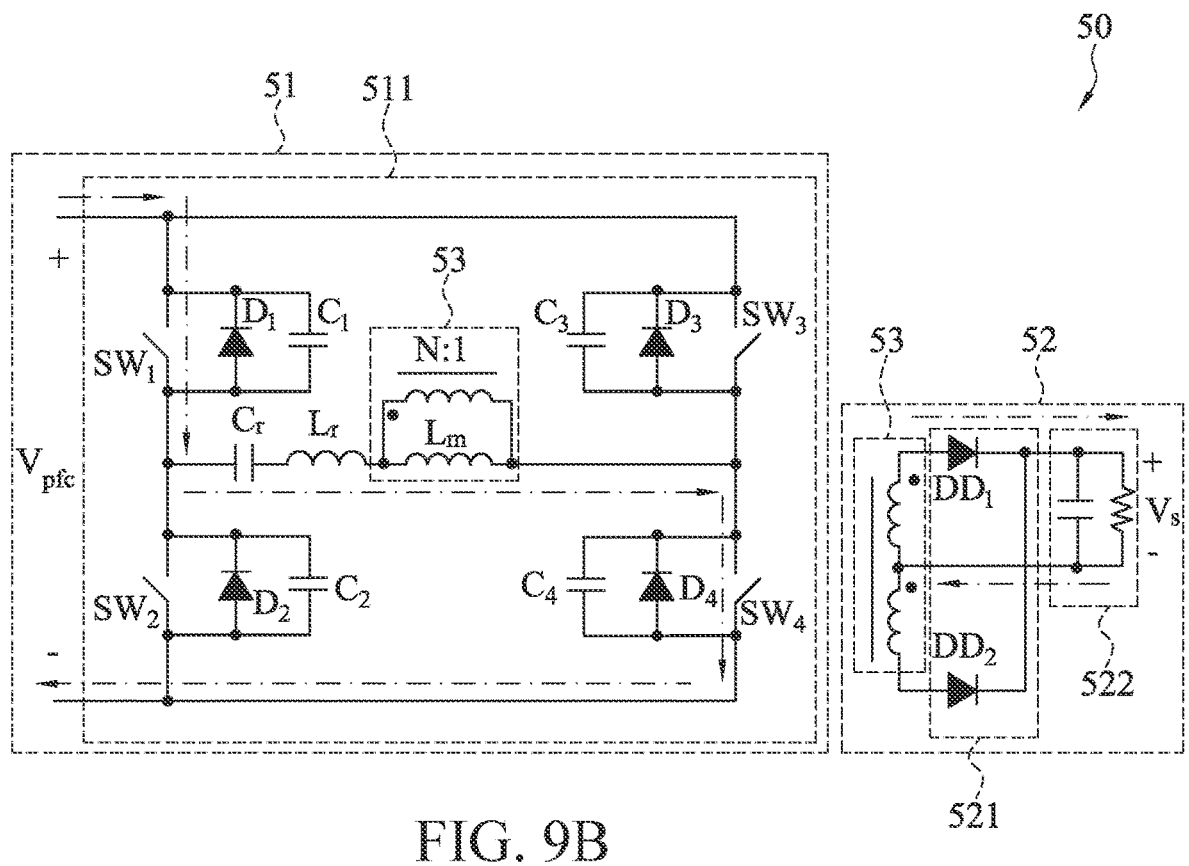
FIG. 9B is a schematic diagram of a second embodiment of the current path of the first stage of the period of the full-half bridge resonance converter circuit in the half-bridge resonance mode according to the present invention.
Figure 9C:
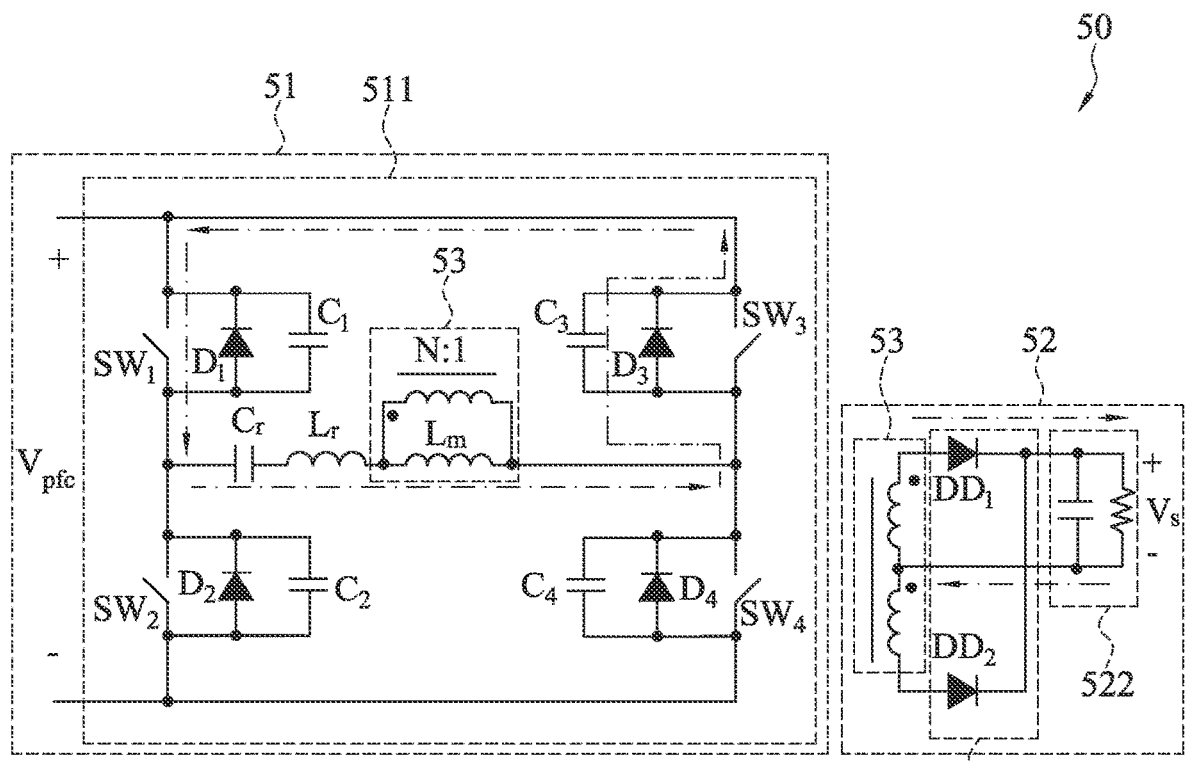
FIG. 9C is a schematic diagram of a second embodiment of the current path of the second stage of the period of the full-half bridge resonance converter circuit in the half-bridge resonance mode according to the present invention.
Figure 9D:
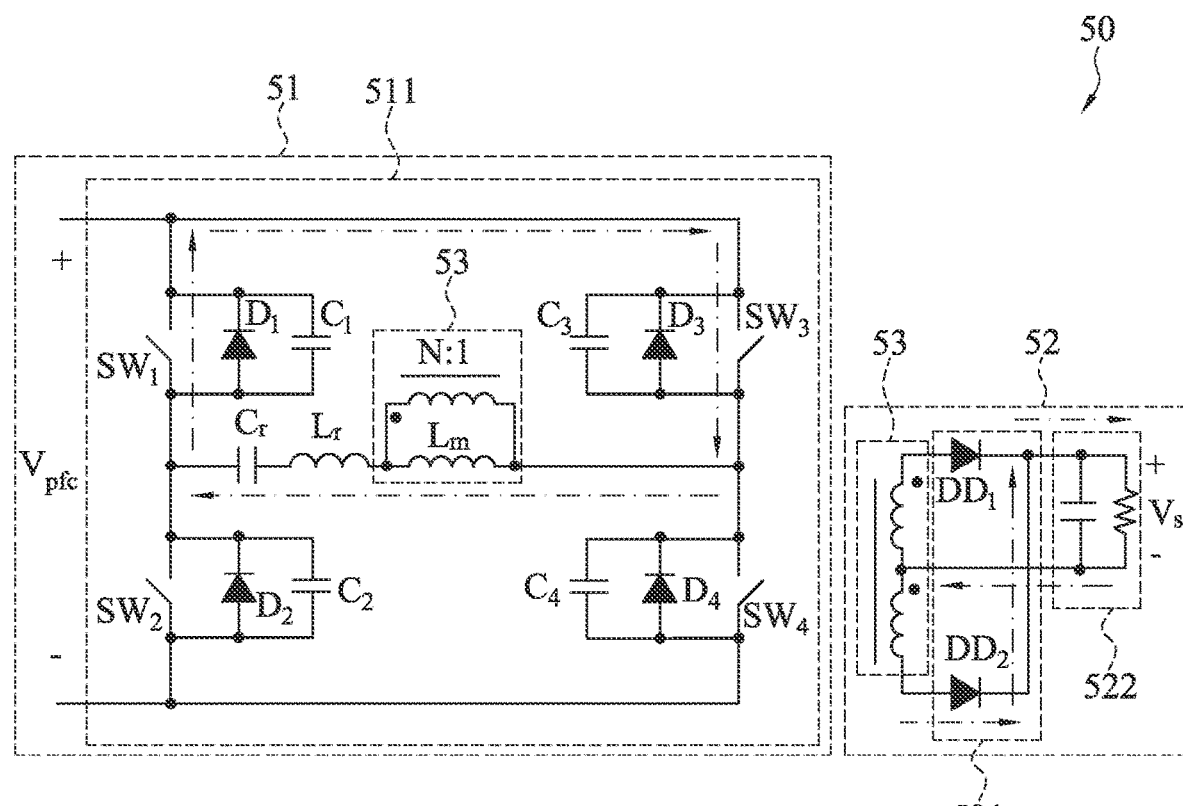
FIG. 9D is a schematic diagram of a second embodiment of the current path of the third stage of the period of the full-half bridge resonance converter circuit in the half-bridge resonance mode according to the present invention.
Figure 9E:
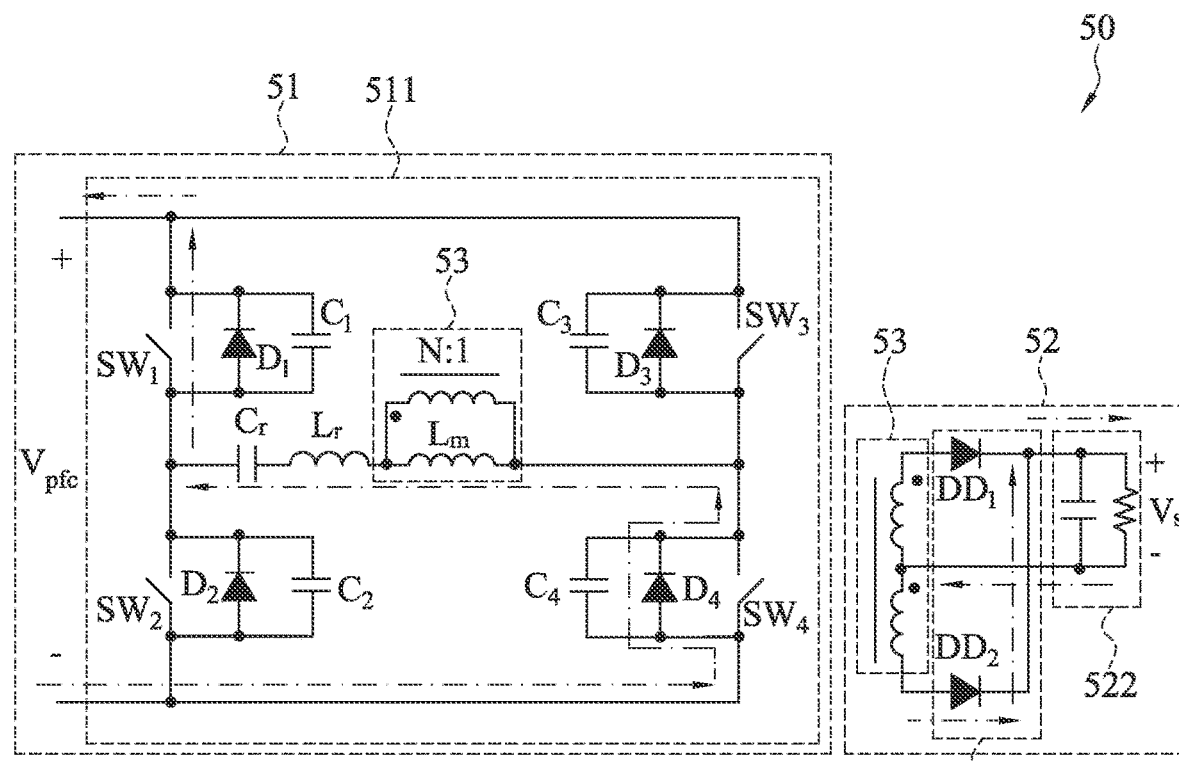
FIG. 9E is a schematic diagram of a second embodiment of the current path of the fourth stage of the period of the full-half bridge resonance converter circuit in the half-bridge resonance mode according to the present invention.

Refer to FIG. 9A to FIG. 9E. FIG. 9A is a schematic oscillogram of a second embodiment of the switching signals $SW_1\_PWM$, $SW_2\_PWM$, $SW_3\_PWM$, and $SW_4\_PWM$ of the full-half bridge resonance converter circuit 50 in the half-bridge resonance mode according to the present invention. FIG. 9B is a schematic diagram of a second embodiment of the current path of the first stage of the period T of the full-half bridge resonance converter circuit 50 in the half-bridge resonance mode according to the present invention. FIG. 9C is a schematic diagram of a second embodiment of the current path of the second stage of the period T of the full-half bridge resonance converter circuit 50 in the half-bridge resonance mode according to the present invention. FIG. 9D is a schematic diagram of a second embodiment of the current path of the third stage of the period T of the full-half bridge resonance converter circuit 50 in the half-bridge resonance mode according to the present invention. FIG. 9E is a schematic diagram of a second embodiment of the current path of the fourth stage of the period T of the full-half bridge resonance converter circuit 50 in the half-bridge resonance mode according to the present invention.

Different from the first embodiment of the half-bridge resonance mode, in the second embodiment, in a case that the full-half bridge resonance converter circuit 50 operates in the half-bridge resonance mode, the switching status of the first bridge switch $SW_1$ is on, the switching status of the second bridge switch $SW_2$ is off, and the switching statuses of the third bridge switch $SW_3$ and the fourth bridge switch $SW_4$ are mutually exclusively on or off, to excite the first resonance capacitor $C_r$, the first resonance inductor $L_r$, and the second resonance inductor $L_m$. The expression "mutually exclusively on or off" means that when the switching status of the third bridge switch $SW_3$ is on, the switching status of the fourth bridge switch $SW_4$ is off, or vice versa. Specifically, in the first stage of the period T of the half-bridge resonance mode (that is, the switching status of the fourth bridge switch $SW_4$ is on), a current of the bridge resonance circuit 511 (shown by the dash-dot line in FIG. 9B) successively flows through the first bridge switch $SW_1$, the first resonance capacitor $C_r$, the first resonance inductor $L_r$, the second resonance inductor $L_m$, and the fourth bridge switch $SW_4$, to excite the first resonance capacitor $C_r$, the first resonance inductor $L_r$, and the second resonance inductor $L_m$ to form an excitation path, and the first rectifier switch DD1 of the synchronous rectifier circuit 521 is turned on. In the second stage of the period T of the half-bridge resonance mode (that is, before the switching status of the third bridge switch $SW_3$ is on), the bridge resonance circuit 511 charges/discharges the capacitors $C_1$, $C_2$, $C_3$, and $C_4$, and a current of the bridge resonance circuit 511 (shown by the dash-dot line in FIG. 9C) maintains the excitation of the first resonance capacitor $C_r$, the first resonance inductor $L_r$, and the second resonance inductor $L_m$ through the diode $D_3$ and the first bridge switch $SW_1$. In the third stage of the period T of the half-bridge resonance mode (that is, the switching status of the third bridge switch $SW_3$ is on), a current of the bridge resonance circuit 511 (shown by the dash-dot line in FIG. 9D) successively flows through the first bridge switch $SW_1$, the third bridge switch $SW_3$, the second resonance inductor $L_m$, the first resonance inductor $L_r$, and the first resonance capacitor $C_r$, to excite the first resonance capacitor $C_r$, the first resonance inductor $L_r$, and the second resonance inductor $L_m$ to form an excitation path, and the second rectifier switch DD2 of the synchronous rectifier circuit 521 is turned on. In the fourth stage of the period T of the half-bridge resonance mode (that is, before the switching status of the fourth bridge switch $SW_4$ is on next time), the bridge resonance circuit 511 charges/discharges the capacitors $C_1$, $C_2$, $C_3$, and $C_4$, and a current of the bridge resonance circuit 511 (shown by the dash-dot line in FIG. 9E) maintains the excitation of the first resonance capacitor $C_r$, the first resonance inductor $L_r$, and the second resonance inductor $L_m$ through a diode $D_4$ and the first bridge switch $SW_1$.

Figure 10A:
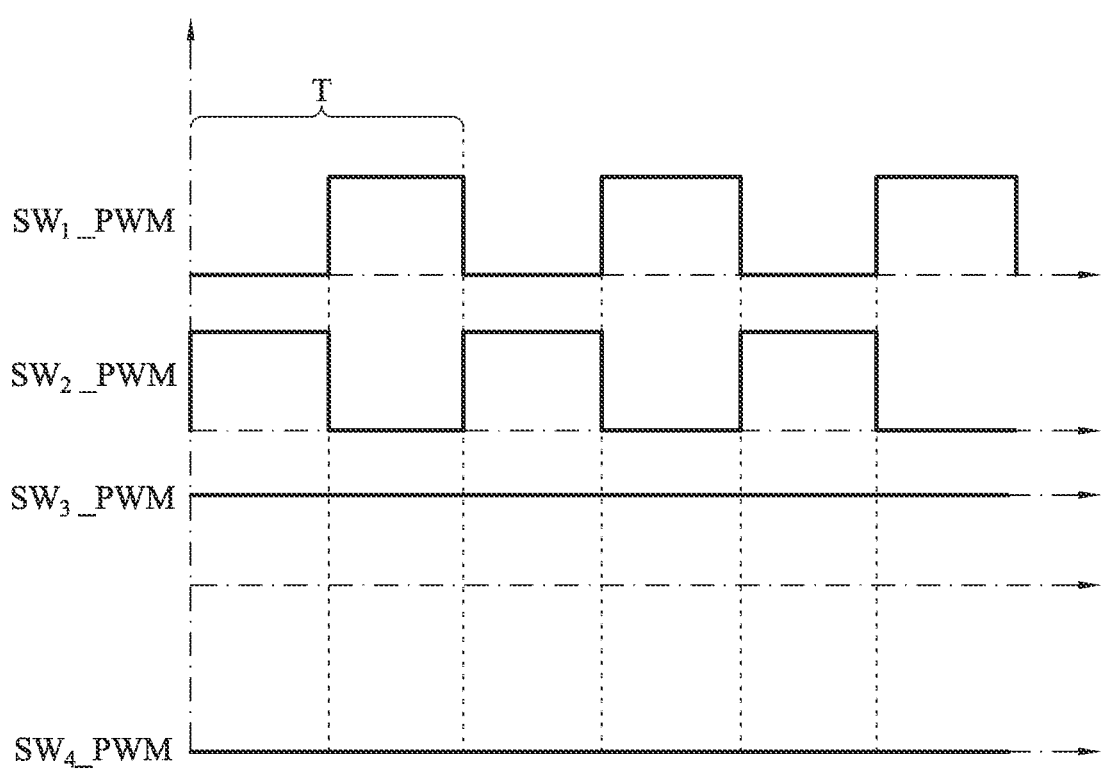
FIG. 10A is a schematic oscillogram of a third embodiment of the switching signals of the full-half bridge resonance converter circuit in the half-bridge resonance mode according to the present invention.
Figure 10B:
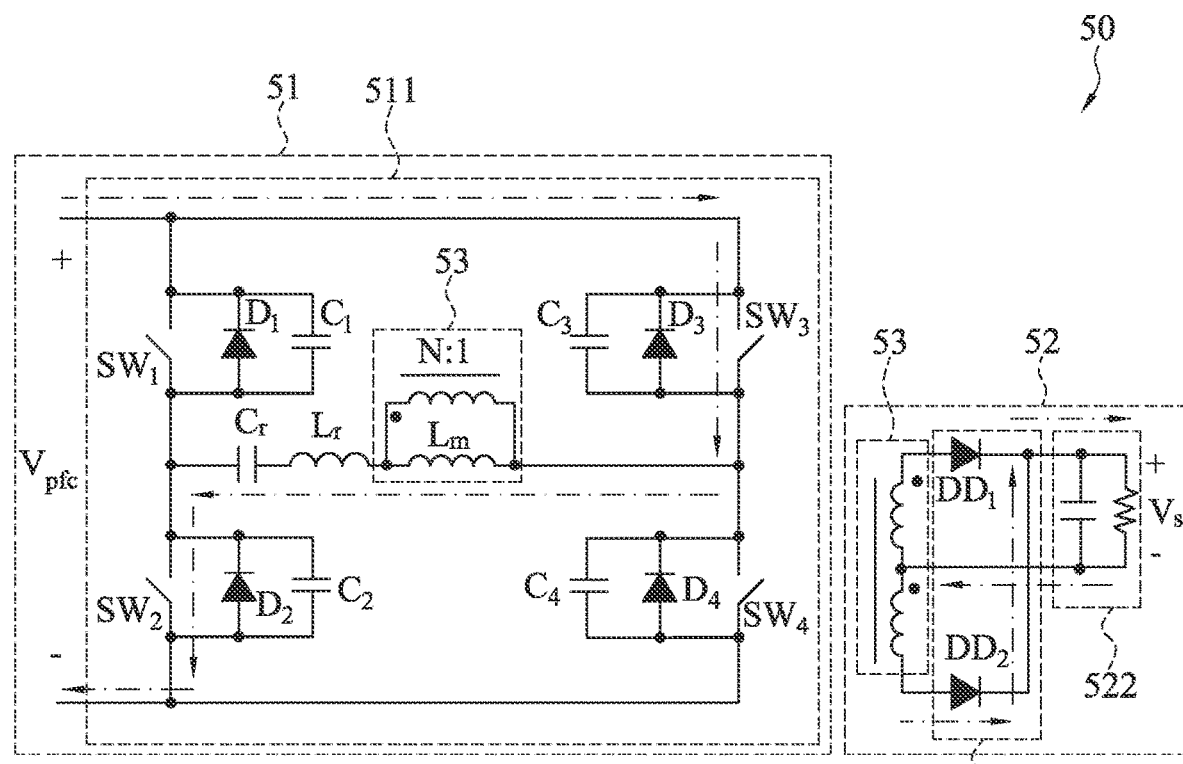
FIG. 10B is a schematic diagram of a third embodiment of the current path of the first stage of the period of the full-half bridge resonance converter circuit in the half-bridge resonance mode according to the present invention.
Figure 10C:
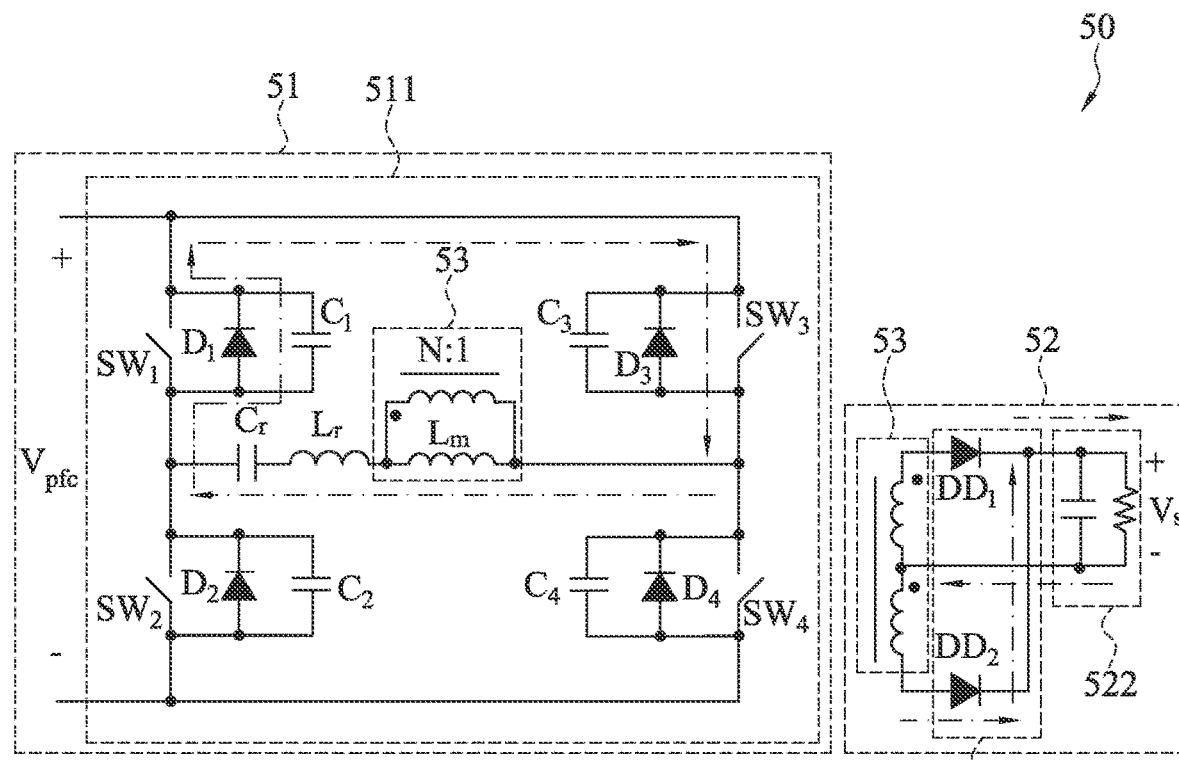
FIG. 10C is a schematic diagram of a third embodiment of the current path of the second stage of the period of the full-half bridge resonance converter circuit in the half-bridge resonance mode according to the present invention.
Figure 10D:
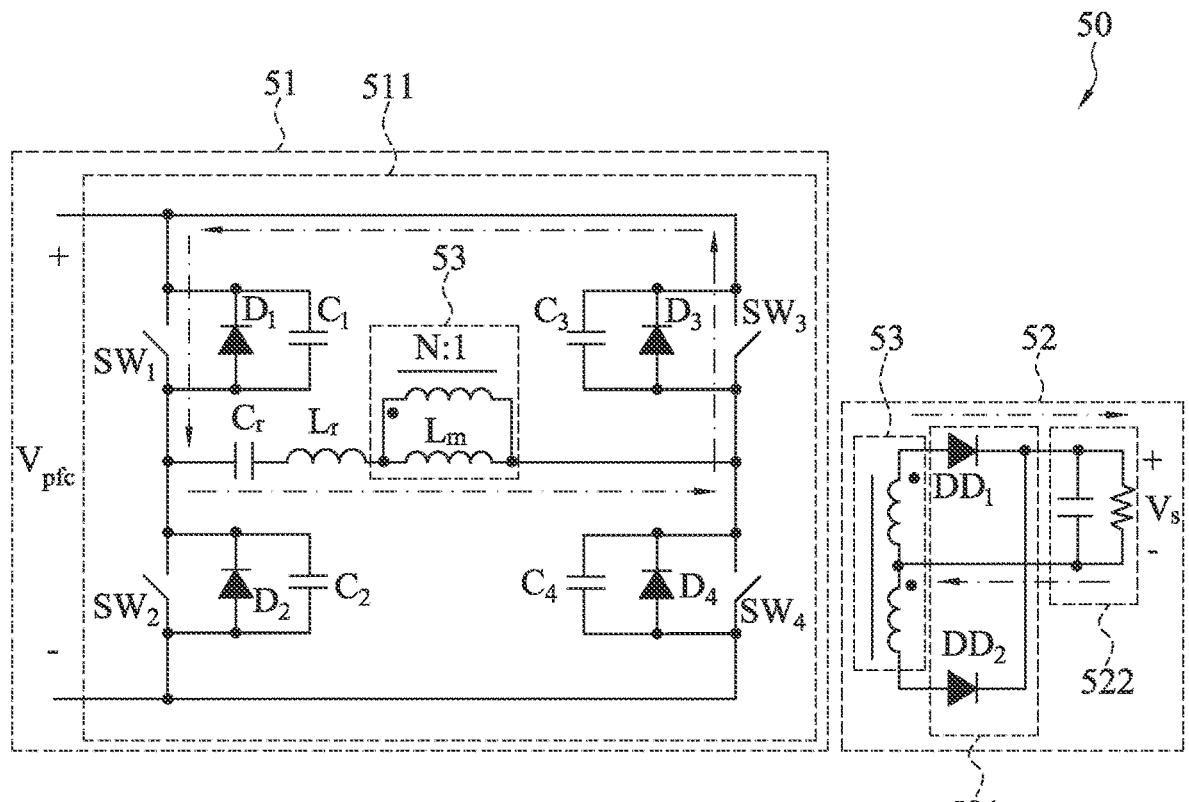
FIG. 10D is a schematic diagram of a third embodiment of the current path of the third stage of the period of the full-half bridge resonance converter circuit in the half-bridge resonance mode according to the present invention.
Figure 10E:
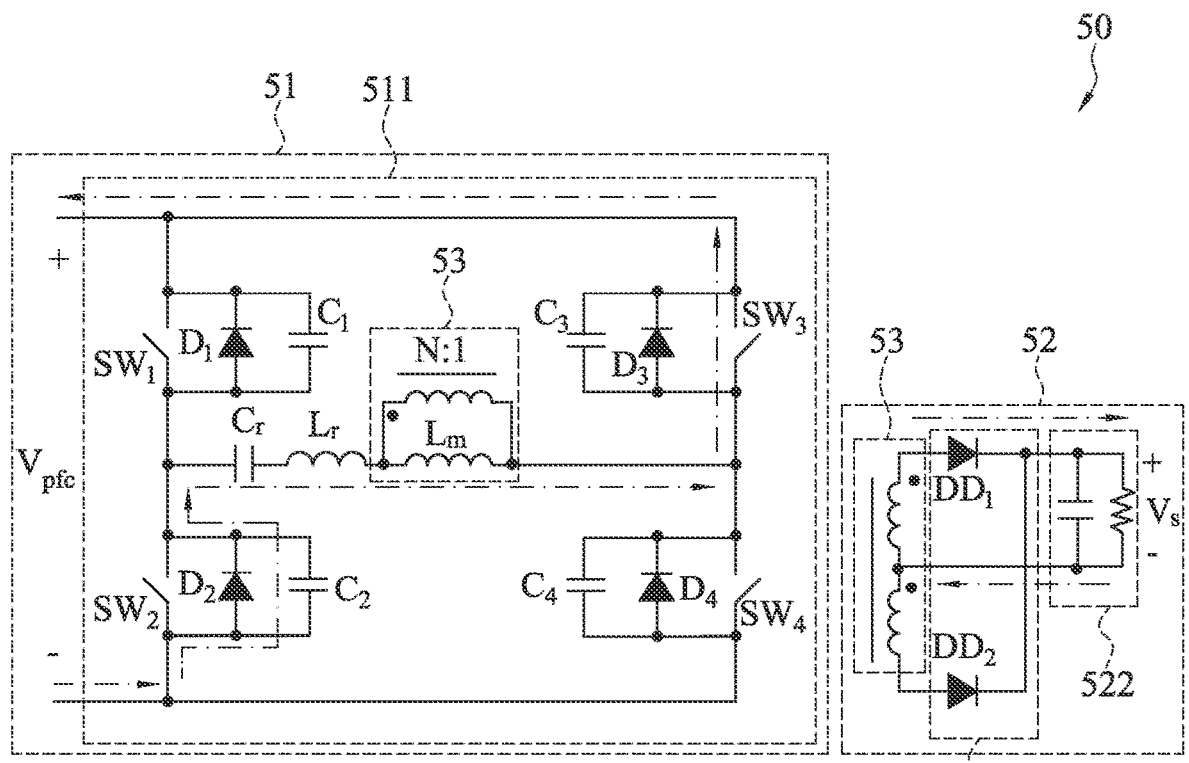
FIG. 10E is a schematic diagram of a third embodiment of the current path of the fourth stage of the period of the full-half bridge resonance converter circuit in the half-bridge resonance mode according to the present invention.

Refer to FIG. 10A to FIG. 10E. FIG. 10A is a schematic oscillogram of a third embodiment of the switching signals $SW_1\_PWM$, $SW_2\_PWM$, $SW_3\_PWM$, and $SW_4\_PWM$ of the full-half bridge resonance converter circuit 50 in the half-bridge resonance mode according to the present invention. FIG. 10B is a schematic diagram of a third embodiment of the current path of the first stage of the period T of the full-half bridge resonance converter circuit 50 in the half-bridge resonance mode according to the present invention. FIG. 10C is a schematic diagram of a third embodiment of the current path of the second stage of the period T of the full-half bridge resonance converter circuit 50 in the half-bridge resonance mode according to the present invention. FIG. 10D is a schematic diagram of a third embodiment of the current path of the third stage of the period T of the full-half bridge resonance converter circuit 50 in the half-bridge resonance mode according to the present invention. FIG. 10E is a schematic diagram of a third embodiment of the current path of the fourth stage of the period T of the full-half bridge resonance converter circuit 50 in the half-bridge resonance mode according to the present invention.

Different from the first embodiment of the half-bridge resonance mode, in the third embodiment, in a case that the full-half bridge resonance converter circuit 50 operates in the half-bridge resonance mode, the switching status of the third bridge switch $SW_3$ is on, the switching status of the fourth bridge switch $SW_4$ is off, and the switching statuses of the first bridge switch $SW_1$ and the second bridge switch $SW_2$ are mutually exclusively on or off, to excite the first resonance capacitor $C_r$, the first resonance inductor $L_r$, and the second resonance inductor $L_m$. The expression "mutually exclusively on or off" means that when the switching status of the first bridge switch $SW_1$ is on, the switching status of the second bridge switch $SW_2$ is off, or vice versa. Specifically, in the first stage of the period T of the half-bridge resonance mode (that is, the switching status of the second bridge switch $SW_2$ is on), a current of the bridge resonance circuit 511 (shown by the dash-dot line in FIG. 10B) successively flows through the third bridge switch $SW_3$, the second resonance inductor $L_m$, the first resonance inductor $L_r$, the first resonance capacitor $C_r$, and the second bridge switch $SW_2$, to excite the first resonance capacitor $C_r$, the first resonance inductor $L_r$, and the second resonance inductor $L_m$ to form an excitation path, and the second rectifier switch DD2 of the synchronous rectifier circuit 521 is turned on. In the second stage of the period T of the half-bridge resonance mode (that is, before the switching status of the first bridge switch $SW_1$ is on), the bridge resonance circuit 511 charges/discharges the capacitors $C_1$, $C_2$, $C_3$, and $C_4$, and a current of the bridge resonance circuit 511 (shown by the dash-dot line in FIG. 10C) maintains the excitation of the first resonance capacitor $C_r$, the first resonance inductor $L_r$, and the second resonance inductor $L_m$ through the diode $D_1$ and the third bridge switch $SW_3$. In the third stage of the period T of the half-bridge resonance mode (that is, the switching status of the first bridge switch $SW_1$ is on), a current of the bridge resonance circuit 511 (shown by the dash-dot line in FIG. 10D) successively flows through the third bridge switch $SW_3$, the first bridge switch $SW_1$, the first resonance capacitor $C_r$, the first resonance inductor $L_r$, and the second resonance inductor $L_m$, to excite the first resonance capacitor $C_r$, the first resonance inductor $L_r$, and the second resonance inductor $L_m$ to form an excitation path, and the first rectifier switch DD1 of the synchronous rectifier circuit 521 is turned on. In the fourth stage of the period T of the half-bridge resonance mode (that is, before the switching status of the second bridge switch $SW_2$ is on next time), the bridge resonance circuit 511 charges/discharges the capacitors $C_1$, $C_2$, $C_3$, and $C_4$, and a current of the bridge resonance circuit 511 (shown by the dash-dot line in FIG. 10E) maintains the excitation of the first resonance capacitor $C_r$, the first resonance inductor $L_r$, and the second resonance inductor $L_m$ through the diode $D_2$ and the third bridge switch $SW_3$.

Figure 11A:
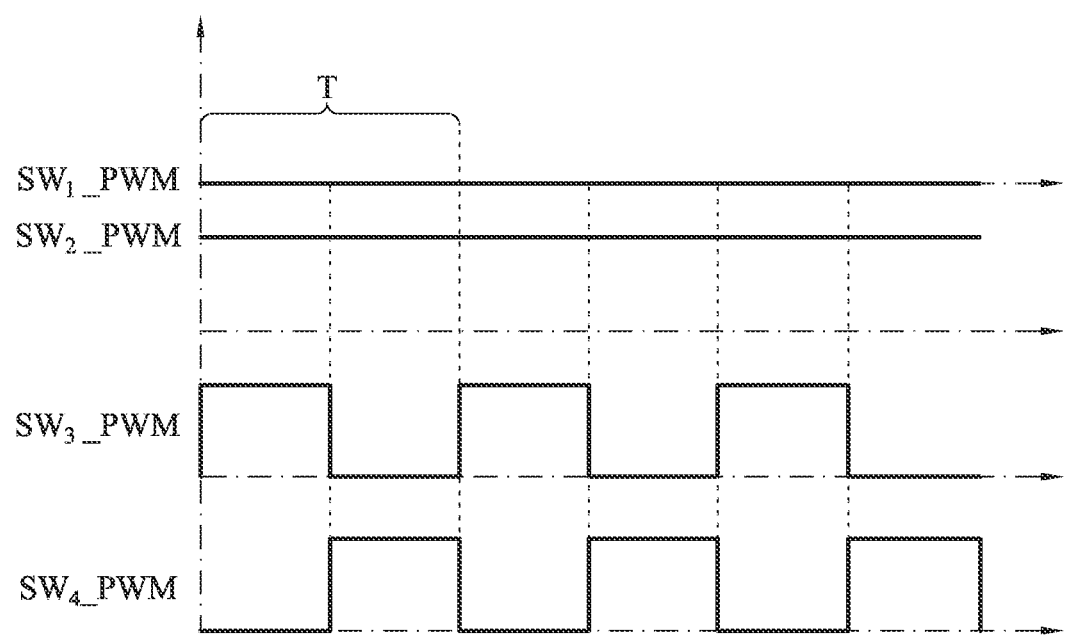
FIG. 11A is a schematic oscillogram of a fourth embodiment of the switching signals of the full-half bridge resonance converter circuit in the half-bridge resonance mode according to the present invention.
Figure 11B:
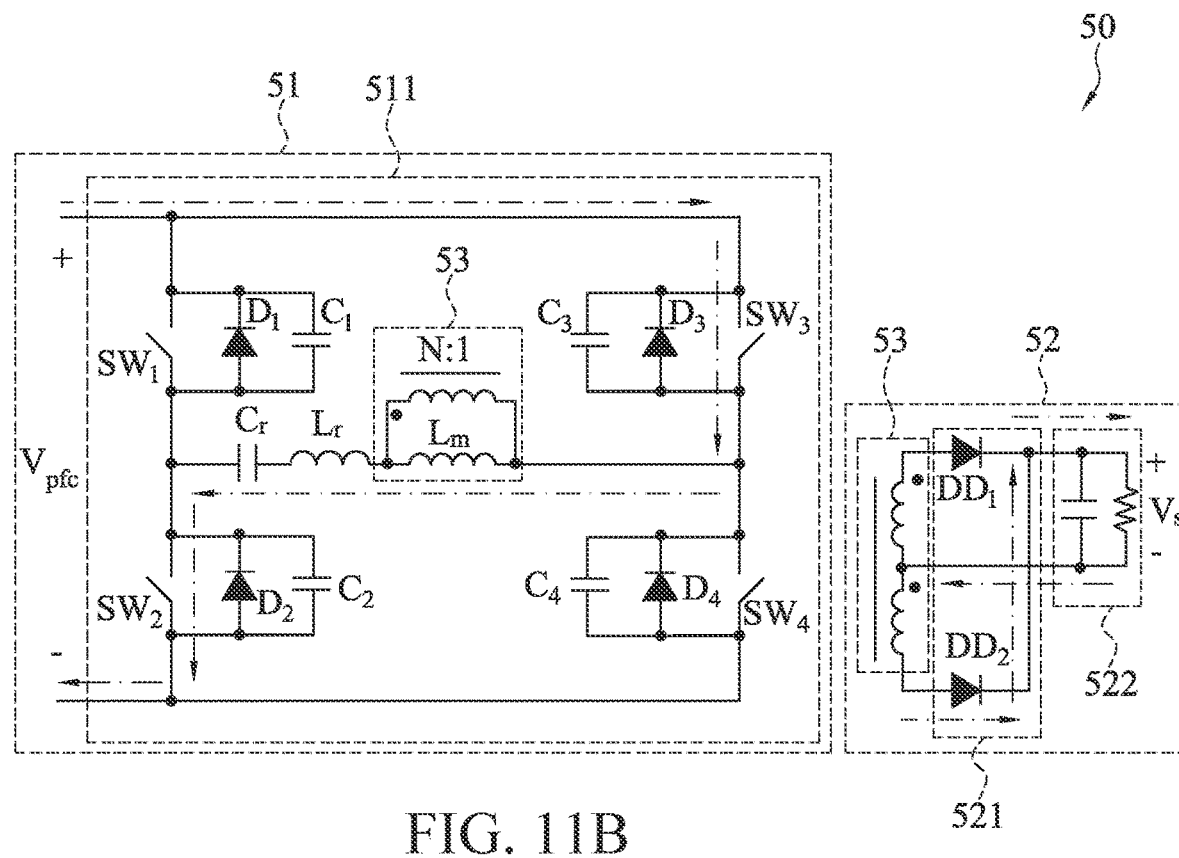
FIG. 11B is a schematic diagram of a fourth embodiment of the current path of the first stage of the period of the full-half bridge resonance converter circuit in the half-bridge resonance mode according to the present invention.
Figure 11C:
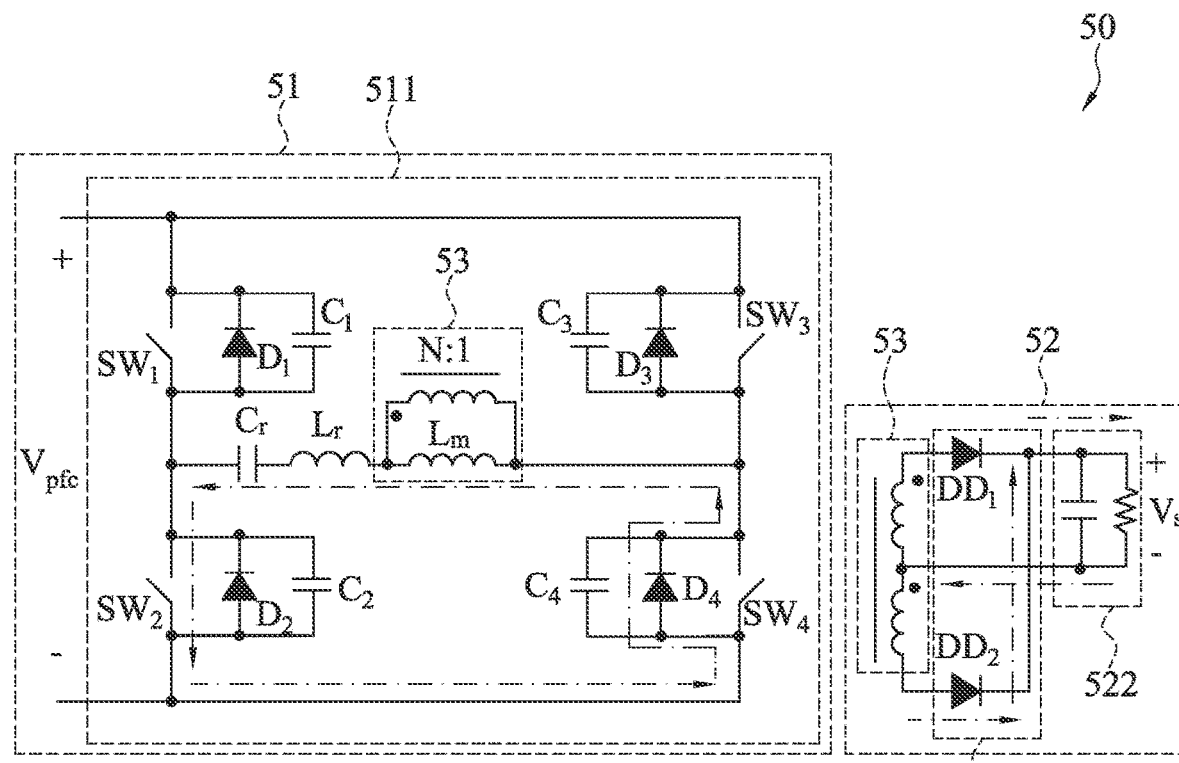
FIG. 11C is a schematic diagram of a fourth embodiment of the current path of the second stage of the period of the full-half bridge resonance converter circuit in the half-bridge resonance mode according to the present invention.
Figure 11D:
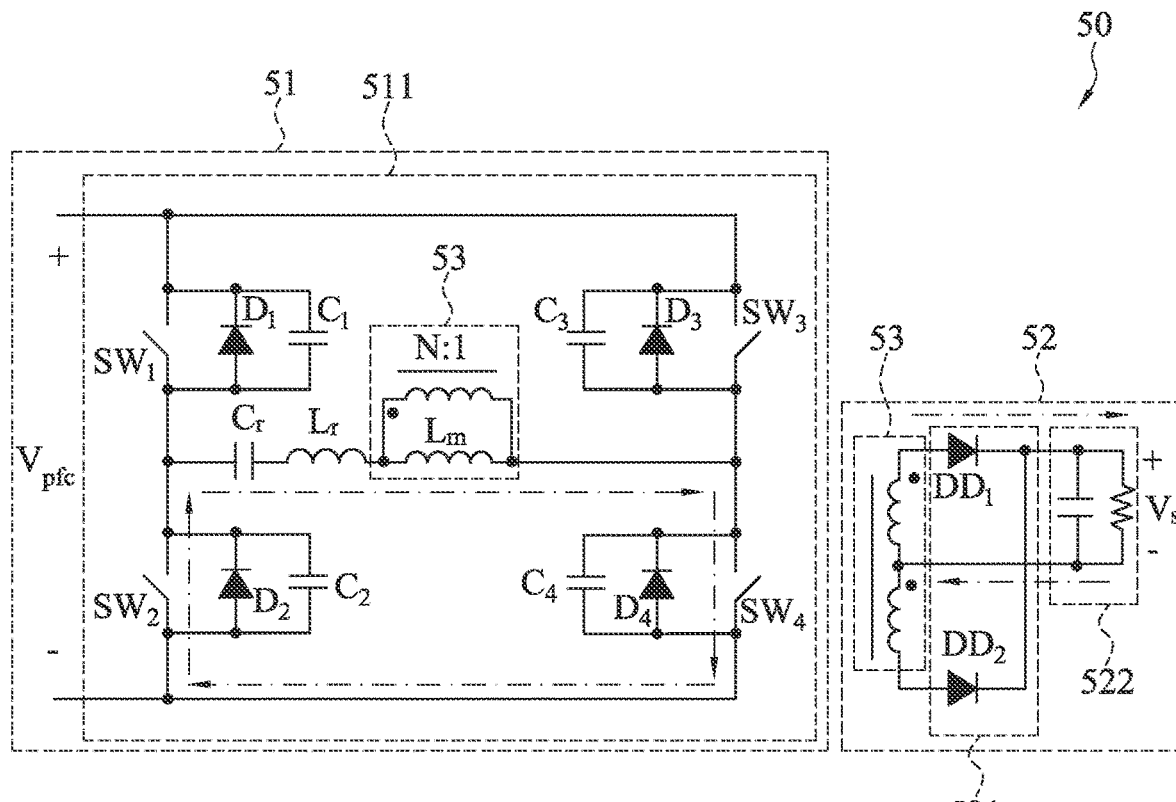
FIG. 11D is a schematic diagram of a fourth embodiment of the current path of the third stage of the period of the full-half bridge resonance converter circuit in the half-bridge resonance mode according to the present invention.
Figure 11E:
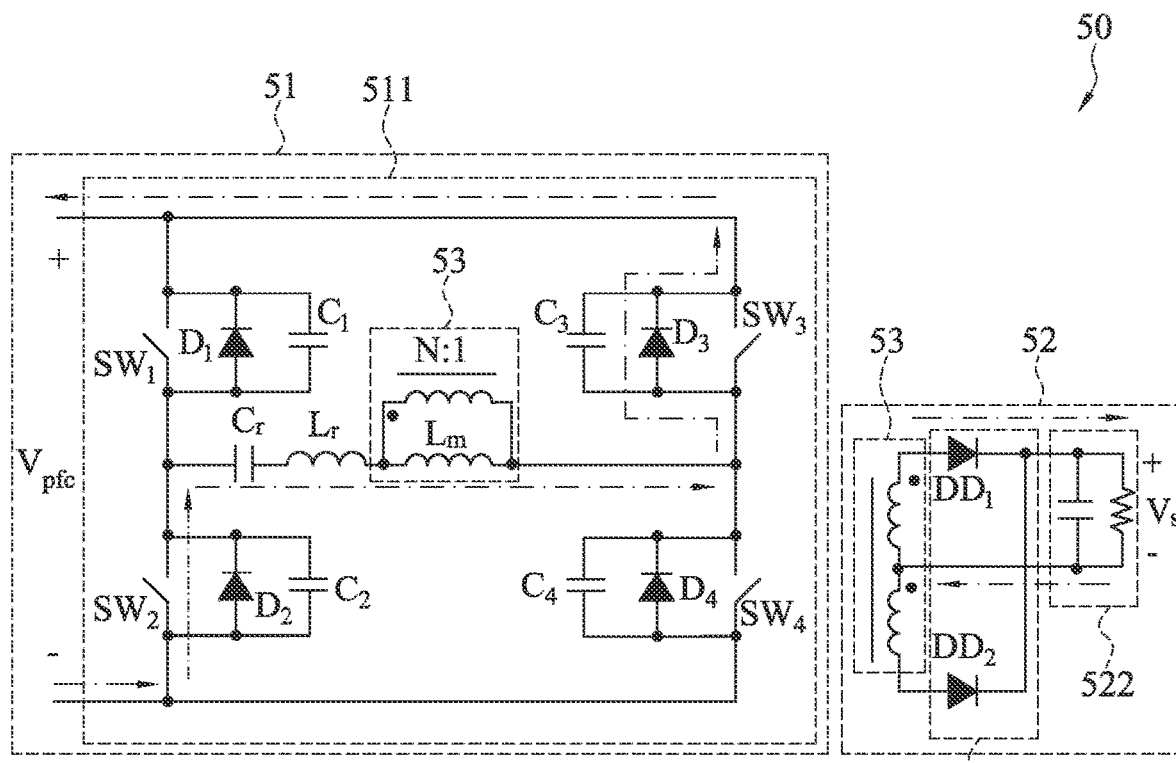
FIG. 11E is a schematic diagram of a fourth embodiment of the current path of the fourth stage of the period of the full-half bridge resonance converter circuit in the half-bridge resonance mode according to the present invention.

Refer to FIG. 11A to FIG. 11E. FIG. 11A is a schematic oscillogram of a fourth embodiment of the switching signals $SW_1\_PWM$, $SW_2\_PWM$, $SW_3\_PWM$, and $SW_4\_PWM$ of the full-half bridge resonance converter circuit 50 in the half-bridge resonance mode according to the present invention. FIG. 11B is a schematic diagram of a fourth embodiment of the current path of the first stage of the period T of the full-half bridge resonance converter circuit 50 in the half-bridge resonance mode according to the present invention. FIG. 11C is a schematic diagram of a fourth embodiment of the current path of the second stage of the period T of the full-half bridge resonance converter circuit 50 in the half-bridge resonance mode according to the present invention. FIG. 11D is a schematic diagram of a fourth embodiment of the current path of the third stage of the period T of the full-half bridge resonance converter circuit 50 in the half-bridge resonance mode according to the present invention. FIG. 11E is a schematic diagram of a fourth embodiment of the current path of the fourth stage of the period T of the full-half bridge resonance converter circuit 50 in the half-bridge resonance mode according to the present invention.

Different from the first embodiment of the half-bridge resonance mode, in the fourth embodiment, in a case that the full-half bridge resonance converter circuit 50 operates in the half-bridge resonance mode, the switching status of the first bridge switch $SW_1$ is off, the switching status of the second bridge switch $SW_2$ is on, and the switching statuses of the third bridge switch $SW_3$ and the fourth bridge switch $SW_4$ are mutually exclusively on or off, to excite the first resonance capacitor $C_r$, the first resonance inductor $L_r$, and the second resonance inductor $L_m$. The expression "mutually exclusively on or off" means that when the switching status of the third bridge switch $SW_3$ is on, the switching status of the fourth bridge switch $SW_4$ is off, or vice versa. Specifically, in the first stage of the period T of the half-bridge resonance mode (that is, the switching status of the third bridge switch $SW_3$ is on), a current of the bridge resonance circuit 511 (shown by the dash-dot line in FIG. 11B) successively flows through the third bridge switch $SW_3$, the second resonance inductor $L_m$, the first resonance inductor $L_r$, the first resonance capacitor $C_r$, and the second bridge switch $SW_2$, to excite the first resonance capacitor $C_r$, the first resonance inductor $L_r$, and the second resonance inductor $L_m$ to form an excitation path, and the second rectifier switch DD2 of the synchronous rectifier circuit 521 is turned on. In the second stage of the period T of the half-bridge resonance mode (that is, before the switching status of the fourth bridge switch $SW_4$ is on), the bridge resonance circuit 511 charges/discharges the capacitors $C_1$, $C_2$, $C_3$, and $C_4$, and a current of the bridge resonance circuit 511 (shown by the dash-dot line in FIG. 11C) maintains the excitation of the first resonance capacitor $C_r$, the first resonance inductor $L_r$, and the second resonance inductor $L_m$ through the diode $D_4$ and the second bridge switch $SW_2$. In the third stage of the period T of the half-bridge resonance mode (that is, the switching status of the fourth bridge switch $SW_1$ is on), a current of the bridge resonance circuit 511 (shown by the dash-dot line in FIG. 11D) successively flows through the fourth bridge switch $SW_4$, the second bridge switch $SW_2$, the first resonance capacitor $C_r$, the first resonance inductor $L_r$, and the second resonance inductor $L_m$, to excite the first resonance capacitor $C_r$, the first resonance inductor $L_r$, and the second resonance inductor $L_m$ to form an excitation path, and the first rectifier switch DD1 of the synchronous rectifier circuit 521 is turned on. In the fourth stage of the period T of the half-bridge resonance mode (that is, before the switching status of the third bridge switch $SW_3$ is on next time), the bridge resonance circuit 511 charges/discharges the capacitors $C_1$, $C_2$, $C_3$, and $C_4$, and a current of the bridge resonance circuit 511 (shown by the dash-dot line in FIG. 11E) maintains the excitation of the first resonance capacitor $C_r$, the first resonance inductor $L_r$, and the second resonance inductor $L_m$ through the diode $D_3$ and the second bridge switch $SW_2$.

Figure 12A:
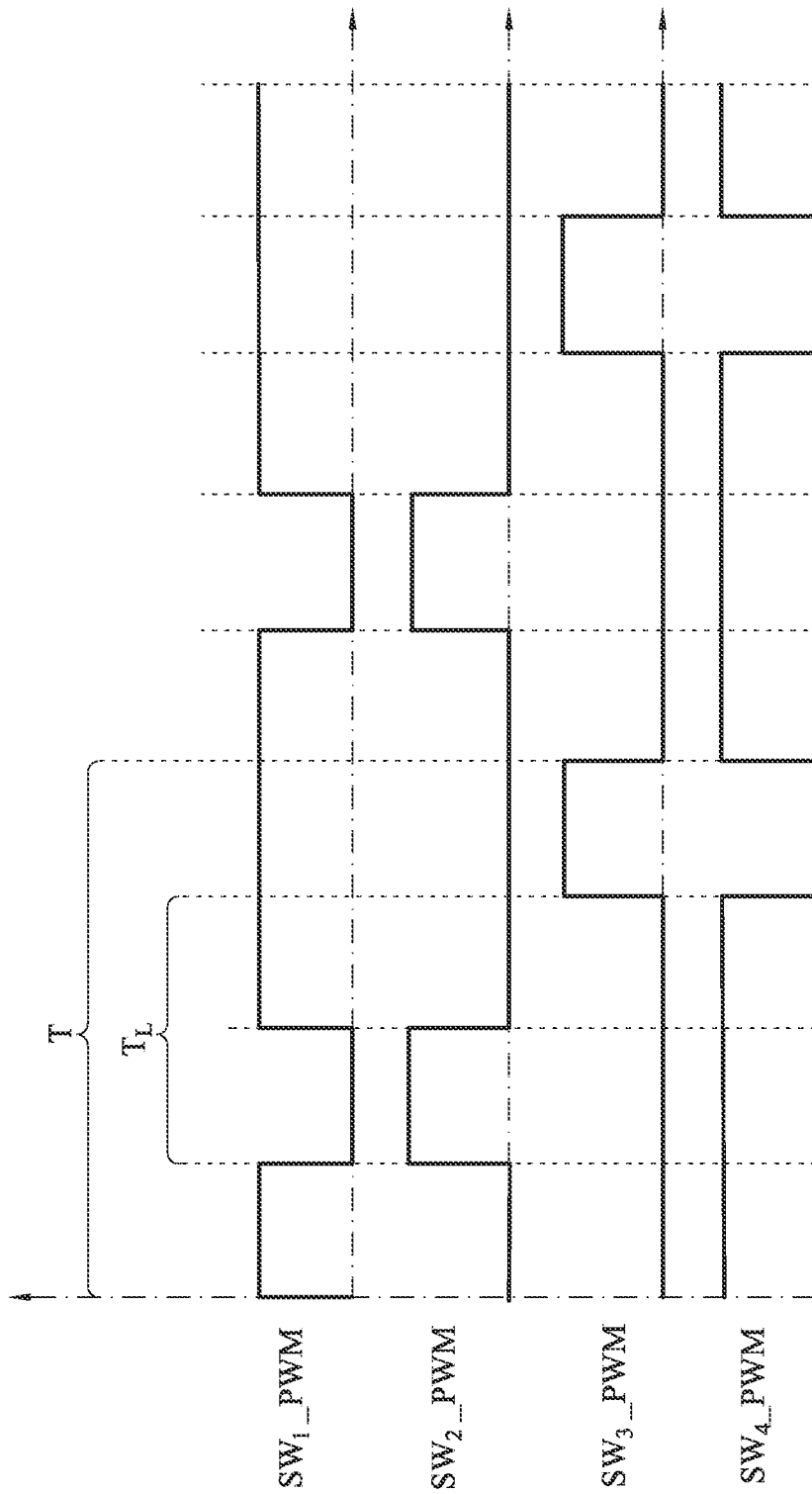
FIG. 12A is a schematic oscillogram of a first embodiment of switching signals of the full-half bridge resonance converter circuit in a hybrid half-bridge resonance mode according to the present invention.
Figure 12B:
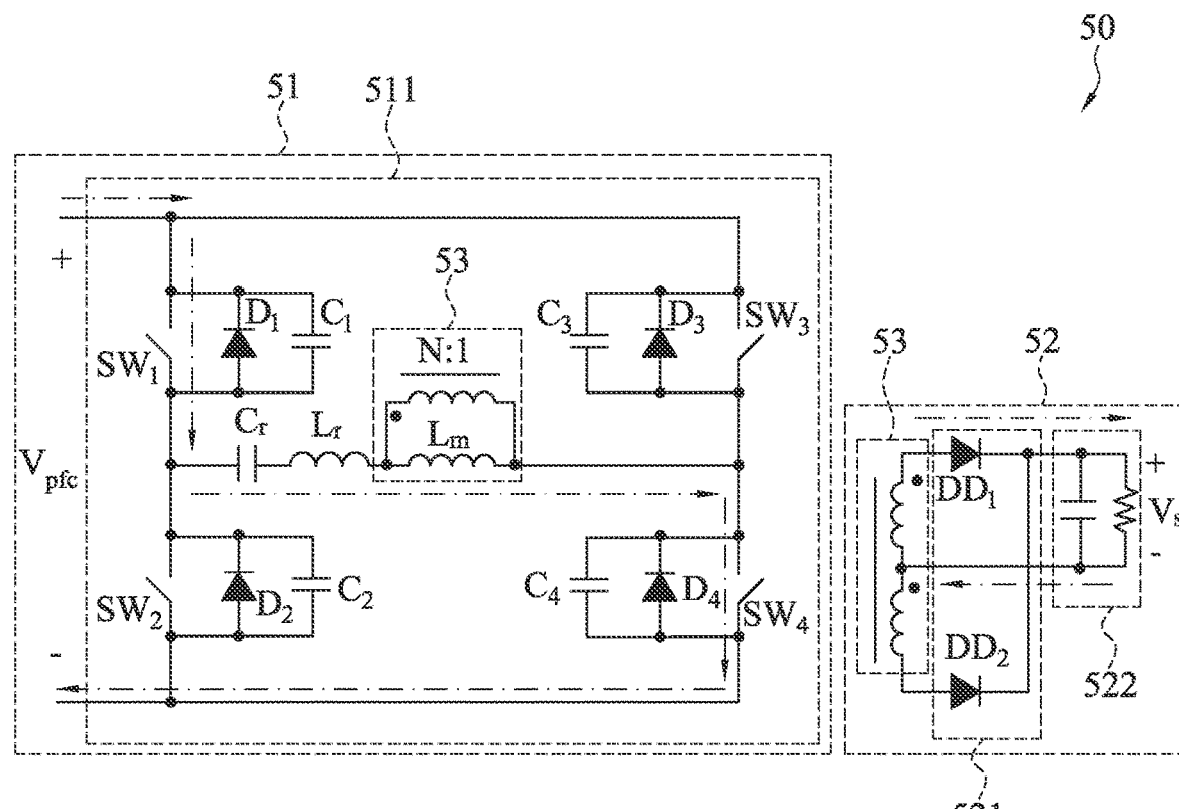
FIG. 12B is a schematic diagram of a first embodiment of a current path of a first stage of a period of the full-half bridge resonance converter circuit in the hybrid half-bridge resonance mode according to the present invention.
Figure 12C:
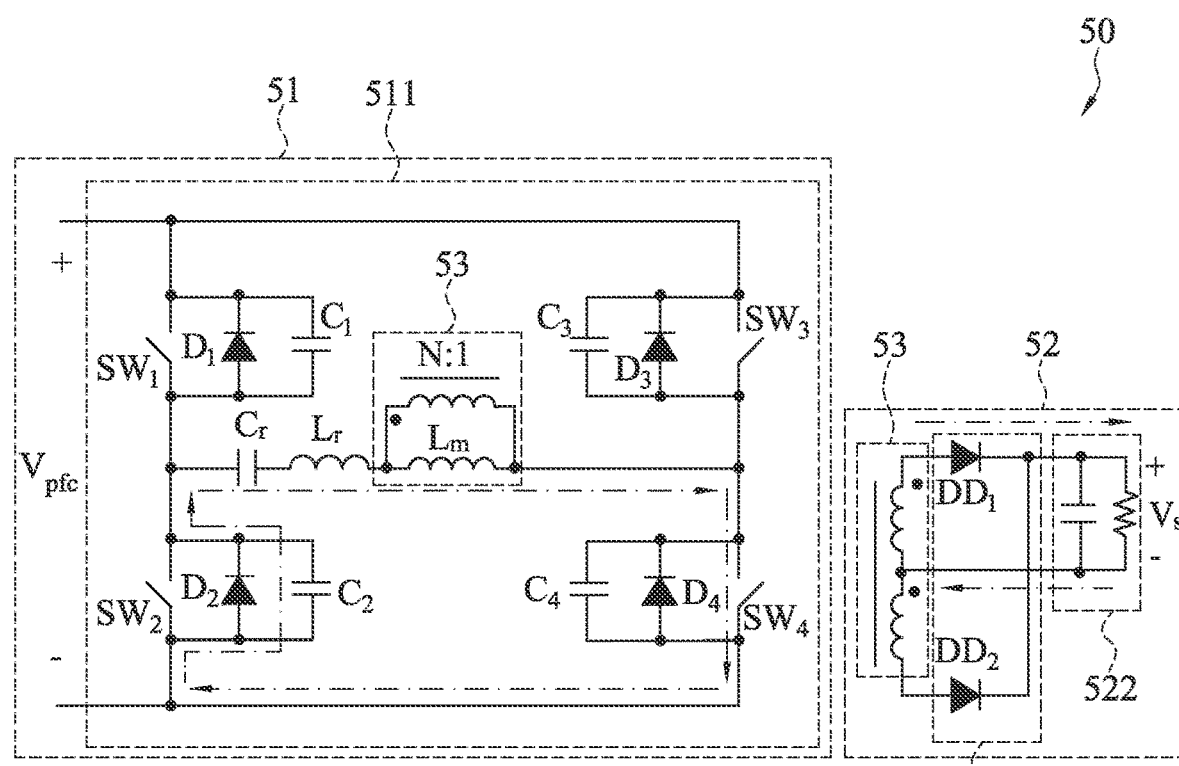
FIG. 12C is a schematic diagram of a first embodiment of a current path of a second stage of the period of the full-half bridge resonance converter circuit in the hybrid half-bridge resonance mode according to the present invention.
Figure 12D:
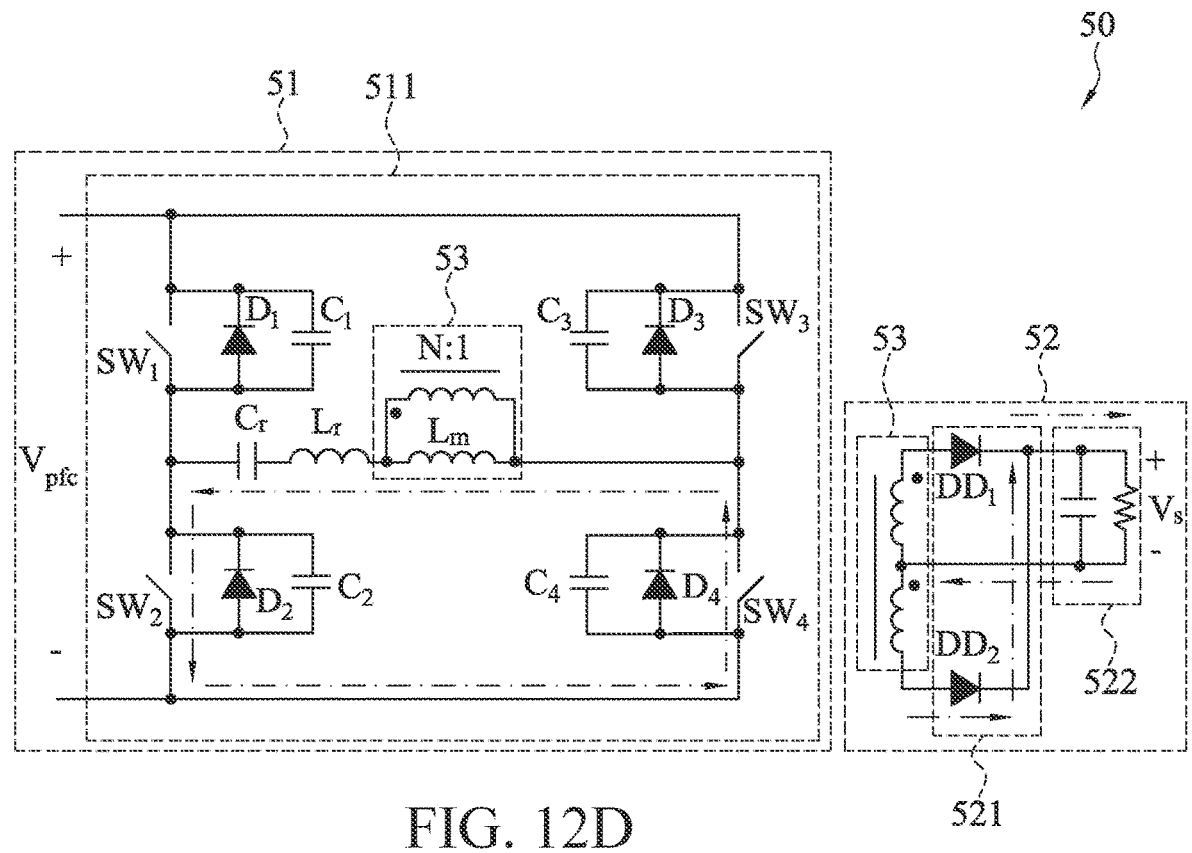
FIG. 12D is a schematic diagram of a first embodiment of a current path of a third stage of the period of the full-half bridge resonance converter circuit in the hybrid half-bridge resonance mode according to the present invention.
Figure 12E:
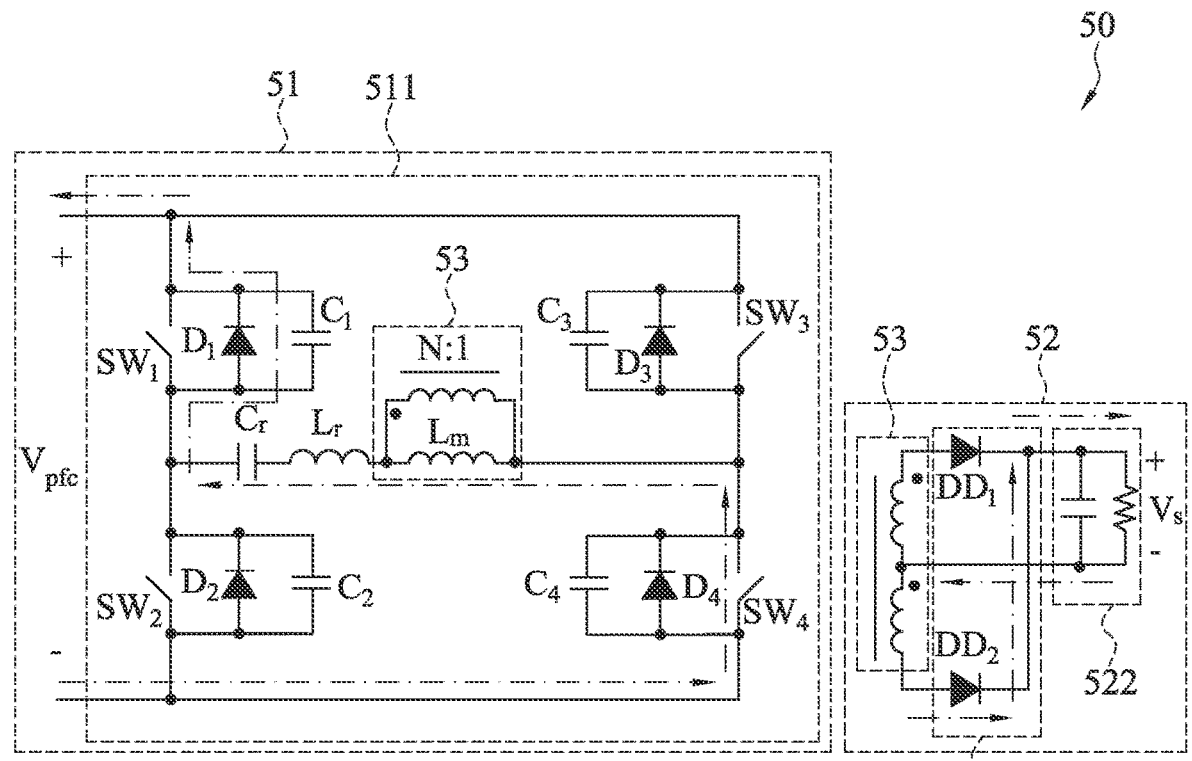
FIG. 12E is a schematic diagram of a first embodiment of a current path of a fourth stage of the period of the full-half bridge resonance converter circuit in the hybrid half-bridge resonance mode according to the present invention.
Figure 12F:
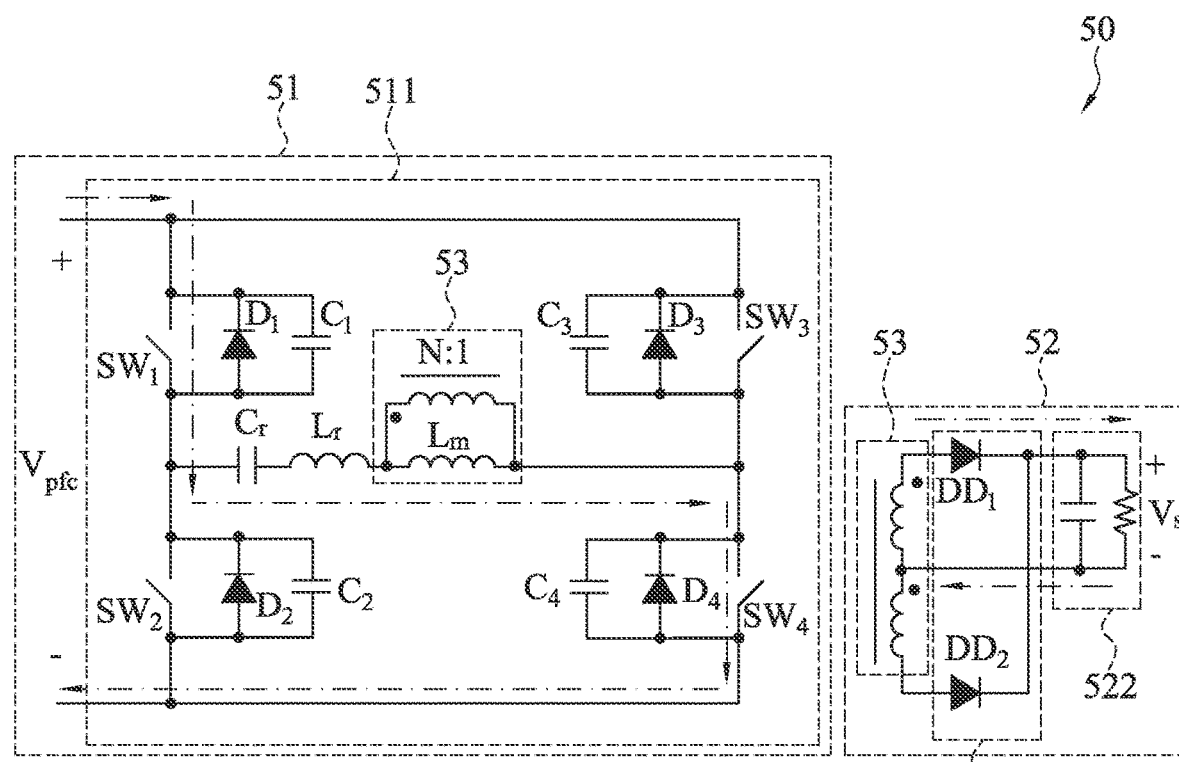
FIG. 12F is a schematic diagram of a first embodiment of a current path of a fifth stage of the period of the full-half bridge resonance converter circuit in the hybrid half-bridge resonance mode according to the present invention.
Figure 12G:
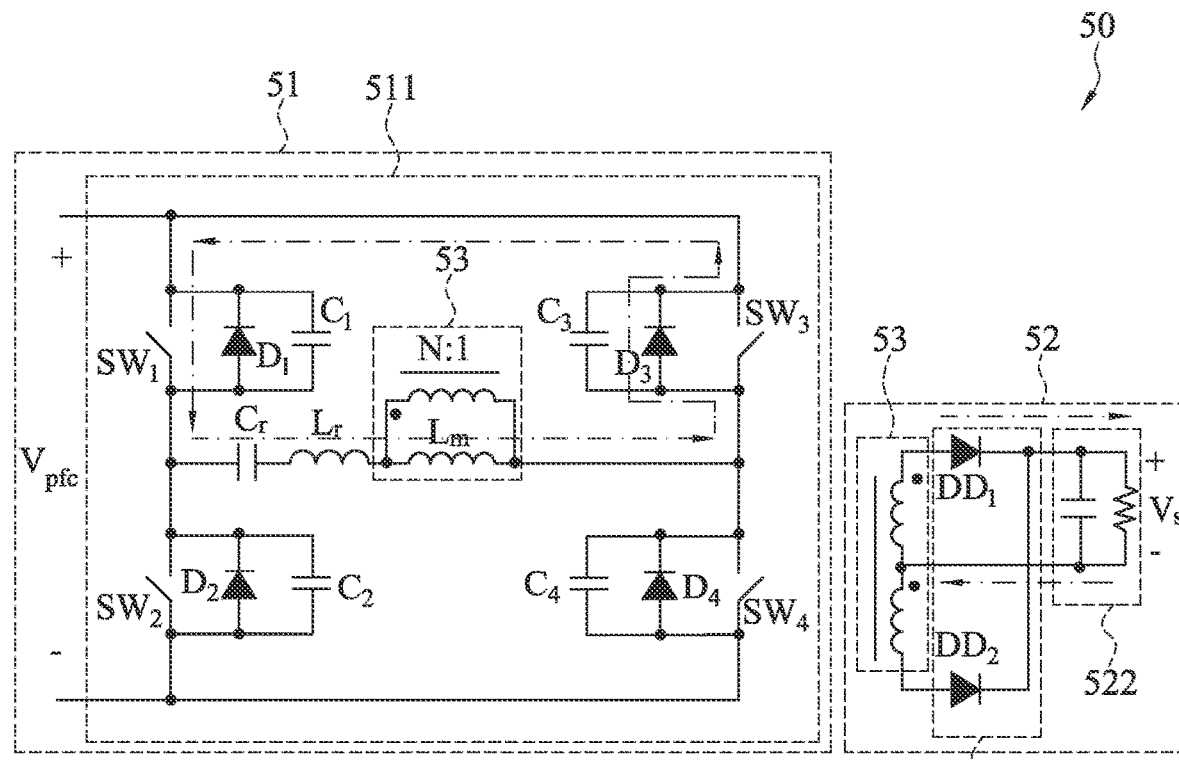
FIG. 12G is a schematic diagram of a first embodiment of a current path of a sixth stage of the period of the full-half bridge resonance converter circuit in the hybrid half-bridge resonance mode according to the present invention.
Figure 12H:
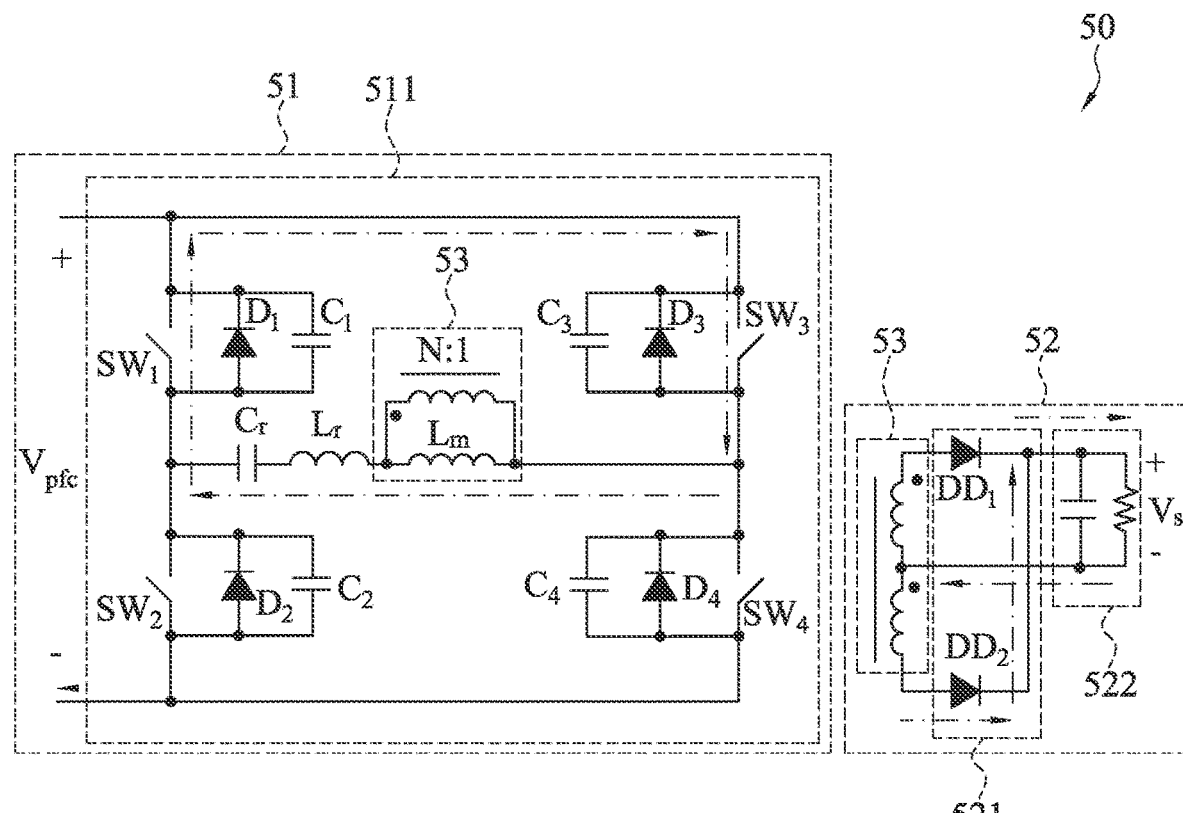
FIG. 12H is a schematic diagram of a first embodiment of a current path of a seventh stage of the period of the full-half bridge resonance converter circuit in the hybrid half-bridge resonance mode according to the present invention.
Figure 12I:
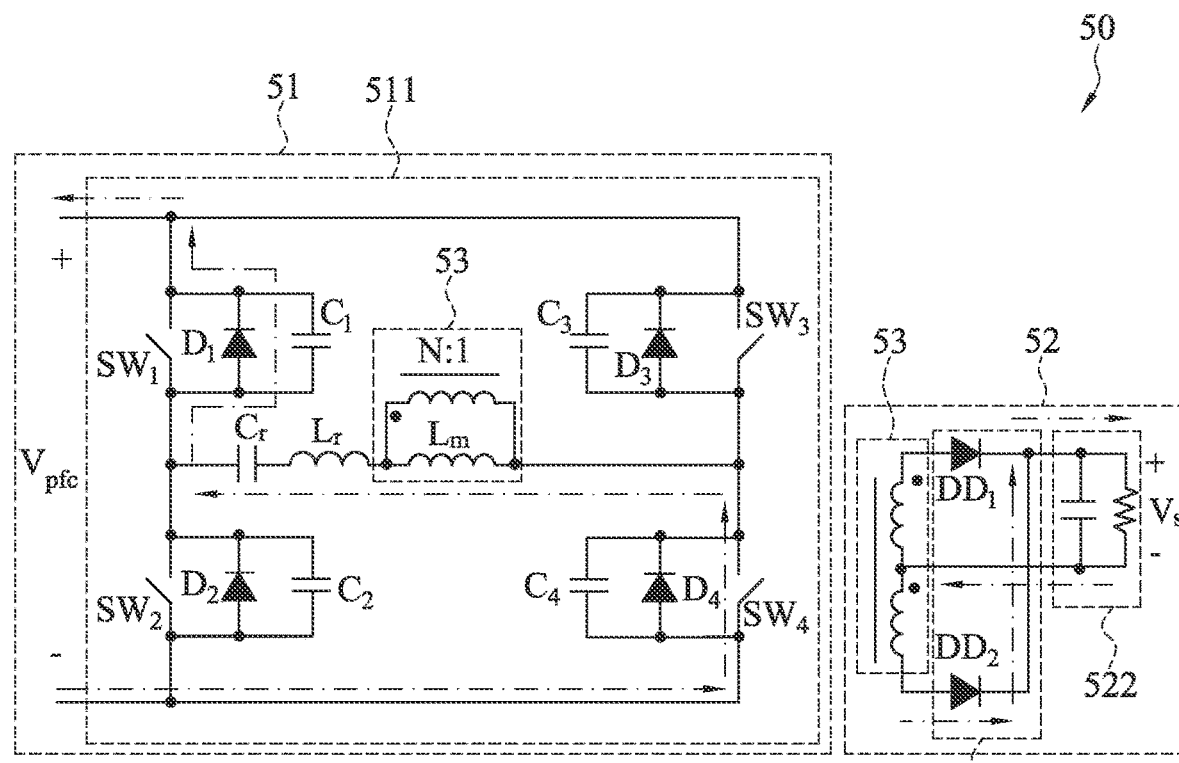
FIG. 12I is a schematic diagram of a first embodiment of a current path of an eighth stage of the period of the full-half bridge resonance converter circuit in the hybrid half-bridge resonance mode according to the present invention.

Refer to FIG. 12A to FIG. 12I. FIG. 12A is a schematic oscillogram of a first embodiment of switching signals $SW_1\_PWM$, $SW_2\_PWM$, $SW_3\_PWM$, and $SW_4\_PWM$ of the full-half bridge resonance converter circuit 50 in the hybrid half-bridge resonance mode according to the present invention. FIG. 12B is a schematic diagram of a first embodiment of a current path of a first stage of a period T of the full-half bridge resonance converter circuit 50 in the hybrid half-bridge resonance mode according to the present invention. FIG. 12C is a schematic diagram of a first embodiment of a current path of a second stage of the period T of the full-half bridge resonance converter circuit 50 in the hybrid half-bridge resonance mode according to the present invention. FIG. 12D is a schematic diagram of a first embodiment of a current path of a third stage of the period T of the full-half bridge resonance converter circuit in 50 the hybrid half-bridge resonance mode according to the present invention. FIG. 12E is a schematic diagram of a first embodiment of a current path of a fourth stage of the period T of the full-half bridge resonance converter circuit in 50 the hybrid half-bridge resonance mode according to the present invention. FIG. 12F is a schematic diagram of a first embodiment of a current path of a fifth stage of the period T of the full-half bridge resonance converter circuit in 50 the hybrid half-bridge resonance mode according to the present invention. FIG. 12G is a schematic diagram of a first embodiment of a current path of a sixth stage of the period T of the full-half bridge resonance converter circuit in 50 the hybrid half-bridge resonance mode according to the present invention. FIG. 12H is a schematic diagram of a first embodiment of a current path of a seventh stage of the period T of the full-half bridge resonance converter circuit in 50 the hybrid half-bridge resonance mode according to the present invention. FIG. 12I is a schematic diagram of a first embodiment of a current path of an eighth stage of the period T of the full-half bridge resonance converter circuit in 50 the hybrid half-bridge resonance mode according to the present invention.

The hybrid half-bridge resonance mode is described below by using two embodiments (as shown in FIG. 12A to FIG. 13I). In the first embodiment (as shown in FIG. 12A to FIG. 12I), in a case that the full-half bridge resonance converter circuit 50 operates in the hybrid half-bridge resonance mode, the switching statuses of the first bridge switch $SW_1$ and the second bridge switch $SW_2$ are mutually exclusively on or off, the switching statuses of the third bridge switch $SW_3$ and the fourth bridge switch $SW_4$ are mutually exclusively on or off, and the switching statuses of the third bridge switch $SW_3$ and the fourth bridge switch $SW_4$ are changed later than the switching statuses of the first bridge switch $SW_1$ and the second bridge switch $SW_2$, to excite the first resonance capacitor $C_r$, the first resonance inductor $L_r$, and the second resonance inductor $L_m$. The expression "mutually exclusively on or off" means that when the switching status of the first bridge switch $SW_1$ is on, the switching status of the second bridge switch $SW_2$ is off, or vice versa, and when the switching status of the third bridge switch $SW_3$ is on, the switching status of the fourth bridge switch $SW_4$ is off, or vice versa. Therefore, compared with the half-bridge resonance mode, the switching statuses of the first bridge switch $SW_1$, the second bridge switch $SW_2$, the third bridge switch $SW_3$, and the fourth bridge switch $SW_4$ in the hybrid half-bridge resonance mode all change. In this way, the switch losses are distributed relatively uniformly, and the heat dissipation is relatively effective.

As shown in FIG. 12A, in some embodiments, in the period T of the hybrid half-bridge resonance mode, the switching statuses of the third bridge switch $SW_3$ and the fourth bridge switch $SW_4$ start to change after a time TL (for example, two pulse durations) since change of the switching statuses of the first bridge switch $SW_1$ and the second bridge switch $SW_2$. In some embodiments, in the period T of the hybrid half-bridge resonance mode, the switching statuses of the third bridge switch $SW_3$ and the fourth bridge switch $SW_4$ change after the switching statuses of the first bridge switch $SW_1$ and the second bridge switch $SW_2$ change twice. In some embodiments, the period T of the hybrid half-bridge resonance mode has four pulse durations in a time sequence. In first three pulse durations, the first bridge switch $SW_1$ and the second bridge switch $SW_2$ change the switching statuses a plurality of times, and in the remaining pulse durations is for the third bridge switch $SW_3$ and the fourth bridge switch $SW_4$ to change the switching statuses.

For brevity, only the period T of the hybrid half-bridge resonance mode in the first embodiment is described below. As shown in FIG. 12A and FIG. 12B, the switching status of the third bridge switch $SW_3$ is off, and the switching status of the fourth bridge switch $SW_4$ is on. In the first stage of the period T of the hybrid half-bridge resonance mode (that is, the switching status of the first bridge switch $SW_1$ is on for the first time), a current of the bridge resonance circuit 511 (shown by the dash-dot line in FIG. 12B) successively flows through the first bridge switch $SW_1$, the first resonance capacitor $C_r$, the first resonance inductor $L_r$, the second resonance inductor $L_m$, and the fourth bridge switch $SW_4$, to excite the first resonance capacitor $C_r$, the first resonance inductor $L_r$, and the second resonance inductor $L_m$ to form an excitation path. Furthermore, the first rectifier switch DD1 of the synchronous rectifier circuit 521 is turned on so that the bridge resonance circuit 511 can transfer energy to the filter circuit 522 through the transformer 53 and the first rectifier switch DD1.

As shown in FIG. 12A and FIG. 12C, in the second stage of the period T of the hybrid half-bridge resonance mode (that is, before the switching status of the second bridge switch $SW_2$ is on for the first time), due to a resonance effect and a current freewheeling characteristic, the bridge resonance circuit 511 charges/discharges the capacitors $C_1$, $C_2$, $C_3$, and $C_4$, and a current of the bridge resonance circuit 511 (shown by the dash-dot line in FIG. 12C) maintains the excitation of the first resonance capacitor $C_r$, the first resonance inductor $L_r$, and the second resonance inductor $L_m$ through the diode $D_2$ and the fourth bridge switch $SW_4$.

As shown in FIG. 12A and FIG. 12D, in the third stage of the period T of the hybrid half-bridge resonance mode (that is, the switching status of the second bridge switch $SW_2$ is on for the first time), a current of the bridge resonance circuit 511 (shown by the dash-dot line in FIG. 12D) successively flows through the second bridge switch $SW_2$, the fourth bridge switch $SW_4$, the second resonance inductor $L_m$, the first resonance inductor $L_r$, and the first resonance capacitor $C_r$, to excite the first resonance capacitor $C_r$, the first resonance inductor $L_r$, and the second resonance inductor $L_m$ to form an excitation path. Furthermore, the second rectifier switch DD2 of the synchronous rectifier circuit 521 is turned on so that the bridge resonance circuit 511 can transfer energy to the filter circuit 522 through the transformer 53 and the second rectifier switch DD2.

As shown in FIG. 12A and FIG. 12E, in the fourth stage of the period T of the hybrid half-bridge resonance mode (that is, before the switching status of the first bridge switch $SW_1$ is on for the second time), due to a resonance effect and a current freewheeling characteristic, the bridge resonance circuit 511 charges/discharges the capacitors $C_1$, $C_2$, $C_3$, and $C_4$, and a current of the bridge resonance circuit 511 (shown by the dash-dot line in FIG. 12D) maintains the excitation of the first resonance capacitor $C_r$, the first resonance inductor $L_r$, and the second resonance inductor $L_m$ through the diode $D_1$ and the fourth bridge switch $SW_4$.

As shown in FIG. 12A and FIG. 12F, in the fifth stage of the period T of the hybrid half-bridge resonance mode (that is, the switching status of the first bridge switch $SW_1$ is on for the second time), a current of the bridge resonance circuit 511 (shown by the dash-dot line in FIG. 12F) successively flows through the first bridge switch $SW_1$, the first resonance capacitor $C_r$, the first resonance inductor $L_r$, the second resonance inductor $L_m$, and the fourth bridge switch $SW_4$, to excite the first resonance capacitor $C_r$, the first resonance inductor $L_r$, and the second resonance inductor $L_m$ to form an excitation path. Furthermore, the first rectifier switch DD1 of the synchronous rectifier circuit 521 is turned on so that the bridge resonance circuit 511 can transfer energy to the filter circuit 522 through the transformer 53 and the first rectifier switch DD1.

As shown in FIG. 12A and FIG. 12G, in the sixth stage of the period T of the half-bridge resonance mode (that is, before the switching status of the third bridge switch $SW_3$ is on), due to a resonance effect and a current freewheeling characteristic, the bridge resonance circuit 511 charges/discharges the capacitors $C_1$, $C_2$, $C_3$, and $C_4$, and a current of the bridge resonance circuit 511 (shown by the dash-dot line in FIG. 12G) maintains the excitation of the first resonance capacitor $C_r$, the first resonance inductor $L_r$, and the second resonance inductor $L_m$ through the diode $D_3$ and the first bridge switch $SW_1$.

As shown in FIG. 12A and FIG. 12H, the switching status of the second bridge switch $SW_2$ is off, and the switching status of the first bridge switch $SW_1$ is on. In the seventh stage of the period T of the half-bridge resonance mode (that is, the switching status of the third bridge switch $SW_2$ is on), a current of the bridge resonance circuit 511 (shown by the dash-dot line in FIG. 12H) successively flows through the first bridge switch $SW_1$, the third bridge switch $SW_3$, the second resonance inductor $L_m$, the first resonance inductor $L_r$, and the first resonance capacitor $C_r$, to excite the first resonance capacitor $C_r$, the first resonance inductor $L_r$, and the second resonance inductor $L_m$ to form an excitation path. Furthermore, the second rectifier switch DD2 of the synchronous rectifier circuit 521 is turned on so that the bridge resonance circuit 511 can transfer energy to the filter circuit 522 through the transformer 53 and the second rectifier switch DD2.

As shown in FIG. 12A and FIG. 12I, in the eighth stage of the period T of the half-bridge resonance mode (that is, before the switching status of the fourth bridge switch $SW_4$ is on next time), due to a resonance effect and a current freewheeling characteristic, the bridge resonance circuit 511 charges/discharges the capacitors $C_1$, $C_2$, $C_3$, and $C_4$, and a current of the bridge resonance circuit 511 (shown by the dash-dot line in FIG. 12I) maintains the excitation of the first resonance capacitor $C_r$, the first resonance inductor $L_r$, and the second resonance inductor $L_m$ through the diodes $D_1$ and $D_4$. After the period T ends, another period T proceeds and the eight stages of period T of the hybrid half-bridge resonance mode are repeated. Therefore, in some embodiments, the hybrid half-bridge resonance mode in the first embodiment may be formed by combining the first embodiment and the second embodiment of the half-bridge resonance mode.

Figure 13B:
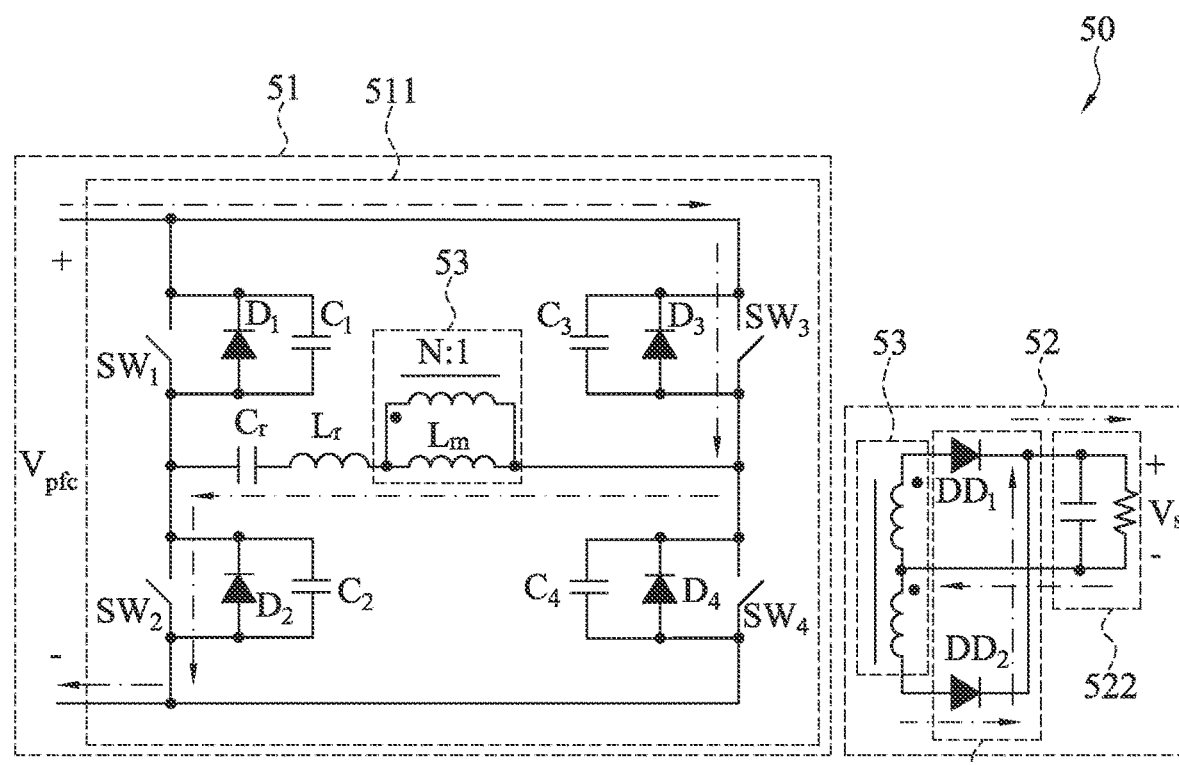
FIG. 13B is a schematic diagram of a second embodiment of the current path of the first stage of the period of the full-half bridge resonance converter circuit in the hybrid half-bridge resonance mode according to the present invention.
Figure 13C:
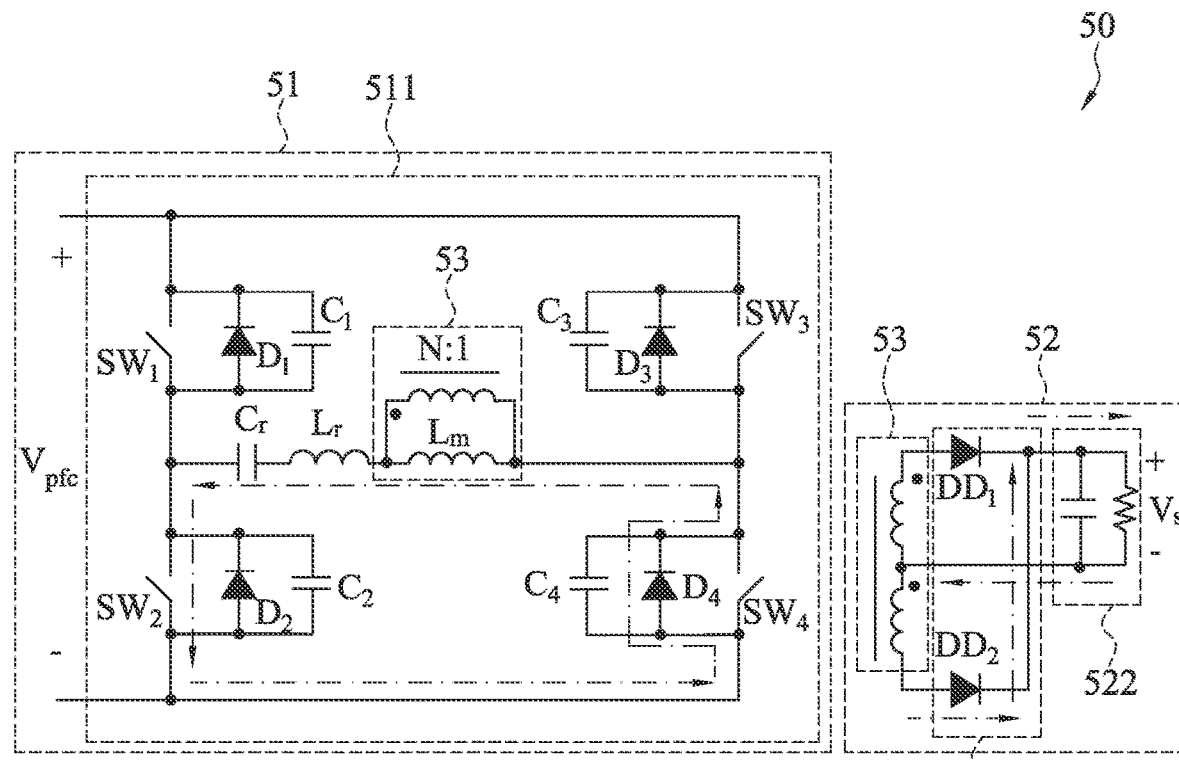
FIG. 13C is a schematic diagram of a second embodiment of the current path of the second stage of the period of the full-half bridge resonance converter circuit in the hybrid half-bridge resonance mode according to the present invention.
Figure 13D:
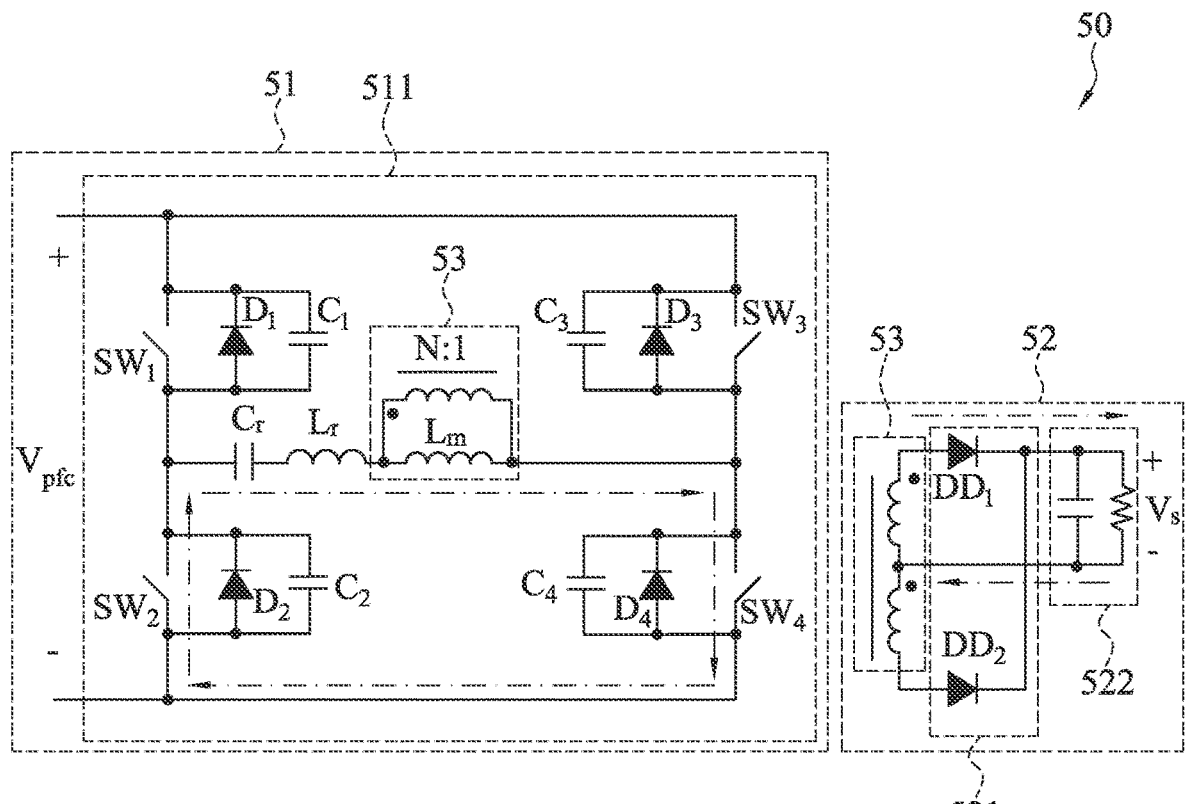
FIG. 13D is a schematic diagram of a second embodiment of the current path of the third stage of the period of the full-half bridge resonance converter circuit in the hybrid half-bridge resonance mode according to the present invention.
Figure 13E:
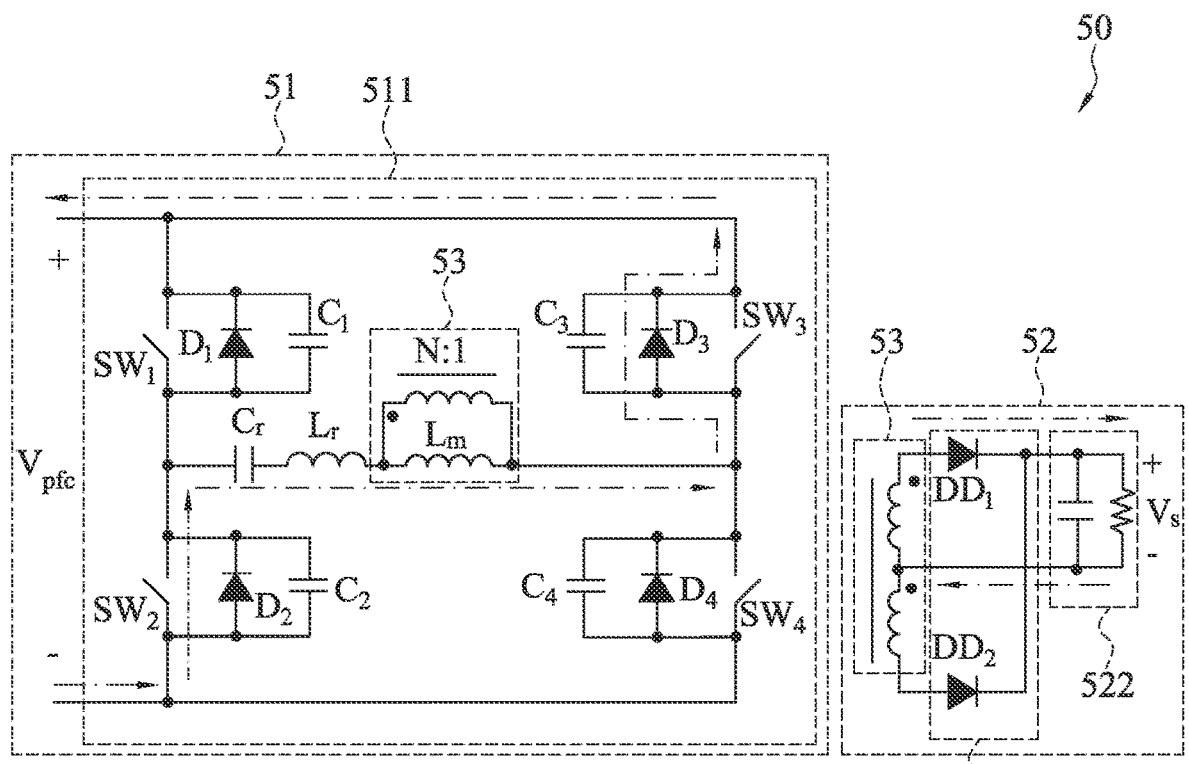
FIG. 13E is a schematic diagram of a second embodiment of the current path of the fourth stage of the period of the full-half bridge resonance converter circuit in the hybrid half-bridge resonance mode according to the present invention.
Figure 13F:
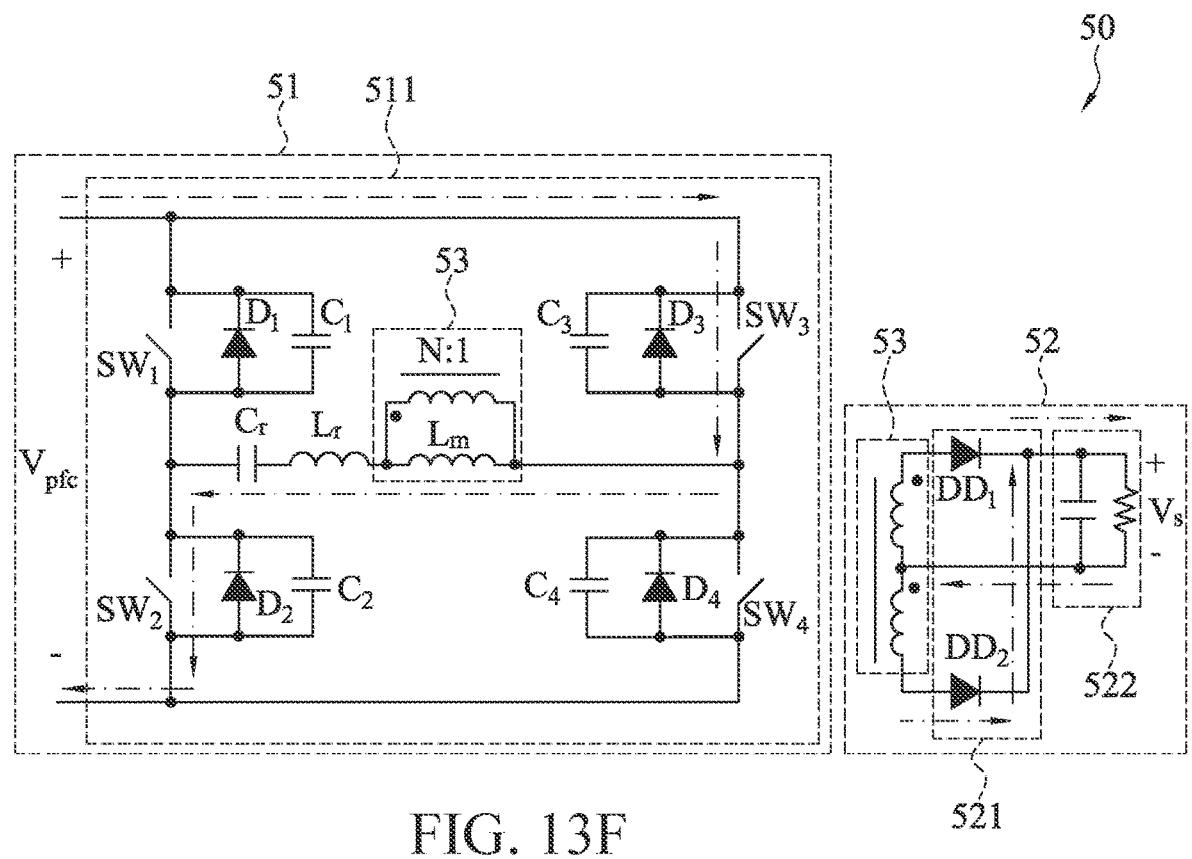
FIG. 13F is a schematic diagram of a second embodiment of the current path of the fifth stage of the period of the full-half bridge resonance converter circuit in the hybrid half-bridge resonance mode according to the present invention.
Figure 13G:
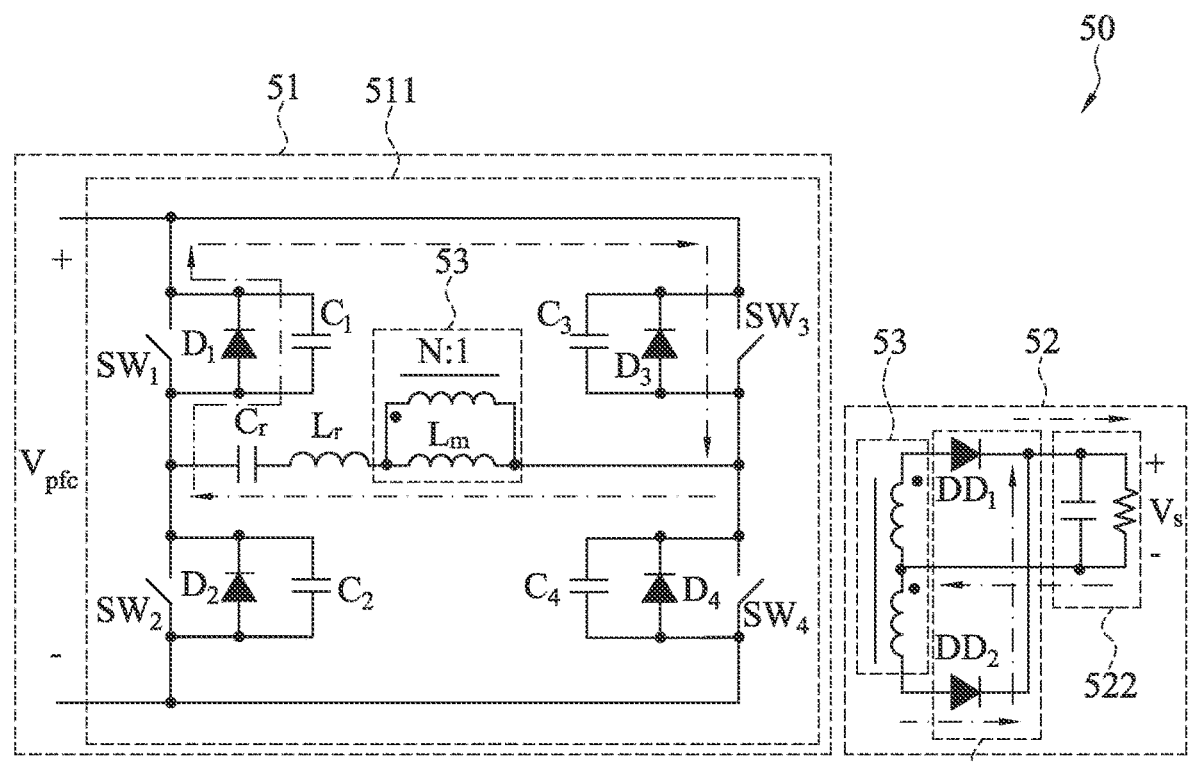
FIG. 13G is a schematic diagram of a second embodiment of the current path of the sixth stage of the period of the full-half bridge resonance converter circuit in the hybrid half-bridge resonance mode according to the present invention.
Figure 13H:
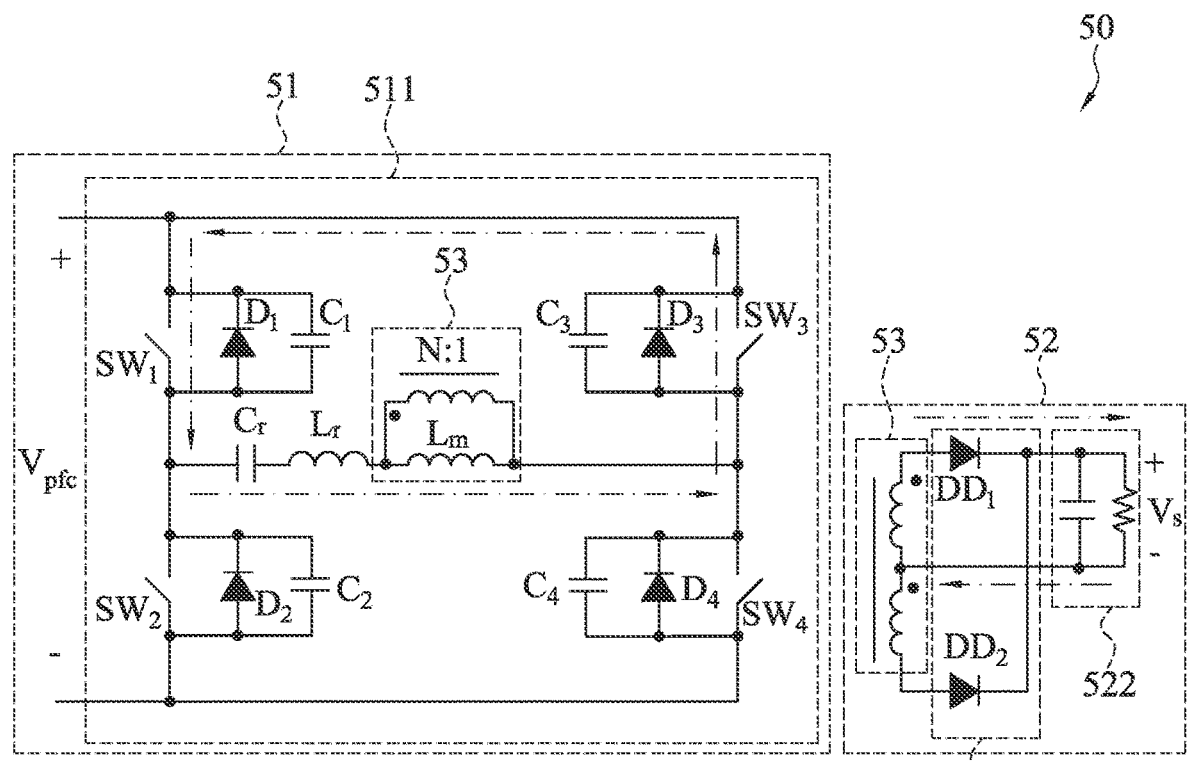
FIG. 13H is a schematic diagram of a second embodiment of the current path of the seventh stage of the period of the full-half bridge resonance converter circuit in the hybrid half-bridge resonance mode according to the present invention.
Figure 13I:
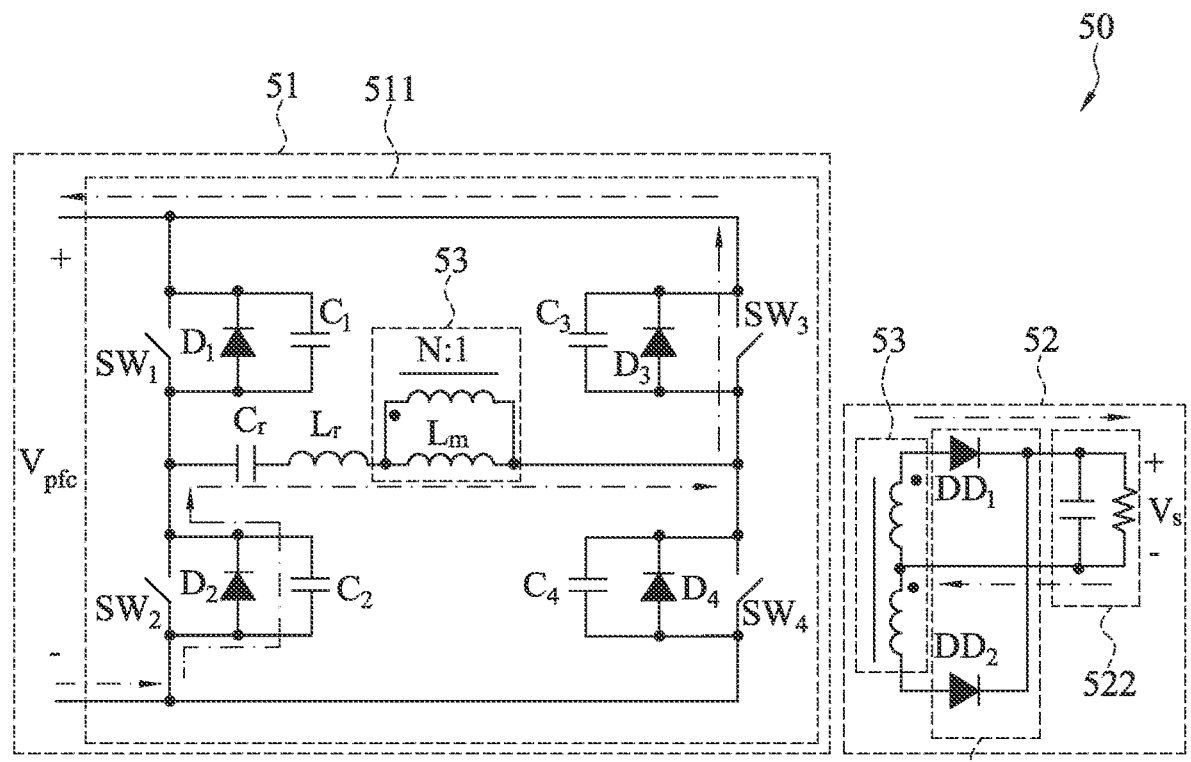
FIG. 13I is a schematic diagram of a second embodiment of the current path of the eighth stage of the period of the full-half bridge resonance converter circuit in the hybrid half-bridge resonance mode according to the present invention.

Refer to FIG. 13A to FIG. 13I. FIG. 13A is a schematic oscillogram of a second embodiment of the switching signals $SW_1\_PWM$, $SW_2\_PWM$, $SW_3\_PWM$, and $SW_4\_PWM$ of the full-half bridge resonance converter circuit 50 in the hybrid half-bridge resonance mode according to the present invention. FIG. 13B is a schematic diagram of a second embodiment of the current path of the first stage of the period T of the full-half bridge resonance converter circuit 50 in the hybrid half-bridge resonance mode according to the present invention. FIG. 13C is a schematic diagram of a second embodiment of the current path of the second stage of the period T of the full-half bridge resonance converter circuit in 50 the hybrid half-bridge resonance mode according to the present invention. FIG. 13D is a schematic diagram of a second embodiment of the current path of the third stage of the period T of the full-half bridge resonance converter circuit in 50 the hybrid half-bridge resonance mode according to the present invention. FIG. 13E is a schematic diagram of a second embodiment of the current path of the fourth stage of the period T of the full-half bridge resonance converter circuit in 50 the hybrid half-bridge resonance mode according to the present invention. FIG. 13F is a schematic diagram of a second embodiment of the current path of the fifth stage of the period T of the full-half bridge resonance converter circuit in 50 the hybrid half-bridge resonance mode according to the present invention. FIG. 13G is a schematic diagram of a second embodiment of the current path of the sixth stage of the period T of the full-half bridge resonance converter circuit in 50 the hybrid half-bridge resonance mode according to the present invention. FIG. 13H is a schematic diagram of a second embodiment of the current path of the seventh stage of the period T of the full-half bridge resonance converter circuit 50 in the hybrid half-bridge resonance mode according to the present invention. FIG. 13I is a schematic diagram of a second embodiment of the current path of the eighth stage of the period T of the full-half bridge resonance converter circuit 50 is in the hybrid half-bridge resonance mode according to the present invention.

Different from the first embodiment of the hybrid half-bridge resonance mode, in a case that the full-half bridge resonance converter circuit 50 operates in the hybrid half-bridge resonance mode, the switching statuses of the first bridge switch $SW_1$ and the second bridge switch $SW_2$ are mutually exclusively on or off, the switching statuses of the third bridge switch $SW_3$ and the fourth bridge switch $SW_4$ are mutually exclusively on or off, and the switching statuses of the first bridge switch $SW_1$ and the second bridge switch $SW_2$ are changed later than the switching statuses of the third bridge switch $SW_3$ and the fourth bridge switch $SW_4$, to excite the first resonance capacitor $C_r$, the first resonance inductor $L_r$, and the second resonance inductor $L_m$. The expression "mutually exclusively on or off" means that when the switching status of the first bridge switch $SW_1$ is on, the switching status of the second bridge switch $SW_2$ is off, or vice versa, and when the switching status of the third bridge switch $SW_3$ is on, the switching status of the fourth bridge switch $SW_4$ is off, or vice versa. Compared with the hybrid half-bridge resonance mode in the first embodiment, the hybrid half-bridge resonance mode in the second embodiment is formed by combining the third embodiment and the fourth embodiment of the half-bridge resonance mode. Therefore, the detailed process is not repeated.

As shown in FIG. 13A, in some embodiments, in the period T of the hybrid half-bridge resonance mode, the switching statuses of the first bridge switch $SW_1$ and the second bridge switch $SW_2$ start to change after a time TL (for example, two pulse durations) since change of the switching statuses of the third bridge switch $SW_3$ and the fourth bridge switch $SW_4$. In some embodiments, in the period T of the hybrid half-bridge resonance mode, the switching statuses of the first bridge switch $SW_1$ and the second bridge switch $SW_2$ change after the switching statuses of the third bridge switch $SW_3$ and the fourth bridge switch $SW_4$ change twice. In some embodiments, the period T of the hybrid half-bridge resonance mode has four pulse durations in a time sequence. In first three pulse durations, the third bridge switch $SW_3$ and the fourth bridge switch $SW_4$ change the switching statuses a plurality of times, and in the remaining pulse durations is for the first bridge switch $SW_1$ and the second bridge switch $SW_2$ to change the switching statuses.

In some embodiments, in a case that the full-half bridge resonance converter circuit 50 operates in the half-bridge resonance mode, when the voltage required by the electronic device remains unchanged but an amount of required currents increases, the voltage regulation control circuit 60 can detect the increase of the amount of current required by the electronic device through the output terminal 80 and transmit, to the voltage feedback control circuit 70, a current change signal indicating the operation in the hybrid half-bridge resonance mode. The voltage feedback control circuit 70 controls the full-half bridge resonance converter circuit 50 to operate in the hybrid half-bridge resonance mode in response to the current change signal. In this way, the voltage converter circuit 10 provides a relatively large current and a relatively large current power to the electronic device without changing the supply voltage $V_s$ to serve the electronic device.

In conclusion, according to the embodiments of the present invention, the input voltage may be adjusted to the supply voltage through the power factor converter circuit and the full-half bridge resonance converter circuit. In this way, the power factor converter circuit and the full-half bridge resonance converter circuit can adjust a voltage, and the power factor converter circuit can improve a power factor of the voltage converter circuit. In addition, a to-be-adjusted voltage difference may be distributed to the power factor converter circuit and the full-half bridge resonance converter circuit, so as to avoid large losses of a single component. In some embodiments, the full-bridge resonance mode, the half-bridge resonance mode, and the hybrid half-bridge resonance mode of the full-half bridge resonance converter circuit may match different power values required for an electronic device supplied by the supply voltage. In some embodiments, switching losses are distributed more uniformly in the hybrid half-bridge resonance mode than in the half-bridge resonance mode, and therefore heat dissipation is more effective.

What is claimed is:

1. A voltage converter circuit, comprising:
a rectifier filter circuit, configured to receive an input voltage and rectify and filter the input voltage to generate a rectified and filtered voltage;
a power factor converter circuit, coupled to the rectifier filter circuit, having a first gain, and configured to convert the rectified and filtered voltage to a power factor voltage according to the first gain;
a full-half bridge resonance converter circuit, coupled to the power factor converter circuit, having a second gain, and configured to convert the power factor voltage to a supply voltage according to the second gain;
a voltage regulation control circuit, coupled to the power factor converter circuit and the full-half bridge resonance converter circuit and configured to generate a first voltage regulation signal, a second voltage regulation signal and a third voltage regulation signal according to an output voltage; and
a voltage feedback control circuit, coupled to the full-half bridge resonance converter circuit and the voltage regulation control circuit, wherein
the power factor converter circuit is configured to adjust the first gain according to the first voltage regulation signal, the full-half bridge resonance converter circuit is configured to operate in a full-bridge resonance mode, a half-bridge resonance mode, or a hybrid half-bridge resonance mode according to the second voltage regulation signal, and the voltage feedback control circuit is configured to control the full-half bridge resonance converter circuit to adjust the second gain according to the third voltage regulation signal.

2. The voltage converter circuit according to claim 1, wherein the power factor converter circuit comprises:
a capacitor;
an inductor, connected in parallel to the capacitor;
a resistor, coupled to the full-half bridge resonance converter circuit and connected in parallel to the capacitor;
a diode, coupled between the inductor and the capacitor; and
a switch, coupled between the rectifier filter circuit and the inductor and configured to change a switch duty cycle of the switch according to the first voltage regulation signal to adjust the first gain.

3. The voltage converter circuit according to claim 1, wherein the full-half bridge resonance converter circuit comprises:
a primary side circuit, coupled to the power factor converter circuit and the voltage regulation control circuit and configured to receive the power factor voltage and the second voltage regulation signal; and
a secondary side circuit, configured to output the supply voltage.

4. The voltage converter circuit according to claim 3, wherein the primary side circuit comprises a bridge resonance circuit, and the secondary side circuit comprises a synchronous rectifier circuit and a filter circuit.

5. The voltage converter circuit according to claim 4, wherein the synchronous rectifier circuit comprises a first rectifier switch and a second rectifier switch, and the first rectifier switch and the second rectifier switch are coupled to the filter circuit.

6. The voltage converter circuit according to claim 4, wherein the bridge resonance circuit comprises:
a first resonance capacitor;
a first resonance inductor, coupled to the first resonance capacitor;
a second resonance inductor, coupled to the first resonance inductor;
a first bridge switch, coupled between a first end of the power factor converter circuit and the first resonance capacitor;
a second bridge switch, coupled between a second end of the power factor converter circuit and the first resonance capacitor;
a third bridge switch, coupled between the first end of the power factor converter circuit and the second resonance inductor; and
a fourth bridge switch, coupled between the second end of the power factor converter circuit and the second resonance inductor, wherein
the bridge resonance circuit is configured to control a switching status of each of the first bridge switch, the second bridge switch, the third bridge switch, and the fourth bridge switch according to the second voltage regulation signal.

7. The voltage converter circuit according to claim 6, wherein in the full-bridge resonance mode, the switching statuses of the first bridge switch and the fourth bridge switch are both on or off, the switching statuses of the second bridge switch and the third bridge switch are both on or off, and the switching statuses of the first bridge switch and the second bridge switch are mutually exclusively on or off, to excite the first resonance capacitor, the first resonance inductor, and the second resonance inductor.

8. The voltage converter circuit according to claim 7, wherein in the full-bridge resonance mode, when the switching statuses of the first bridge switch and the fourth bridge switch are both on, the first bridge switch, the first resonance capacitor, the first resonance inductor, the second resonance inductor, and the fourth bridge switch form a first excitation path, and when the switching statuses of the second bridge switch and the third bridge switch are both on, the second bridge switch, the first resonance capacitor, the first resonance inductor, the second resonance inductor, and the third bridge switch form a second excitation path.

9. The voltage converter circuit according to claim 6, wherein in the half-bridge resonance mode, the switching status of the third bridge switch is off, the switching status of the fourth bridge switch is on, and the switching statuses of the first bridge switch and the second bridge switch are mutually exclusively on or off, to excite the first resonance capacitor, the first resonance inductor, and the second resonance inductor.

10. The voltage converter circuit according to claim 6, wherein in the half-bridge resonance mode, the switching status of the first bridge switch is on, the switching status of the second bridge switch is off, and the switching statuses of the third bridge switch and the fourth bridge switch are mutually exclusively on or off, to excite the first resonance capacitor, the first resonance inductor, and the second resonance inductor.

11. The voltage converter circuit according to claim 6, wherein in the half-bridge resonance mode, the switching status of the third bridge switch is on, the switching status of the fourth bridge switch is off, and the switching statuses of the first bridge switch and the second bridge switch are mutually exclusively on or off, to excite the first resonance capacitor, the first resonance inductor, and the second resonance inductor.

12. The voltage converter circuit according to claim 6, wherein in the half-bridge resonance mode, the switching status of the first bridge switch is off, the switching status of the second bridge switch is on, and the switching statuses of the third bridge switch and the fourth bridge switch are mutually exclusively on or off, to excite the first resonance capacitor, the first resonance inductor, and the second resonance inductor.

13. The voltage converter circuit according to claim 6, wherein in the hybrid half-bridge resonance mode, the switching statuses of the first bridge switch and the second bridge switch are mutually exclusively on or off, the switching statuses of the third bridge switch and the fourth bridge switch are mutually exclusively on or off, and the switching statuses of the third bridge switch and the fourth bridge switch are changed later than the switching statuses of the first bridge switch and the second bridge switch, to excite the first resonance capacitor, the first resonance inductor, and the second resonance inductor.

14. The voltage converter circuit according to claim 6, wherein in the hybrid half-bridge resonance mode, the switching statuses of the first bridge switch and the second bridge switch are mutually exclusively on or off, the switching statuses of the third bridge switch and the fourth bridge switch are mutually exclusively on or off, and the switching statuses of the first bridge switch and the second bridge switch are changed later than the switching statuses of the third bridge switch and the fourth bridge switch, to excite the first resonance capacitor, the first resonance inductor, and the second resonance inductor.

15. The voltage converter circuit according to claim 1, wherein the voltage regulation control circuit transmits a current change signal, and the voltage feedback control circuit controls the full-half bridge resonance converter circuit to operate in the hybrid half-bridge resonance mode in response to the current change signal.

* * * * *